US011302117B2

(12) United States Patent
Kedarisetti et al.

(10) Patent No.: US 11,302,117 B2
(45) Date of Patent: Apr. 12, 2022

(54) ANOMALY DETECTION METHOD, SYSTEM AND COMPUTER READABLE MEDIUM

(71) Applicant: AVIGILON CORPORATION, Vancouver (CA)

(72) Inventors: Dharanish Kedarisetti, Somerville, MA (US); Peter Venetianer, McLean, VA (US)

(73) Assignee: AVIGILON CORPORATION, Vancouver (CA)

( * ) Notice: Subject to any disclaimer, the term of this patent is extended or adjusted under 35 U.S.C. 154(b) by 63 days.

(21) Appl. No.: 16/844,712

(22) Filed: Apr. 9, 2020

(65) Prior Publication Data
US 2020/0327313 A1 Oct. 15, 2020

Related U.S. Application Data

(60) Provisional application No. 62/831,698, filed on Apr. 9, 2019.

(51) Int. Cl.
G06V 40/20 (2022.01)
G06V 20/40 (2022.01)
G06V 20/52 (2022.01)

(52) U.S. Cl.
CPC .............. G06V 40/20 (2022.01); G06V 20/40 (2022.01); G06V 20/53 (2022.01); G06V 20/44 (2022.01)

(58) Field of Classification Search
None
See application file for complete search history.

(56) References Cited

U.S. PATENT DOCUMENTS

| 10,291,884 | B2 | 5/2019 | Haering et al. | |
|---|---|---|---|---|
| 2006/0045185 | A1 | 3/2006 | Kiryati et al. | |
| 2007/0248244 | A1* | 10/2007 | Sato | G08B 13/19608 382/103 |
| 2010/0208064 | A1* | 8/2010 | Liu | G08B 13/19667 348/143 |
| 2011/0205355 | A1* | 8/2011 | Liu | G06T 7/80 348/135 |
| 2011/0205359 | A1* | 8/2011 | Lee | G06V 20/52 348/143 |
| 2016/0042621 | A1* | 2/2016 | Hogg | G08B 13/19615 348/155 |

(Continued)

FOREIGN PATENT DOCUMENTS

| CN | 107917507 A | 4/2018 | |
|---|---|---|---|
| CN | 111107361 B | * 9/2021 | ............. G06T 7/254 |

OTHER PUBLICATIONS

CN 111107361 B Machine Translation (Year: 2018).*
International Search Report and Written Opinion of the ISA dated Jul. 19, 2020, for PCT application No. PCT/US2020/027485.

Primary Examiner — Michelle M Entezari
(74) Attorney, Agent, or Firm — Daniel Hammond

(57) ABSTRACT

A method of detecting an anomaly is provided, including dividing each frame of a video stream into a plurality of cells; in each cell formulate statistics based on metadata generated for the frame, the metadata related to presence of an object in the cell, velocity of objects in the cell, direction of motion of objects in the cell, and classification of objects in the cell; and using the formulated statistics to determine when the anomalous activity has occurred in one of the cells of the plurality of cells.

20 Claims, 37 Drawing Sheets

(56) References Cited

U.S. PATENT DOCUMENTS

| | | |
|---|---|---|
| 2016/0133025 A1 | 12/2016 | Wang et al. |
| 2017/0178343 A1 | 6/2017 | Maranatha et al. |
| 2018/0232889 A1* | 8/2018 | Storer ................ G06F 16/7867 |
| 2018/0285633 A1 | 10/2018 | Alcock et al. |
| 2019/0158813 A1* | 5/2019 | Rowell ................ H04N 13/189 |
| 2019/0188864 A1* | 6/2019 | Madsen ................ G06V 20/52 |
| 2021/0279475 A1* | 9/2021 | Tusch ................ G06K 9/00248 |

* cited by examiner

|       | Su   | Mo   | Tu   | We   | Th   | Fr   | Sa   |
|-------|------|------|------|------|------|------|------|
| 00:01 | D1H1 | D2H1 | D2H1 | D2H1 | D2H1 | D2H1 | D1H1 |
| 01:02 | D1H1 | D2H1 | D2H1 | D2H1 | D2H1 | D2H1 | D1H1 |
| 02:03 | D1H2 | D2H1 | D2H1 | D2H1 | D2H1 | D2H1 | D1H2 |
|       | D1H2 | D2H2 | D2H2 | D2H2 | D2H2 | D2H2 | D1H2 |
| ...   | ...  | ...  | ...  | ...  | ...  | ...  | ...  |
|       | D1H2 | D2H2 | D2H2 | D2H2 | D2H2 | D2H2 | D1H2 |
|       | D1H2 | D2H2 | D2H2 | D2H2 | D2H2 | D2H2 | D1H2 |
| 21:22 | D1H2 | D2H1 | D2H1 | D2H1 | D2H1 | D2H1 | D1H2 |
| 22:23 | D1H1 | D2H1 | D2H1 | D2H1 | D2H1 | D2H1 | D1H1 |
| 23:24 | D1H1 | D2H1 | D2H1 | D2H1 | D2H1 | D2H1 | D1H1 |

D1, D2 are Day Level Clusters
H1, H2 are Hour Level Clusters
4 Clusters D1H1, D1H2, D2H1, D2H2

FIG. 21

Possible Combinations of Day and Hour Level Clusters

4 Clusters:   D1H1, D1H2, D2H1, D2H2

3 Clusters:   D1H ——— , D2H1, D2H2
              D1H1, D1H2, D2H ———

2 Clusters:   D1H ——— , D2H ———

1 Cluster:    ——— DH ———

FIG. 22

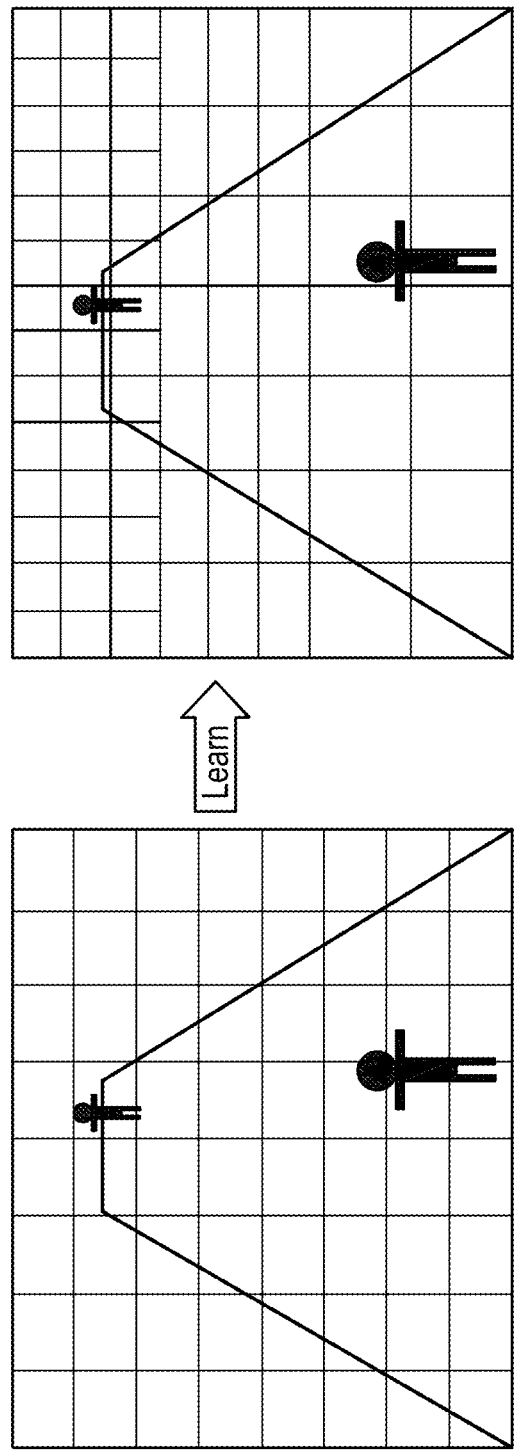

Global & local temporal velocity Metrics

FIG. 28

|  | Spatial | | Temporal | |
| --- | --- | --- | --- | --- |
|  | Occupancy | Velocity | Velocity | Occupancy |
| target metadata | Target location/trajectory | Target velocity | Target Velocity | Target location |
| target metric computation | Compute average presence at the cell/ Compute trajectory clusters or overlays | Update Gaussian mean and variance | Update Gaussian Mean And Variance | Compute average presence at the cell |
| cell statistical model | Model containing presence map/or trajectory maps | Model containing mean and variance | Model Containing Mean And Variance | Model containing mean observed values |
| global metric computation | Compute segmentation/ trajectory patterns | Compute velocity heat maps once a day | Update global map Histogram with mean every 10 min | Update global map Histogram with frequency of presence every 10 min |
| global statistical model | Model representing segmentation/ Trajectory patterns | Heat map of velocity | A Model containing histogram of velocities at every grid cell | A Model containing Histogram of presence frequencies at every grid cell |
| global level anomaly detection | Declare anomaly if target present at a wrong segment/ trajectory does not match general patterns | Declare anomaly if speeding happens in a slow speed area | Declare Anomaly if the velocity of the target falls in an anomalous histogram bin | Declare Anomaly if the presence causes an anomalous frequency of presence |

ANOMALY DETECTION METHOD, SYSTEM AND COMPUTER READABLE MEDIUM

RELATED APPLICATIONS

This application is a non-provisional of U.S. Patent Application No. 62/831,698, filed Apr. 9, 2019, the contents of which are hereby incorporated by reference. This application is also related to U.S. patent application Ser. No. 15/943,256 filed Apr. 2, 2018, U.S. Patent Application No. 62/480,240 filed Mar. 31, 2017, and U.S. Patent Application No. 62/590,498 filed Nov. 24, 2017, the contents of each of which are hereby incorporated by reference.

FIELD

The present subject-matter relates to anomaly detection in video, and more particularly to anomaly detection in a video using metadata extracted from the video. The anomaly detection may be implemented to detect anomalies in previously recorded videos or may be performed in real time using metadata generated contemporaneously with the recording of the video.

BACKGROUND

Analysis of surveillance video is useful to review and identify events found in the video captured by video cameras. To assist review of video, a video may be subject to analysis to extract and associate metadata from the images of the video. The metadata may then be subject to searches and/or used to define events of interest that may then be used to highlight the video (or certain portions thereof), such as to security personnel. However, there is often a large amount of video (typically recording normal, uneventful scenes), making it impracticable, if not impossible, to review by personnel. It would assist reviewers of such recorded video to be able to quickly identify anomalies that may have occurred.

In the video camera surveillance system, there may be a large number of cameras that are each generating its own video feed, which can make the simultaneous viewing of these video feeds by security personnel cumbersome. It would assist such security personnel if alerts and/or indications are generated in real-time to highlight detected anomalies in any of the videos.

SUMMARY

The embodiments described herein provide novel approaches to anomaly detection in video. The anomaly detection may detect anomalies of a scene using metadata of the video. Although not required, the anomaly detection can be performed separately form metadata generation. Thus, the anomaly detection may be performed in real time using metadata extracted contemporaneously with the recording of the video, or may be performed with respect to previously recorded video (e.g., taken days, months, years before).

According to embodiments herein, a security camera may observe the same scene for extended periods of time. This enables observing and learning typical behaviors in the scene and automatically detecting anomalies. The installation process for detecting anomalies in the scene may be simplified since customer configuration (e.g., configuring rules to detect events in the scene) can be simplified (e.g., eliminated or supplemented). In addition, automatic detecting anomalies as described herein may allow the system to learn patterns that a user might not consider in configuring a system, and thus enables detecting anomalies that would otherwise not be detected. For a security person looking at a scene captured by a fixed camera, small changes to the scene might go unnoticed. Given crowded scenes or a mostly similar scene, an observer may have a hard time distinguishing anomalies in the behavior of targets, especially in case of a larger multi camera system. In case of a camera looking at a park, the observer might miss if there is a person running through the crowd, or a speeding vehicle on a highway. The systems and methods described herein may help address these issues.

According to some examples, a method of detecting an anomaly within a scene of a video based on metadata associated with corresponding frames of the video comprises sequentially receiving target-related metadata associated with corresponding sequential frames of the video, the target-related metadata including, for each target identified by the target-related metadata in the sequential frames of the video: target classification identifying a type of the target, target location identifying a location of the target, and a first target feature of the target; analyzing sets of the target-related metadata, each set of target-related metadata being associated with a corresponding set of frames of the video; based on the analyzing, generating and associating with the corresponding frame set corresponding instantaneous metadata metrics for each of a plurality of cells dividing the scene of the video; generating statistical models from the instantaneous metadata metrics associated with the different frame sets of the video for each of the plurality of cells dividing the scene of the video; comparing, at a cell level, the instantaneous metadata metrics associated with each of the different frame sets of the video with the generated statistical models; and detecting an anomaly in a scene of the video based upon the comparison.

According to some examples, a video analytics system may detect an anomaly within a scene of a video based on metadata associated with corresponding frames of the video. The video analytics system may comprise a metadata anomaly detection module configured to receive, for each of a plurality of frames of a video, corresponding target-related metadata, the target-related metadata including, for each target identified by the target-related metadata in a particular frame of a plurality of frames of the video: target classification identifying a type of the target, target location identifying a location of the target, and a first target feature of the target. The metadata anomaly detection module may comprise: an instantaneous metrics extraction module configured to sequentially receive the target-related metadata associated with corresponding sequential frames of the video, to analyze sets of the target-related metadata, each set of target-related metadata being associated with a corresponding set of frames of the video and being analyzed to generate and associate with the corresponding frame set corresponding instantaneous metadata metrics for each of a plurality of cells dividing the scene of the video, and to sequentially provide the instantaneous metadata metrics associated with different frame sets of the video; a statistical model update module configured to sequentially receive the instantaneous metadata metrics associated with different frame sets of the video from the instantaneous metrics extraction model, and to provide statistical models derived from the instantaneous metadata metrics associated with the different frame sets of the video for each of the plurality of cells dividing the scene of the video; and an anomaly formulation module configured to sequentially receive the instantaneous metadata metrics associated with different frame sets of the video from the instantaneous metrics extraction model, to compare, at a cell level, the instantaneous metadata metrics associated with each of the different frame sets of the video with the statistical models provided by the statistical model update module, and to detect an anomaly in a scene of the video based upon the comparison.

In some examples, the instantaneous metrics extraction module is configured to generate at the cell level, with respect to each of the different frame sets, a corresponding first instantaneous metadata metric reflecting its most recent value within the timeline of the video, such as how many people were present in each cell in a most recent predetermined interval within the timeline of the video, speeds of a first target type in each cell in a most recent predetermined interval within the timeline of the video, a number of each of the different target types present in each cell within a first predetermined duration corresponding to the first frame set, the first target feature for each instance of several different target types present in each cell within a first predetermined duration preceding the frame corresponding to the first frame set.

In some examples, the first target feature is one of target location, target velocity, target trajectory, target speed, target size, target orientation, target appearance, target disappearance, object ported by target, object left behind by target, target entering, target exiting, target loitering, target lying down, target running, target walking and target waiting in queue.

In some examples, anomalies in the scene of a video may be made based only on analysis of the received target-related metadata and/or without analysis of images of the video.

In some examples, an estimated path of a target may be used to provide metrics to cells through which the estimated path extends In some examples, statistical models may be altered in response to a user input, such as identification of a false alarm.

In some examples, plural videos may be analyzed for anomalies. A target identified in the first video and a target identified in the second video may be determined to be the same target in response to one or more detected anomalies within the scene of the first video and one or more detected anomalies within the scene of the second video. Real world locations in the first video and the second video may be correlated based upon identifying identify the target identified in the first video and the target identified in the second video as the same target. Scenes of the first video and the second video need not share any view of the same real world location. In some examples, a distance between or a relative orientation of the scenes of the first video and the second video may be determined based upon identifying the same target in the first and second videos.

In some examples, sizes of at least some of the plurality of cells dividing the scene of the video may be automatically altered. Altering of sizes of the cells may be performed to reduce a difference of a first metric of different cells as indicated by initial statistical models and/or as a function of identifying a relatively high frequency of target trajectories aligned in a first direction. In some examples, a first subset of the plurality of cells may be automatically resized based upon a frequency of a first target presence (e.g., human presence) as indicated by initial statistical models and a second subset of the plurality of cells may be automatically resized based on a frequency of vehicle presence as indicated by the initial statistical models.

In some examples, segments of the scene of a video may be identified based upon a clustering of relatively small sized cells as compared to other cells dividing the scene of the video and/or clustering of a relatively high frequency of a particular metric. For example, a sidewalk in the scene of a video may be identified based upon a clustering of a first continuous subset of cells having a relatively small size and having a relatively high frequency of human presence as compared to other cells dividing the scene of the video. For example, a road of the scene of the video may be identified based upon a clustering of a first continuous subset of cells having a relatively small size and having a relatively high frequency of vehicle presence as compared to other cells dividing the scene of a video. For example, clustering of cells having relatively consistent target trajectories may be used to identify a path. Relatively high speeds associated with the cells may identify the path as a road for a vehicle in the video.

In some examples, scene segmentation may be performed to determine segments of the scene of a video from corresponding clusters of adjacent cells as representing a similar location within the scene of the video. A global metrics map may identify the determined segments of the scene and associate metrics of cells forming each segment. Metrics of the cells forming each segment may be used to filter (e.g., select) instantaneous metadata metrics to be used to detect anomalies in the scene of the video. In some examples, segments may be classified based on a shape of a corresponding segment and/or based upon paths of different target classes through a corresponding segment.

According to another aspect, there is provided a system comprising: a display; a user input device; a processor communicatively coupled to the display and the user input device; and a memory communicatively coupled to the processor and having stored thereon computer program code that is executable by the processor, wherein the computer program code, when executed by the processor, causes the processor to perform the methods described herein.

According to another aspect, there is provided a non-transitory computer readable medium having stored thereon computer program code that is executable by a processor and that, when executed by the processor, causes the processor to perform the methods described herein.

This summary does not necessarily describe the entire scope of all aspects. Other aspects, features and advantages will be apparent to those of ordinary skill in the art upon review of the following description of specific embodiments.

BRIEF DESCRIPTION OF THE DRAWINGS

The detailed description refers to the following figures, in which:

FIG. 21 illustrates a weekly calendar showing clusters according to an example embodiment;

FIG. 22 illustrates the possible combinations of day and hour level clusters according to an example embodiment;

FIG. 25A exemplifies a feature of automatically altering cell size of the grid of cells dividing the scene of the video and FIG. 25B illustrates an exemplary method that may be performed by statistical model update module to perform automatic reconfiguration of cell sizes;

FIG. 28 illustrates examples of the spatial and temporal features extracted from metadata.

Figure 1:
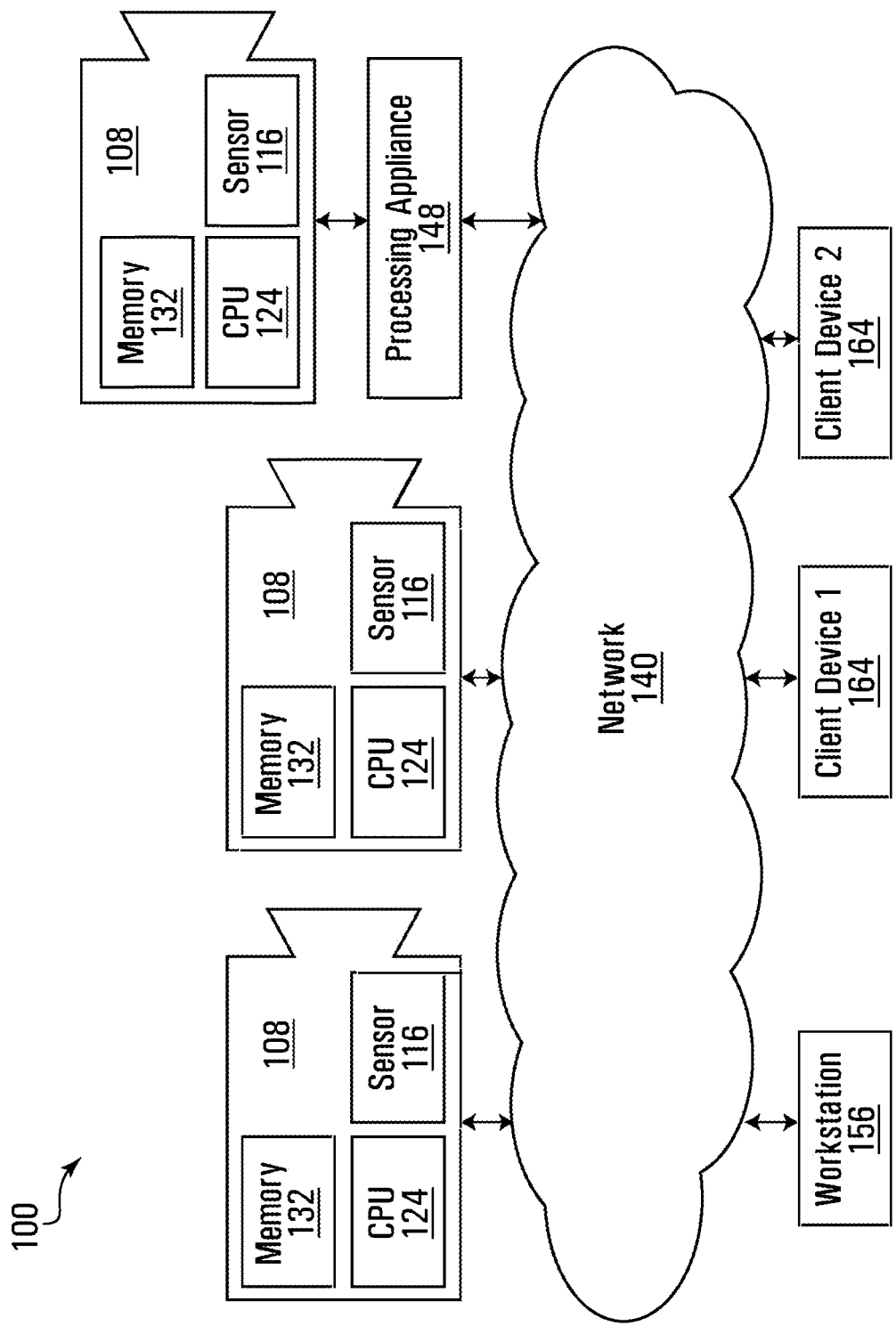
FIG. 1 illustrates a block diagram of connected devices of a video surveillance system according to an example embodiment.

It will be appreciated that for simplicity and clarity of the illustrations, elements shown in the figures have not necessarily been drawn to scale. For example, the dimensions of some of the elements may be exaggerated relative to other elements for clarity. Furthermore, where considered appropriate, reference numerals may be repeated among the figures to indicate corresponding or analogous elements.

DETAILED DESCRIPTION OF VARIOUS EMBODIMENTS

Numerous specific details are set forth in order to provide a thorough understanding of the exemplary embodiments described herein. The invention may, however, be embodied in many different forms and should not be construed as limited to the exemplary embodiments set forth herein. These example embodiments are just that—examples—and many different embodiments and variations are possible that do not require the details provided herein. It should also be emphasized that the disclosure provides details of alternative examples, but such listing of alternatives is not exhaustive. Furthermore, any consistency of detail between various exemplary embodiments should not be interpreted as requiring such detail—it is impracticable to list every possible variation for every feature described herein. The language of the claims should be referenced in determining the requirements of the invention.

Ordinal numbers such as "first," "second," "third," etc. may be used simply as labels of certain elements, steps, etc., to distinguish such elements, steps, etc. from one another. Terms that are not described using "first," "second," etc., in the specification, may still be referred to as "first" or "second" in a claim. In addition, a term that is referenced with a particular ordinal number (e.g., "first" in a particular claim) may be described elsewhere with a different ordinal number (e.g., "second" in the specification or another claim).

The word "a" or "an" when used in conjunction with the term "comprising" or "including" in the claims and/or the specification may mean "one", but it is also consistent with the meaning of "one or more", "at least one", and "one or more than one" unless the context clearly dictates otherwise. Similarly, the word "another" may mean at least a second or more unless the context clearly dictates otherwise.

The terms "coupled", "coupling" or "connected" as used herein can have several different meanings depending in the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through one or more intermediate elements or devices via an electrical element, electrical signal or a mechanical element depending on the particular context.

"Processing image data" or variants thereof herein refers to one or more computer-implemented functions performed on image data. For example, processing image data may include, but is not limited to, image processing operations, analyzing, managing, compressing, encoding, storing, transmitting and/or playing back the video data. Analyzing the image data may include segmenting areas of image frames and detecting objects, tracking and/or classifying objects located within the captured scene represented by the image data. The processing of the image data may cause modified image data to be produced, such as compressed (e.g. lowered quality) and/or re-encoded image data. The processing of the image data may also cause additional information regarding the image data or objects captured within the images to be outputted. For example, such additional information is commonly understood as metadata. The metadata may also be used for further processing of the image data, such as drawing bounding boxes around detected objects in the image frames.

As will be appreciated by one skilled in the art, the various example embodiments described herein may be embodied as a method, system, or computer program product. Accordingly, the various example embodiments may take the form of an entirely hardware embodiment, an entirely software embodiment or an embodiment combining software and hardware aspects. For example, modules, units and functional blocks described herein may form various functional modules of a computer. The computer may be a general purpose computer or may be dedicated hardware or firmware (e.g., an electronic or optical circuit, such as application-specific hardware, such as, for example, a digital signal processor (DSP) or a field-programmable gate array (FPGA)). A computer may be configured from several interconnected computers. Each functional module (or unit) described herein may comprise a separate computer, or some or all of the functional module (or unit) may be comprised of and share the hardware of the same computer. Connections and interactions between the modules/units described herein may be hardwired and/or in the form of data (e.g., as data stored in and retrieved from memory of the computer, such as a register, buffer, cache, storage drive, etc., such as part of an application programming interface (API)). The functional modules (or units) may each correspond to a separate segment or segments of software (e.g., a subroutine) which configure a computer and/or may correspond to segment(s) of software of which some is shared with one or more other functional modules (or units) described herein (e.g., the functional modules (or units) may share certain segment(s) of software or be embodied by the same segment(s) of software).

Furthermore, the various example embodiments may take the form of a computer program product on a computer-usable storage medium (e.g., a tangible computer readable medium) having computer-usable program code embodied in the medium. Any suitable computer-usable or computer readable medium may be utilized. The computer-usable or computer-readable medium may be, for example but not limited to, an electronic, magnetic, optical, electromagnetic, infrared, or semiconductor system, apparatus, device, or propagation medium. In the context of this document, a computer-usable or computer-readable medium may be any medium that can contain, store, communicate, propagate, or transport the program for use by or in connection with the instruction execution system, apparatus, or device.

As is understood, "software" refers to prescribed rules to operate a computer, such as code or script (and may also be referred to herein as computer program code, program code, etc.). Computer program code for carrying out operations of various example embodiments may be written in an object oriented programming language such as Java, Smalltalk, C++ or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or entirely on the remote computer or server. In the latter scenario, the remote computer may be connected to the computer through a local area network (LAN) or a wide area network (WAN), or the connection may be made to an external computer (for example, through the Internet using an Internet Service Provider).

Various example embodiments are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which executed via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Referring now to FIG. 1, therein illustrated is a block diagram of connected devices of a video surveillance system 100 according to an example embodiment. The video surveillance system 100 includes hardware and software that perform the processes and functions described herein.

The video surveillance system 100 includes at least one video capture device 108 being operable to capture a plurality of images and produce image data representing the plurality of captured images.

Each video capture device 108 includes at least one image sensor 116 for capturing a plurality of images. The video capture device 108 may be a digital video camera and the image sensor 116 may output captured light as a digital data. For example, the image sensor 116 may be a CMOS, NMOS, or CCD image sensor.

The at least one image sensor 116 may be operable to sense light in one or more frequency ranges. For example, the at least one image sensor 116 may be operable to sense light in a range that substantially corresponds to the visible light frequency range. In other examples, the at least one image sensor 116 may be operable to sense light outside the visible light range, such as in the infrared and/or ultraviolet range. In other examples, the video capture device 108 may be a multi-sensor camera that includes two or more sensors that are operable to sense light in different frequency ranges.

The at least one video capture device 108 may include a dedicated camera. It will be understood that a dedicated camera herein refers to a camera whose principal features is to capture images or video. In some example embodiments, the dedicated camera may perform functions associated to the captured images or video, such as but not limited to processing the image data produced by it or by another video capture device 108. For example, the dedicated camera may be a surveillance camera, such as any one of a box, pan-tilt-zoom camera, dome camera, in-ceiling camera, box camera, and bullet camera.

Additionally, or alternatively, the at least one video capture device 108 may include an embedded camera. It will be understood that an embedded camera herein refers to a camera that is embedded within a device that is operational to perform functions that are unrelated to the captured image or video. For example, the embedded camera may be a camera found on any one of a laptop, tablet, drone device, smartphone, video game console or controller.

Each video capture device 108 includes one or more processors 124, one or more memory devices 132 coupled to the processors and one or more network interfaces. The memory device can include a local memory (e.g. a random access memory and a cache memory) employed during execution of program instructions. The processor executes computer program instruction (e.g., an operating system and/or application programs), which can be stored in the memory device.

In various embodiments the processor 124 may be implemented by any processing circuit having one or more circuit units, including a central processing unit (CPU), digital signal processor (DSP), graphics processing unit (GPU) embedded processor, a vision or video processing unit (VPU) embedded processor, etc., and any combination thereof operating independently or in parallel, including possibly operating redundantly. Such processing circuit may be implemented by one or more integrated circuits (IC), including being implemented by a monolithic integrated circuit (MIC), an Application Specific Integrated Circuit (ASIC), a Field Programmable Gate Array (FPGA), etc. or any combination thereof. Additionally, or alternatively, such processing circuit may be implemented as a programmable logic controller (PLC), for example. The processor may also include memory and be in wired communication with the memory circuit, for example.

In various example embodiments, the memory device 132 coupled to the processor circuit is operable to store data and computer program instructions. Typically, the memory device formed from one or more integrated circuits. The memory device may be implemented as Read-Only Memory (ROM), Programmable Read-Only Memory (PROM), Erasable Programmable Read-Only Memory (EPROM), Electrically Erasable Programmable Read-Only Memory (EEPROM), flash memory, one or more flash drives, dynamic random access memory (DRAM), universal serial bus (USB) connected memory units, magnetic storage, optical storage, magneto-optical storage, etc. or any combination thereof, for example. The memory device may be a volatile memory, a non-volatile memory, or a combination thereof.

In various example embodiments, a plurality of the components of the video capture device 108 may be implemented together within a system on a chip (SOC). For example, the processor 124, the memory 132 and the network interface may be implemented within a SOC. Furthermore, when implemented in this way, both a general purpose processor and DSP may be implemented together within the SOC.

Continuing with FIG. 1, each of the at least one video capture device 108 is connected to a network 140. Each video capture device 108 is operable to output image data representing images that it captures and transmit the image data over the network.

It will be understood that the network 140 may be any communications network that provides reception and transmission of data. For example, the network 140 may be a local area network, external network (e.g. WAN, the Internet) or a combination thereof. In other examples, the network 140 may include a cloud network.

In some examples, the video surveillance system 100 includes a processing appliance 148. The processing appliance 148 is operable to process the image data outputted by a video capture device 108. The processing appliance 148 may be a computer and include one or more processor and one or more memory devices coupled to the processor. The processing appliance 148 may also include one or more network interfaces.

For example, and as illustrated, the processing appliance 148 is connected to a video capture device 108. The processing appliance 148 may also be connected to the network 140.

According to one exemplary embodiment, and as illustrated in FIG. 1, the video surveillance system 100 includes at least one workstation 156 (e.g. server), each having one or more processors. The at least one workstation 156 may also include storage (memory). The workstation 156 receives image data from at least one video capture device 108 and performs processing of the image data. The workstation 156 may send commands for managing and/or controlling one or more of the video capture devices 108. The workstation 156 may receive raw image data from the video capture device 108. Alternatively, or additionally, the workstation 156 may receive image data that has already undergone some intermediate processing, such as processing at the video capture device 108 and/or at a processing appliance 148. For example, the workstation 156 may also receive metadata with the image data form the video capture devices 108 and perform further processing of the image data.

It will be understood that while a single workstation 156 is illustrated in FIG. 1, the workstation may be implemented as an aggregation of a plurality of workstations.

The video surveillance system 100 further includes at least one client device 164 connected to the network 140. The client device 164 is used by one or more users to interact with the video surveillance system 100. Accordingly, the client device 164 includes a user interface including at least one display device (a display) and at least one user input device (e.g. mouse, keyboard, touchscreen). The client device 164 is operable to display on its display device various information, to receive various user input, and to play back recorded video including near real time video received from the video capture devices 108. Near real time video means the display depicts video of an event or situation as it existed at the current time minus the processing time, as nearly the time of the live event in the field of view of the video capture devices 108. For example, the client device may be any one of a personal computer, laptops, tablet, personal data assistant (PDA), cell phone, smart phone, gaming device, and other mobile device.

The client device 164 is operable to receive image data (e.g., video) over the network 140 and is further operable to playback the received image data. A client device 164 may also have functionalities for processing image data. In other examples, image processing functionalities may be shared between the workstation and one or more client devices 164.

In some examples, the video surveillance system 100 may be implemented without the workstation 156. Accordingly, image processing functionalities of the workstation 156 may be wholly performed on the one or more video capture devices 108 or on one or more client devices 164. Alternatively, the image processing functionalities may be shared amongst two or more of the video capture devices 108, processing appliance 148 and client devices 164.

Figure 2A:
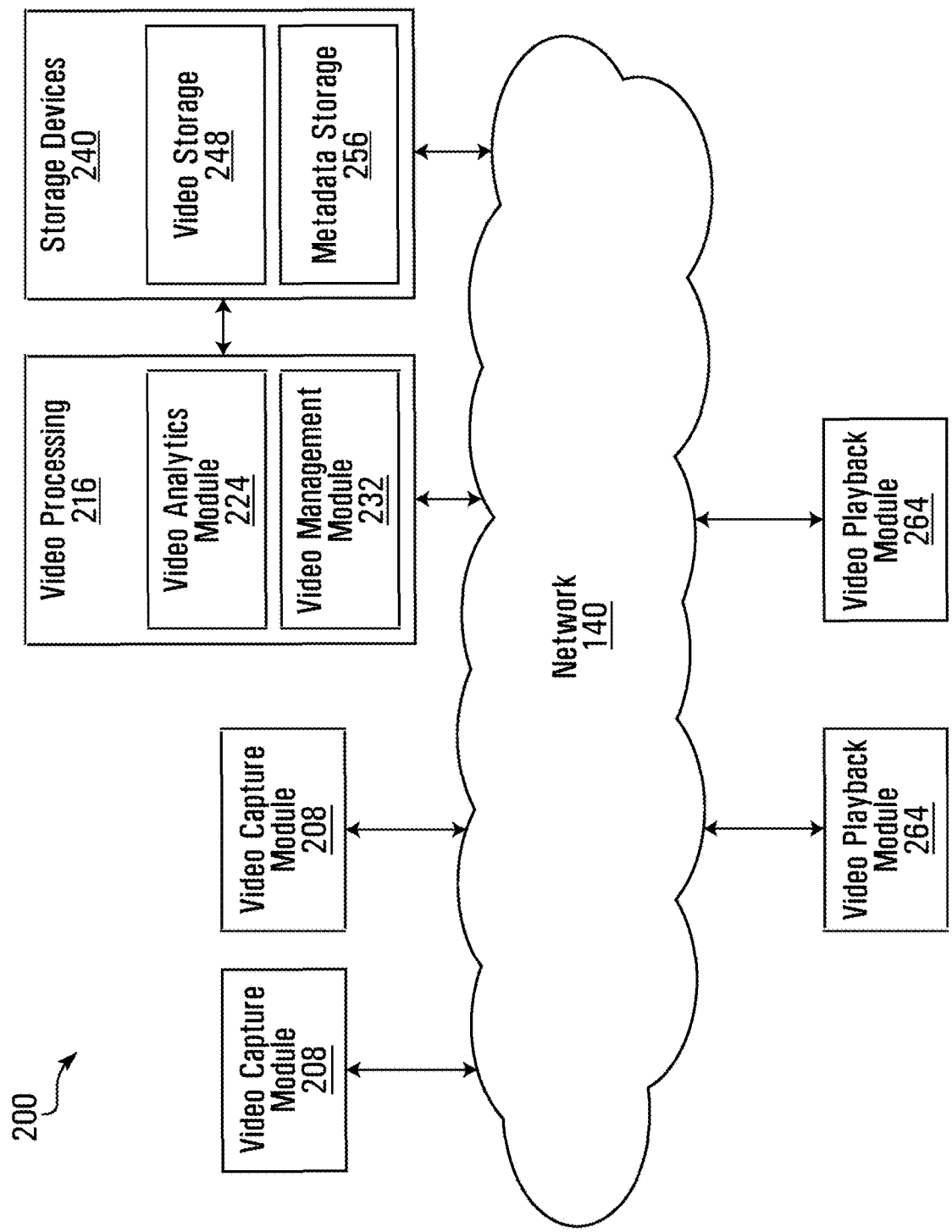
FIG. 2A illustrates a block diagram of a set of operational modules of the video surveillance system according to one example embodiment.

Referring now to FIG. 2A, therein illustrated is a block diagram of a set 200 of operational modules of the video surveillance system 100 according to one example embodiment. The operational modules may be implemented in hardware, software or both on one or more of the devices of the video surveillance system 100 as illustrated in FIG. 1A.

The set 200 of operational modules include at least one video capture module 208. For example, each video capture device 108 may implement a video capture module 208. The video capture module 208 is operable to control one or more components (e.g. sensor 116, etc.) of a video capture device 108 to capture image data, for example, video.

The set 200 of operational modules includes a subset 216 of image data processing modules. For example, and as illustrated, the subset 216 of image data processing modules includes a video analytics module 224 and a video management module 232.

The video analytics module 224 receives image data and analyzes the image data to determine properties or characteristics of the captured image or video and/or of objects found in the scene represented by the image or video. Based on the determinations made, the video analytics module 224 outputs metadata providing information about the determinations including activity or motion detection as will be detailed in FIG. 3 and later figures. Other examples of determinations made by the video analytics module 224 may include one or more of foreground/background segmentation, object detection, object tracking, motion detection, object classification, virtual tripwire, anomaly detection, facial detection, facial recognition, license plate recognition, identifying objects "left behind", monitoring objects (i.e. to protect from stealing), and business intelligence. However, it will be understood that other video analytics functions known in the art may also be implemented by the video analytics module 224.

The video management module 232 receives image data and performs processing functions on the image data related to video transmission, playback and/or storage. For example, the video management module 232 can process the image data to permit transmission of the image data according to bandwidth requirements and/or capacity. The video management module 232 may also process the image data according to playback capabilities of a client device 164 that will be playing back the video, such as processing power and/or resolution of the display of the client device 164. The video management module 232 may also process the image data according to storage capacity within the video surveillance system 100 for storing image data.

It will be understood that according to some example embodiments, the subset 216 of video processing modules may include only one of the video analytics module 224 and the video management module 232.

The set 200 of operational modules further includes a subset 240 of storage modules. For example, and as illustrated, the subset 240 of storage modules include a video storage module 248 and a metadata storage module 256. The video storage module 248 stores image data, which may be image data processed by the video management module 232. The metadata storage module 256 stores information data outputted from the video analytics module 224.

It will be understood that while video storage module 248 and metadata storage module 256 are illustrated as separate modules, they may be implemented within a same hardware storage device whereby logical rules are implemented to separate stored video from stored metadata. In other example embodiments, the video storage module 248 and/or the metadata storage module 256 may be implemented within a plurality of hardware storage devices in which a distributed storage scheme may be implemented.

The set of operational modules further includes at least one video playback module 264, which is operable to receive image data from each capture device 108 and playback the image data as a video on a display. For example, the video playback module 264 may be implemented on a client device 164 to play recorded video (from storage devices 240) and to play near real time video from the video capture devices 108.

The operational modules of the set 200 may be implemented on one or more of the video capture device 108, processing appliance 148, workstation 156 and client device 164. In some example embodiments, an operational module may be wholly implemented on a single device. For example, video analytics module 224 may be wholly implemented on the workstation 156. Similarly, video management module 232 may be wholly implemented on the workstation 156.

In other example embodiments, some functionalities of an operational module of the set 200 may be partly implemented on a first device while other functionalities of an operational module may be implemented on a second device. For example, video analytics functionalities may be split between one or more of a video capture device 108, processing appliance 148 and workstation 156. Similarly, video management functionalities may be split between one or more of a video capture device 108, a processing appliance 148 and a workstation 156.

Figure 2B:
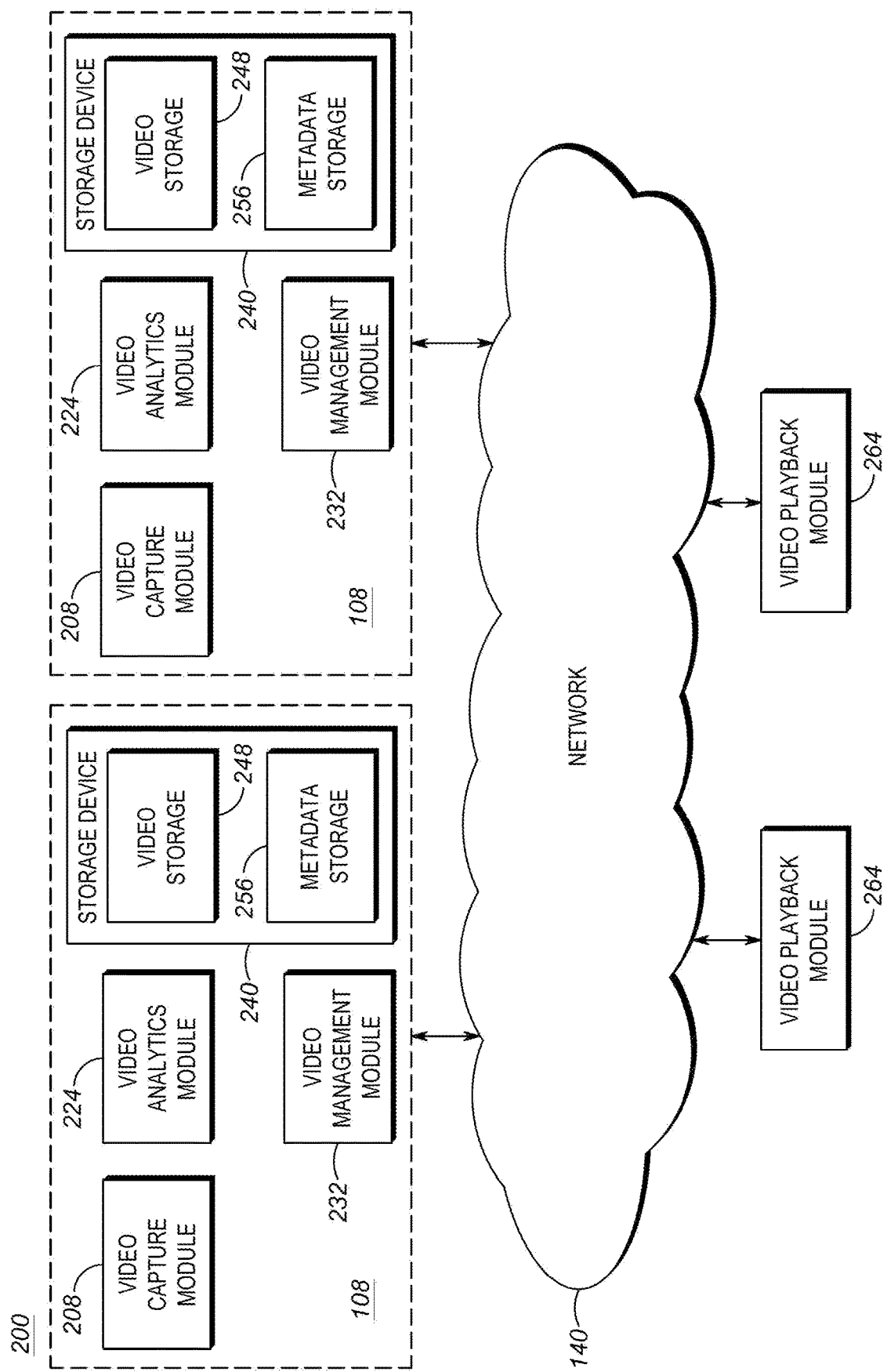
FIG. 2B illustrates a block diagram of a set of operational modules implemented within one device according to one example embodiment.

Referring now to FIG. 2B, therein illustrated is a block diagram of a set 200 of operational modules of the video surveillance system 100 according to one particular example embodiment wherein the video capture module 208, the video analytics module 224, the video management module 232 and the storage device 240 is wholly implemented on the one or more video capture devices 108. Accordingly, the video surveillance system 100 may not require a workstation 156 and/or a processing appliance 148.

As described elsewhere herein image data is produced by each of the video capture devices 108. According to various examples, the image data produced is video data (i.e. a plurality of sequential image frames). The video data produced by each video capture device is stored as a video feed within the system 100. A video feed may include segments of video data that have been recorded intermittently. Intermittently recorded video refers to the carrying out of recording of video data produced by a video capture device 108 over an interval of time wherein some of the video data produced by the video capture device 108 is not recorded. Video data produced while recording is being carried out is stored within the system 100 (e.g. within video storage module 248). Video data produced while recording is not being carried out is not stored within the system 100.

For example, whether video data produced by a video capture device 108 is recorded is determined based a set of one or more rules. For example, video data may be recorded based on presence of a feature in the scene captured within the video, such as motion being detected. Alternatively, or additionally, video data may be recorded based on a predetermined recording schedule. Video data may also be selectively recorded based on a command from an operator. Video data may also be recorded continuously (e.g., without interruption) and segments of video data may be extracted from this continuous recording.

For example, over the interval of time, a first sub-interval of time during which recording for a video capture device is being carried out results in a first segment of video data to be stored. This stored segment of video data includes the plurality of sequential images produced by the video capture device 108 during the first sub-interval of time.

Over a second sub-interval of time during which recording is not being carried out, the produced plurality of images are not stored. Accordingly, this image data is lost.

Over a third sub-interval of time during which recording for the video capture device is being carried out again results in another segment of video data to be stored. This stored segment of video data includes the plurality of sequential images produced by the video capture device 108 during the third sub-interval of time.

Accordingly, the video feed for a given video capture device 108 is formed of the one or more segments of video data that are stored as a result of the intermittent recording of video data produced by the given video capture device 108.

The video feed for the given video capture device 108 may be associated with a metadata entry. The metadata entry includes one or more indicators that indicate temporal positions of the beginning and end of each video data segment of the video feed. The temporal position indicates the time at which a beginning or end of video data segment occurred. For example, the temporal position may indicate the real-world time at which the beginning or end of a video data segment occurred.

According to some example embodiments, the metadata entry may further include a plurality of indicators that indicate the temporal positions of the beginning and end of one or more events detected within the stored video data segment of a video feed.

Figure 3:
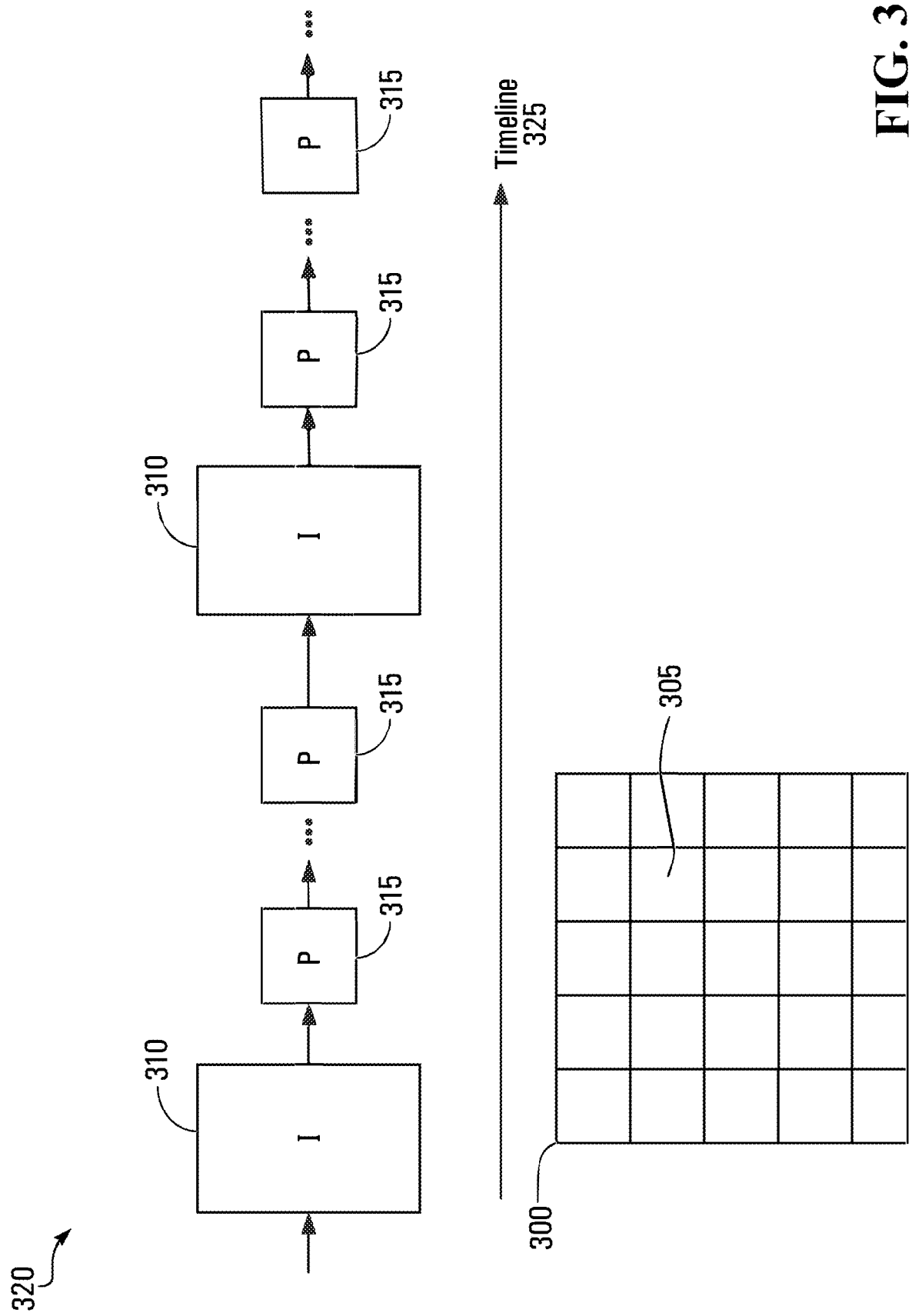
FIG. 3 illustrates a block diagram of video data generated by a video surveillance system according to one example embodiment.

Referring now to FIG. 3, therein illustrated is a block diagram of an embodiment of video data generated by the video surveillance system 100 in accordance with H.block. H.264 or MPEG-4 Part 10 is a block-oriented motion-compensation-based video compression standard of the International Telecommunication Union. It is a commonly used format for the recording, compression, and distribution of video content. Another common format that may be used is H.265.

The H.264 standard is complex, but at a high level, this compression takes a scene 300 in the field of view of a video capture device 108 and divides the scene 300 into macroblocks 305. A motion vector is associated with each of the macroblocks 305. A video stream 320 generated by H.264, for example, of 30 fps (30 frames per second) over timeline 325 where each frame comprises an I-frame 310 followed by P-frames 315. Each I-frame 310 is a full image of the scene 300 and each P-frame 315 comprises the motion vectors of each of the macroblocks 305 of the scene 300 since the time interval from the previous adjacent P-frame 315 or I-frame 310 as the case may be. The P-frame 315 is also called the inter-picture prediction frame as they include an estimate of the motion predicting where the content of the macroblocks 305 have moved in the scene 300. The P-frame 315 also contains compressed texture information. The I-frame is also called the index frame. The blocks 305 may have variable sizes such as 16×16 pixels or 8×16 pixels. The details of the H.264 standards are in the publications of the International Telecommunication Union and the high level details provided herein are only to facilitate the understanding of the embodiments disclosed herein.

The motion vectors of the P-frames have a magnitude and a direction for the motion of the pixels within the macroblocks 305. The magnitude and direction are not directly in the P frame, these two values are calculated from the shifted pixel on x and the shifted pixel on y, i.e. magnitude=square root $(x^2+y^2)$ and direction=a tan (y/x)).

Statistical models of activities or motions (direction, magnitude, presence, and absence) are created (learned) over time from the motion vectors. For a given example activity, a probability can be provided from the statistical model to indicate how common or uncommon is a given activity. At least one statistical model is calculated or generated for each block 305 over a time period, also referred to herein as an "interval". An uncommon or unusual motion (anomaly) may then be detected and highlighted to alert security personnel. In addition, the absence of motion may be considered unusual in cases where there is usually constant motion previously. Conversely, the presence of motion may be unusual motion when there has been little or no motion previously.

The statistical models are constantly learning, and may be changing, with new motion vectors received for each new frame over an interval. In an alternative embodiment, the statistical models may be fixed once built or learned and only updated periodically with new motion vectors.

Although this embodiment has been implemented using H.264, it will be understood by those of ordinary skill in the art that the embodiments described herein may be practiced using other standards such as H.265.

An approach in detecting anomalies is to learn a statistical model based on features. Features are information such as motion vectors, optical flow, detected object trajectories, and texture information. The activities, such as motion, which are dissimilar to normal patterns or that have a low probability of occurrence are reported as anomalies, i.e. unusual motion.

There may be several distinctive patterns of activity during a one day period, such as morning rush hours, lunch time, and afternoon rush hours. Furthermore, the time intervals of these patterns within the day may change over time, for example with different seasons.

Figure 4:
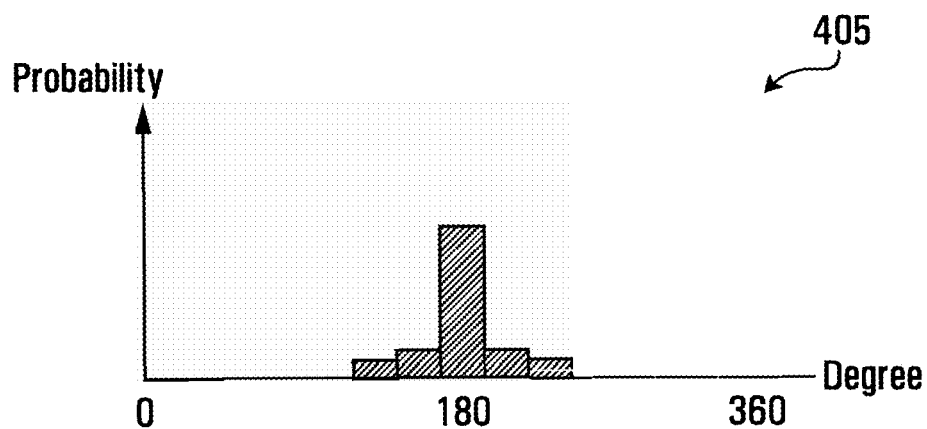
FIG. 4 illustrates graphs using motion vectors with only one dimension according to one example embodiment.
Figure 4:
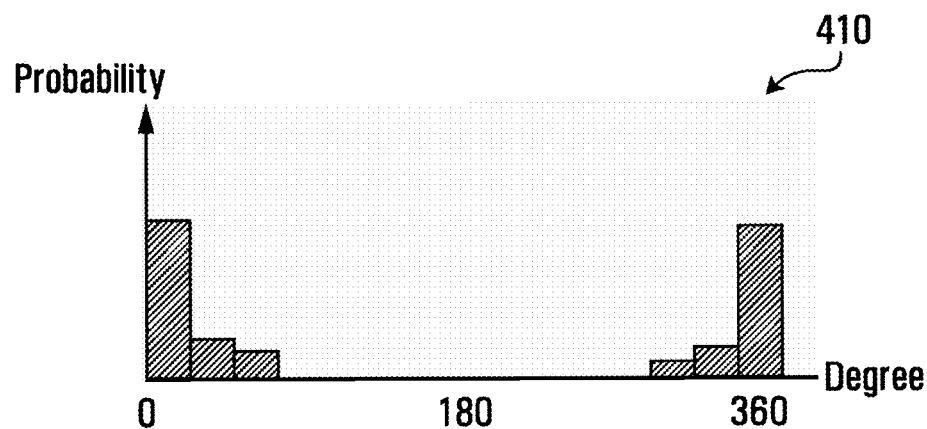
Figure 4:
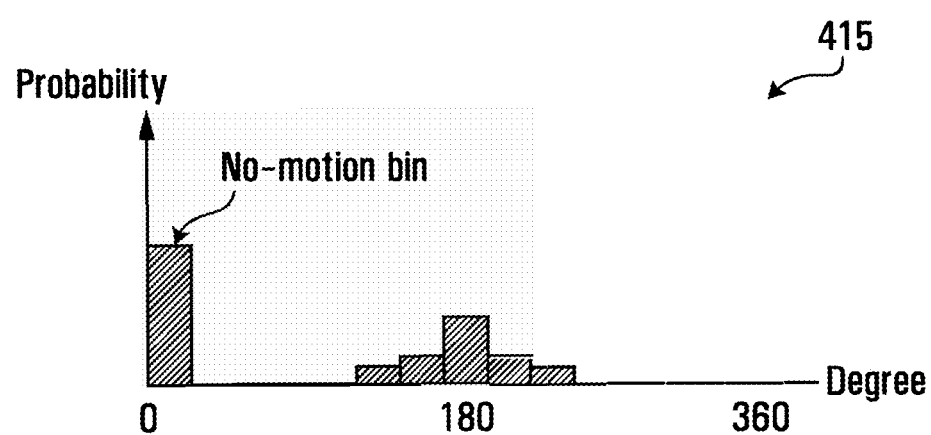

Referring now to FIG. 4, therein illustrated are three graphs using motion vectors with a single dimension, motion direction, according to one particular example embodiment. FIG. 4 shows two example graphs 405, 410 of probability distribution (histograms) for motion direction. In the graphs 405, 410, the x axis represents the degree of the direction of motion (the unit of direction) ranging from 0 to 360 degrees; the y axis represents the probability (frequency), equivalent to the number of times (counts) a specific degree (feature value) of motion occurs. Graph 405 shows that most motion is in directions corresponding to about 180 degrees. Graph 410 shows most motion is in directions around 0 (or 360) degrees, which is in the opposite direction to that shown in graph 410. These two statistical distributions are quite different, therefore, they may represent different activities, for example, graph 410 may represent cars driving to the east (0 degree) in the morning of a day in a field of view and graph 405 may represent cars driving to the west (180 degrees) in the afternoon of that day in the field of view.

FIG. 4 is a simplified example of a real world condition of a highway following a one-way direction schedule: all the cars drive from east to west during the morning (8 am-12 pm); and on the same road, all the cars must drive from west to east during the afternoon (12 pm-5 pm). If the day in the learning period is "the day" then the statistical model may not be accurate for either the morning or afternoon situation. During the morning, if a car travels from west to east, it would be an anomaly (abnormal motion direction) since normal pattern is that cars drive from east to west. However, during the afternoon, if a car travels from west to east, it would not be an anomaly since it matches the normal pattern (driving from west to east). Thus, the same motion (driving from west to east) could be an anomaly during the morning but not anomaly during the afternoon. If these two activity patterns are not distinguished during the day, anomalies cannot be detected correctly.

Further, even if all the activity patterns are known at a specific time, they may change in the future as time passes. For example, morning traffic in summer may be less intensive than the winter. The statistical models should evolve over time as the conditions of the field of views change.

For the embodiment shown in FIG. 4, an example statistical model for direction is a histogram of motion vector directions. The histogram may have twelve bins on the horizontal line and each bin corresponds to a 30 degree interval. The height of each bin represents the probability (frequency) of observed motion vectors having direction within a corresponding 30 degree bin interval. The probability (frequency) is calculated as the normalized number of observations; the number of observations for a given bin divided by the total number of observations for all the bins.

With the normalized number of observations, an additional bin may be added to the histogram (as shown in graph 415) to take into account the case of zero motion vectors (i.e. the absence of motion). This bin is referred to as a No-Motion bin. This bin does not correspond to any specific degree interval but corresponds to observing no motion vector, i.e. zero motion vector. If no motion is observed for a given frame, the No-Motion bin value is incremented and then the histogram is renormalized. In such a case the value of all bins corresponding to motion direction decreases and the value of No-Motion bin increases. If the (non-zero) motion vector is observed the value of the bin corresponding to the direction of this motion vector is incremented and then the histogram renormalized. In this case the value of the bin corresponding to this direction increases while the value of all other bins, including the No-Motion bin, decrease.

Figure 5A:
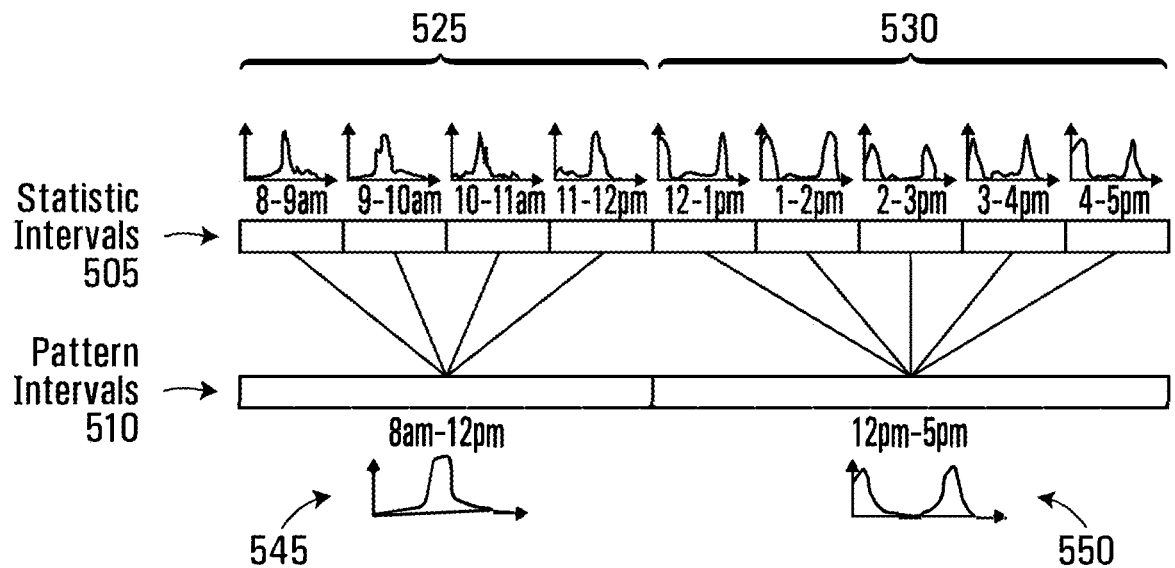
FIGS. 5A and 5B illustrate intervals and their statistics according to one example embodiment.
Figure 5B:
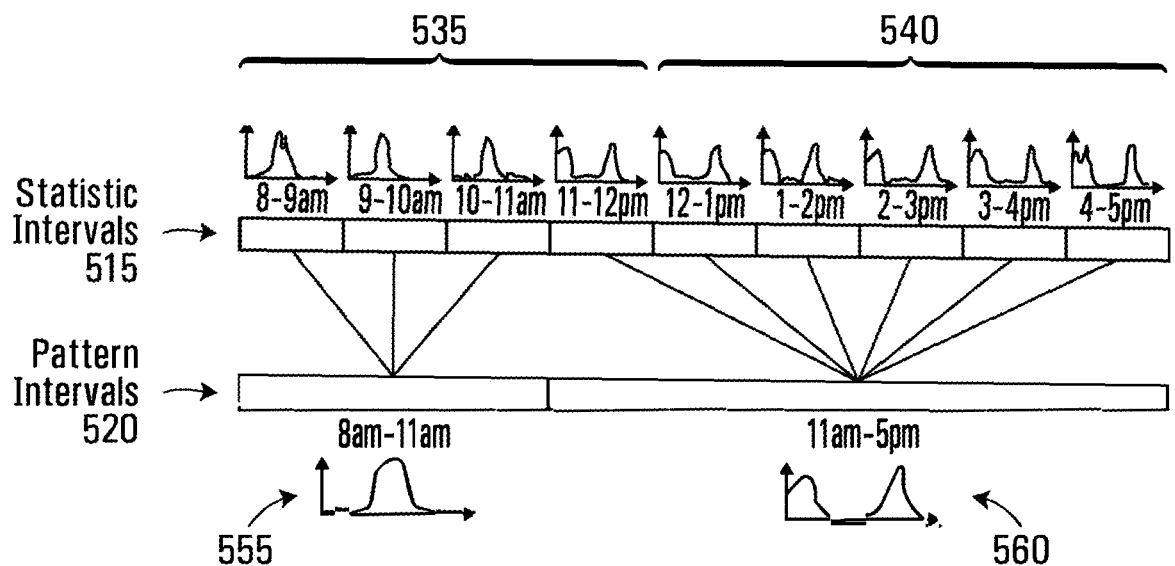

Referring now to FIGS. 5A and 5B, therein illustrated is a diagram of intervals and their statistics (presented as histograms) according to one particular example embodiment. There is shown an example of a set of statistical intervals 505, 515 and rows of pattern intervals 510, 520. FIG. 5A, using hour-based statistical intervals 505 during the daytime (8 am-5 pm), provides nine statistical intervals 505. As shown, the statistical intervals 505 are clustered into two pattern intervals (8 am-12 pm and 12 pm-5 pm) in row 510. The first pattern interval includes four statistical intervals (8-9 am, 9-10 am, 10-11 am, and 11 am-12 pm) representing the morning, which have similar statistics 545 and graphs 525. The second pattern interval includes five statistical intervals (12-1 pm, 1-2 pm, 2-3 pm, 3-4 pm, 4-5 pm) representing the afternoon, which have similar statistics 550 and graphs 530. The graphs 525, 530, 535, 540 are the statistics (histograms) learned for each interval. As shown, there are two very different sets of statistics 545, 550 in pattern interval 510.

As compared to FIG. 5A, FIG. 5B shows the case in which the pattern intervals 510 change to pattern intervals 520. After the change, the first pattern interval in 515 now includes three statistical intervals (8-9 am, 9-10 am, 10-11 am) which have similar statistics 555 and graphs 535. The second pattern interval in 515 has six statistical intervals (11 am-12 pm, 12-1 pm, 1-2 pm, 2-3 pm, 3-4 pm, and 4-5 pm) which have similar statistics 560 and graphs 540. The graphs 535, 540 are the statistics (histograms) learned for each pattern interval.

When the pattern intervals in rows 510, 520 change, the statistical intervals 505, 515 within the pattern intervals in rows 510, 520 also change. In this case, instead of four, there are three statistical intervals 515 to calculate the probabilities in the first pattern interval (8 am-11 am) in row 520. The graphs 525, graphs 535, and graph 555 have similar statistics. The graphs 530, graphs 540, and graph 560 have similar statistics, but are different from those of the graphs 525, graphs 535, and graph 555. By using the statistical intervals 505, 515, there may not be a need to begin over again when pattern intervals in rows 510, 520 change. In other words, the statistical intervals can be regrouped to form different pattern intervals to reflect changing activity or motion patterns. This regrouping of existing statistical intervals does not require relearning activity statistics (statistical models) from scratch.

Each statistical interval has statistics (a histogram) and each of the statistical intervals are combined within one or more pattern intervals to calculate the probabilities of whether or not an event or activity or motion is detected as an anomaly (e.g., unusual motion detection), i.e. these probabilities are used for identifying anomalies. A pattern interval is used as a time range within which the activities are similar.

Figure 6:
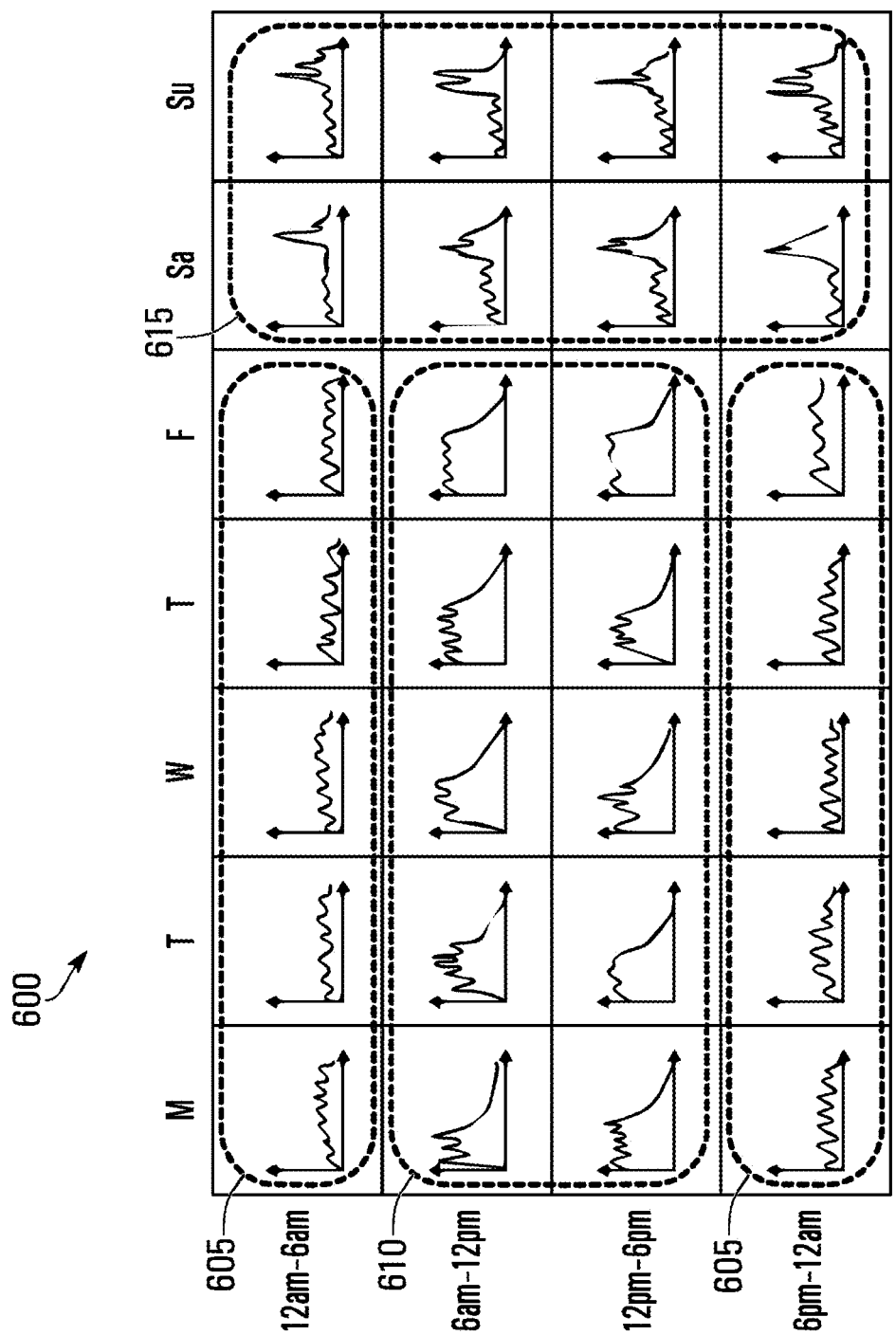
FIG. 6 illustrates an example of statistical intervals and pattern intervals during a week according to one example embodiment.

Referring now to FIG. 6, therein illustrated is an example of statistical intervals and pattern intervals in a week according to an example embodiment. The graphs inside the grid 600 represent the statistics (histograms) for each statistical interval. There are three pattern intervals in the week, 6 pm-6 am weekdays (PI 1) 605, 6 am-6 pm weekdays (PI 2) 610, and weekends (PI 3) 615. Therefore, there are three corresponding pattern intervals within the week.

FIGS. 5A, 5B, and 6 are relatively simple examples about how to define statistical intervals and pattern intervals. However, real world conditions are more complex. One statistical interval can be a group of time intervals. These time intervals can be any time period in a longer period, such as a week, for example, 8 am-9 am on Monday, 10:20 am-12:10 pm on Sunday. These time intervals can be discontinuous and have not-equal lengths. While it is preferable for statistical intervals to be relatively short in order to adapt to the changes of pattern intervals without relearning, the statistical interval should also be long enough to accumulate enough data to calculate reliable statistics.

Figure 7:
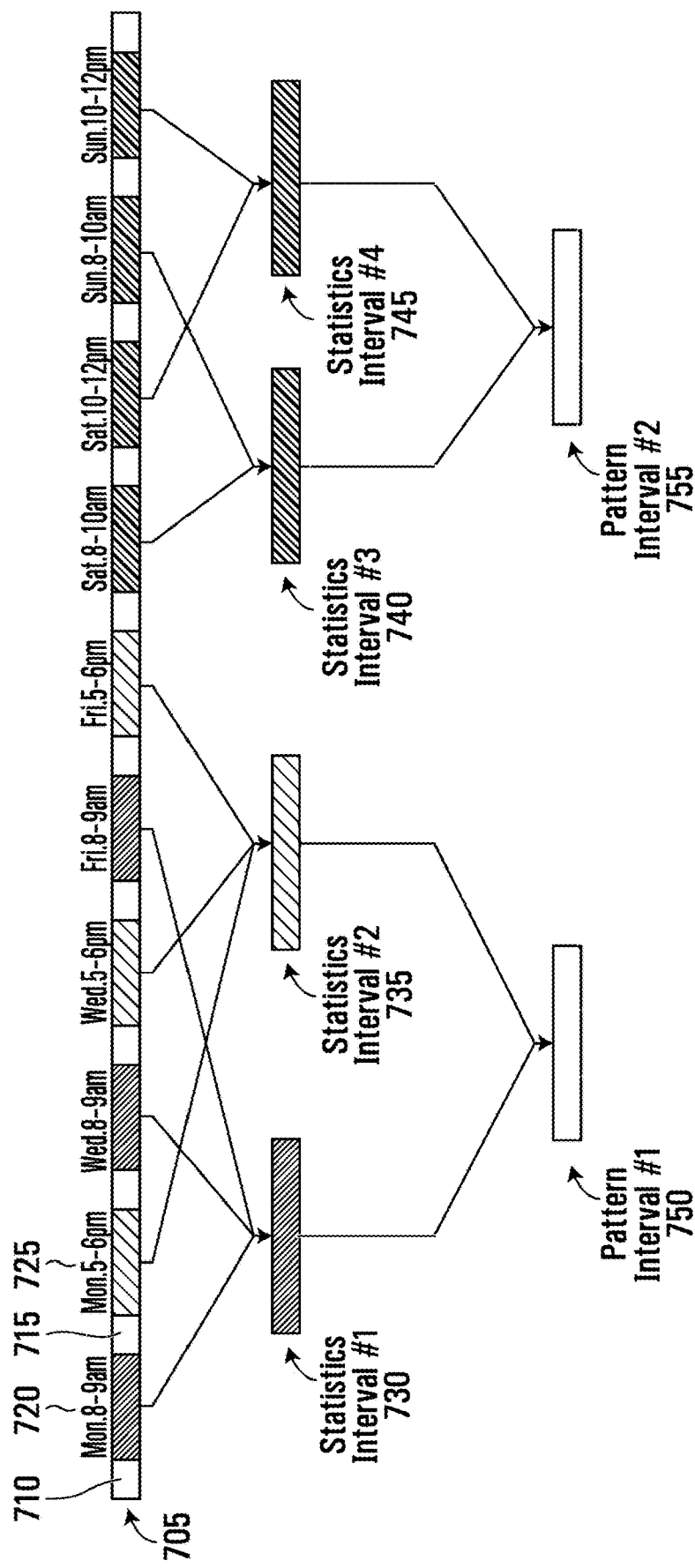
FIG. 7 illustrates an example of statistical intervals and pattern intervals during a week according to another example embodiment.

Referring now to FIG. 7, therein illustrated is an example of statistical intervals and pattern intervals in a week according to another example embodiment. The top level 705 shows time intervals in a week in one dimension. The rectangles without time notes (for example boxes 710, 715) were left blank to better illustrate this example. The rectangles with time notes (for example, time interval (Mon. 8-9 am) 720 and time interval (Mon. 5-6 pm) 725) are boxes representing the time intervals on which statistics were recorded. As shown, there are four statistical intervals 730, 735, 740, 745. Statistical interval #1 (730) is composed of three time intervals, which are 8-9 am on Monday, Wednesday, and Friday. Statistical interval #2 (735) is composed of three time intervals, which are 5-6 pm on Monday, Wednesday, and Friday. In this example, there are two pattern intervals 750, 755. Pattern interval #1 (750) includes two statistical intervals 730, 735; which are 8-9 am and 5-6 pm on Monday, Wednesday and Friday. The pattern interval #1

(750) may be, for example, the morning rush hour (8-9 am) and the evening rush hour (5-6 pm), which share similar activity or motion patterns if motion direction is not of interest, but speed of motion is of interest.

Similarly, pattern interval #2 (755) combines statistical interval #3 (740) (8-10 am on Saturday and Sunday) and statistical interval #4 (745) (10 am-12 pm on Saturday and Sunday). When the time intervals are relatively short, the statistics learned from the time intervals might be "noisy" or not robust. The time intervals, which share the similar activity patterns, may be combined into one statistical interval for more robust statistics. For greater clarity, pattern intervals are composed of statistical intervals and statistical intervals are composed of time intervals. The statistical models of the statistical intervals are constantly updated (e.g. the learning process is always running) as new motion vectors are added. As a result of this constant change, the statistics of the statistical intervals within a pattern interval may lose uniformity, in which case statistical intervals are re-grouped into new pattern intervals to support statistical interval (statistics or statistical model) uniformity within a pattern interval.

For the general case of one pattern interval with K number of statistical intervals, there is one histogram generated for each statistical interval. When a motion Hi occurs (for example motion direction is 120 degree), the calculation for the probability (p) of having this motion Hi in the pattern interval is as follows:

$$p = \sum_{i=0}^{K} w_i p_i$$

where i is the index of the ith statistical interval, $w_i$ is the percentage (weight) of time length of the ith statistical interval relative to the pattern interval, and $p_i$ is the probability of the motion calculated from Hi.

Pattern intervals may be determined manually or automatically. For example, after statistical intervals are defined and activity patterns known from an initial automatic analysis, users can define pattern intervals manually based on their knowledge of the scene by combining various statistical intervals. When pattern intervals change, users can modify the previously defined pattern intervals manually by re-assigning the statistical intervals amongst the pattern intervals.

Figure 8:
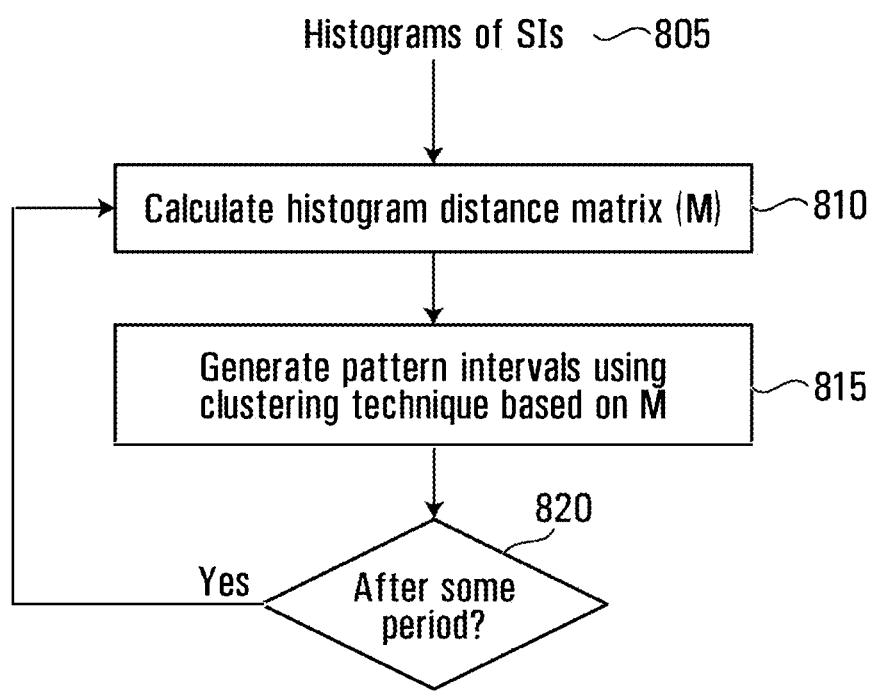
FIG. 8 illustrates a flow chart showing the process of combining statistical intervals into pattern intervals according to an example embodiment.

Referring to FIG. 8, therein illustrated is a flow chart showing a process to combine (cluster) statistical intervals into pattern intervals according to an example embodiment. The first step 805 is to record the data needed to generate the histograms (statistics) of the statistical intervals (Sis). This may be, for example, having a video capture device 108 with a field of view of a road recording and analyzing the video for motions (to generate motion vectors). The statistics may then be determined for the time intervals associated with the statistical intervals. A user may configure the time intervals and statistical intervals where the similarities and differences in conditions of a scene between time intervals may be known or partially known, otherwise default time intervals of statistical intervals may be preset, for example, at one hour, 30 minutes, 15 minutes, or 10 minutes.

Next, the histogram distances between each pair of statistical intervals are calculated (step 810). In doing this, a distance matrix (M) is generated. The matrix M dimensions are K by K. The element, $M_{ij}$, of the matrix is the histogram distance between the ith statistical interval and the jth statistical interval. A pattern interval may in some cases be a single statistical interval.

Based on the distance matrix M, an unsupervised clustering technique is applied to cluster (at step 815) the statistical intervals. The technique, for example, is K-medoids clustering. After the unsupervised clustering of step 815, the statistical intervals are clustered into clusters. One cluster corresponds to one pattern interval so the number of clusters equals the number of pattern intervals. The data points in each cluster are the statistical intervals of the pattern interval.

This clustering can be implemented automatically and re-executed after a period of time (step 820) to capture the evolution of the activity patterns. After some period, the statistical intervals can also be re-clustered manually, especially in situations in which the video surveillance system 100 provides excessive alerts or indications of anomalies which should not be anomalies.

The field of view, or scene, is divided into a grid of cells, which may be one or more macroblocks. The system learns the motion probability histograms for each cell, one for motion direction and another for motion speed. If the probability of current motion direction or motion speed for a cell is lower than a pre-defined threshold, the current motion is treated as an anomaly, i.e. unusual for that cell, in which case the cell is considered an unusual motion block (UMB).

Figure 9:
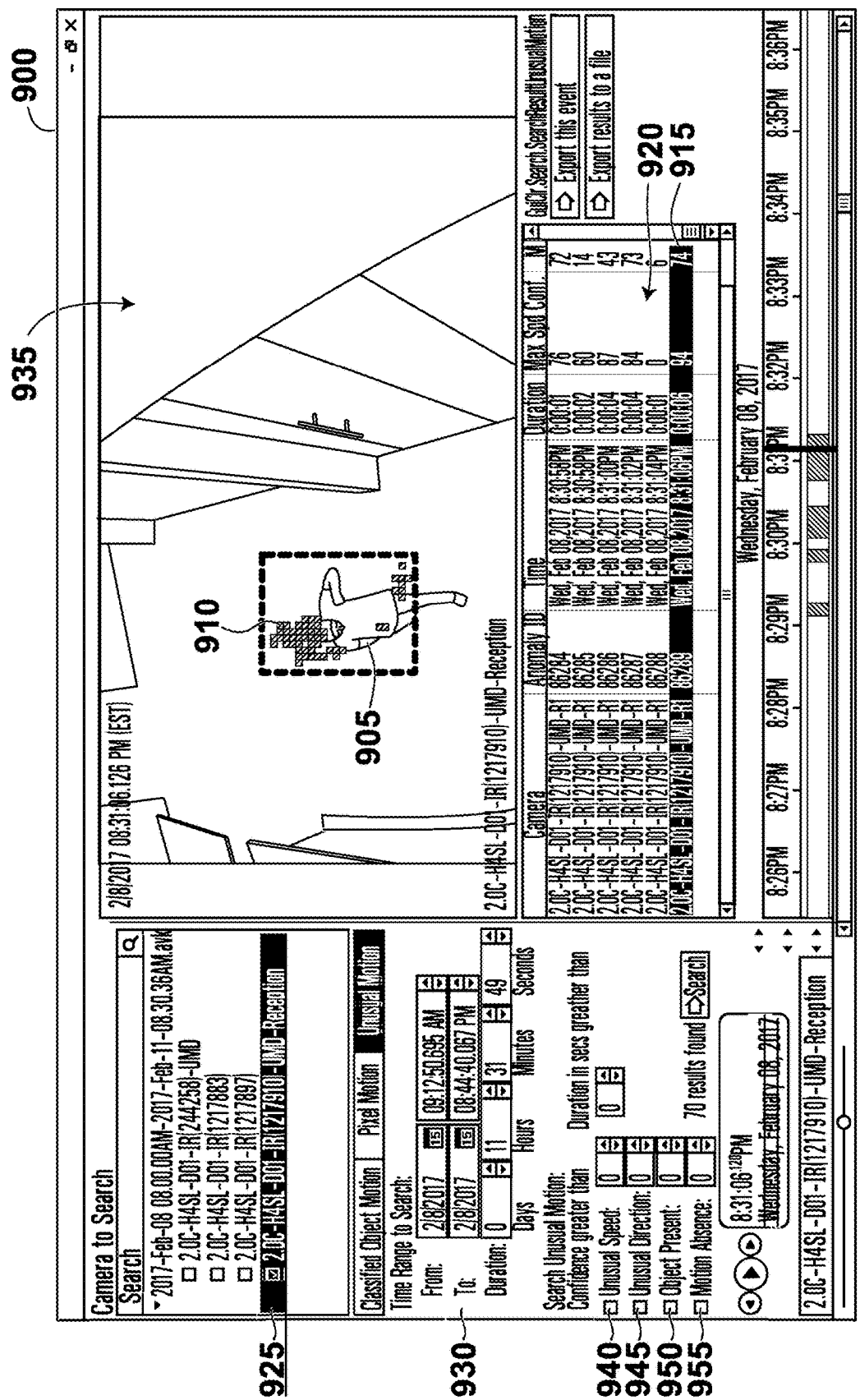
FIG. 9 illustrates a display generated by a video surveillance system according to an example embodiment.

Referring to FIG. 9, therein illustrated is a screenshot of a display generated by the video surveillance system 100 in accordance with the embodiment of FIG. 3. The screenshot 900 shows a video segment 915 in which a person 905 is moving through a hall way with UMBs 910, which are shown a translucent blocks. The UMBs 910 may trail the movement of the person 905 for better visibility. The UMBs 910 may indicate the detection of unusual motion as determined from the motion vectors of the H.264 video compression. In an example embodiment, the UMBs 910 may be colored to distinguish anomalies by type, for example a blue UMB could represent a direction anomaly and a green UMB represent a speed anomaly. In another example embodiment, arrows derived from the motion vectors could be presented on the display or on each UMB to indicate the direction and magnitude of the unusual motion. The hallway shown in scene 935 is the equivalent of scene 300 as previously described.

The screenshot 900 also shows a list of unusual motion detections in the video segments which indicate search results 920 of a recorded video file 925 over a time range and duration 930 for any unusual motion. The time intervals or time periods of the statistical intervals and pattern intervals may be selected using another interface (not shown). The search results 920 may further be filtered by activities, for example unusual speed 940, usual direction 945, object presence 950, and motion absence 955.

Motion absence 955 is the case in which there is almost always motion for a given location during a statistical interval but suddenly there is a lack of motion. For example, the motion absence filter 955 may be useful for a very busy hallway at an airport that typically has a constant motion of people. The statistical model for such a cell could have constant motion. A lack of motion detected for a time period may then trigger an absent motion detection.

In this embodiment, the search results 920 return video segments which have at least one block in the scene 935 detecting unusual motion as per the statistical models calculated for each of the blocks. In an alternative embodiment, the search results 920 only return video segments which have a certain number of blocks with unusual motion detected in order to reduce detection of unusual motion from the visual effects such as random shadows or light or moving tree leaves. In a further embodiment, the UMBs 910 are differentiated into red and green blocks (colors are not shown). Since each cell or block has learned its own statistics, the cell are independent and each cell has its own statistics (statistical model). For example, a block may be red to indicate a very rare unusual motion, but the neighboring blocks are green indicating more common unusual motion. In a further embodiment, the UMBs 910 and the learned statistics from multiple UMBs are combined to detect anomalies based on the combined information.

In this embodiment, the recorded videos 925 are stored with associated metadata of unusual motions detected in the video and their time of detection. The search for unusual motion may only be a database search of the metadata instead of a time consuming processing of the video for the search results. Each of the video capture devices 108 has a video analytics module 224. The video analytics module 224 has the statistical models for the blocks of the scene in the field of view of the respective video capture device 108. The video analytics modules 224 further includes the statistical models for each of the blocks in the scene to detect unusual motions. The unusual motion detections are generated by the video analytics module 224 and provided as part of the metadata associated with the video being captured or recorded.

In alternative embodiments, the video analytics module 224 is located in the workstation 156, client devices 164, or processing appliance 148. In these embodiments, the recorded video is processed by the video analytics module 224 using the metadata after the video recording.

While this embodiment, FIG. 9, shows the screenshot 900 of the scene 935 from recorded video 925; the scene 935 can also be shown on a display of, for example, a client device 164 of a user in near real time. The video of the scene 935 can be sent to the client devices 164 for display after processing for unusual motion detection while the video is being captured by the video capture device 108. The user would be alerted to unusual motions by the UMBs 910.

Figure 10:
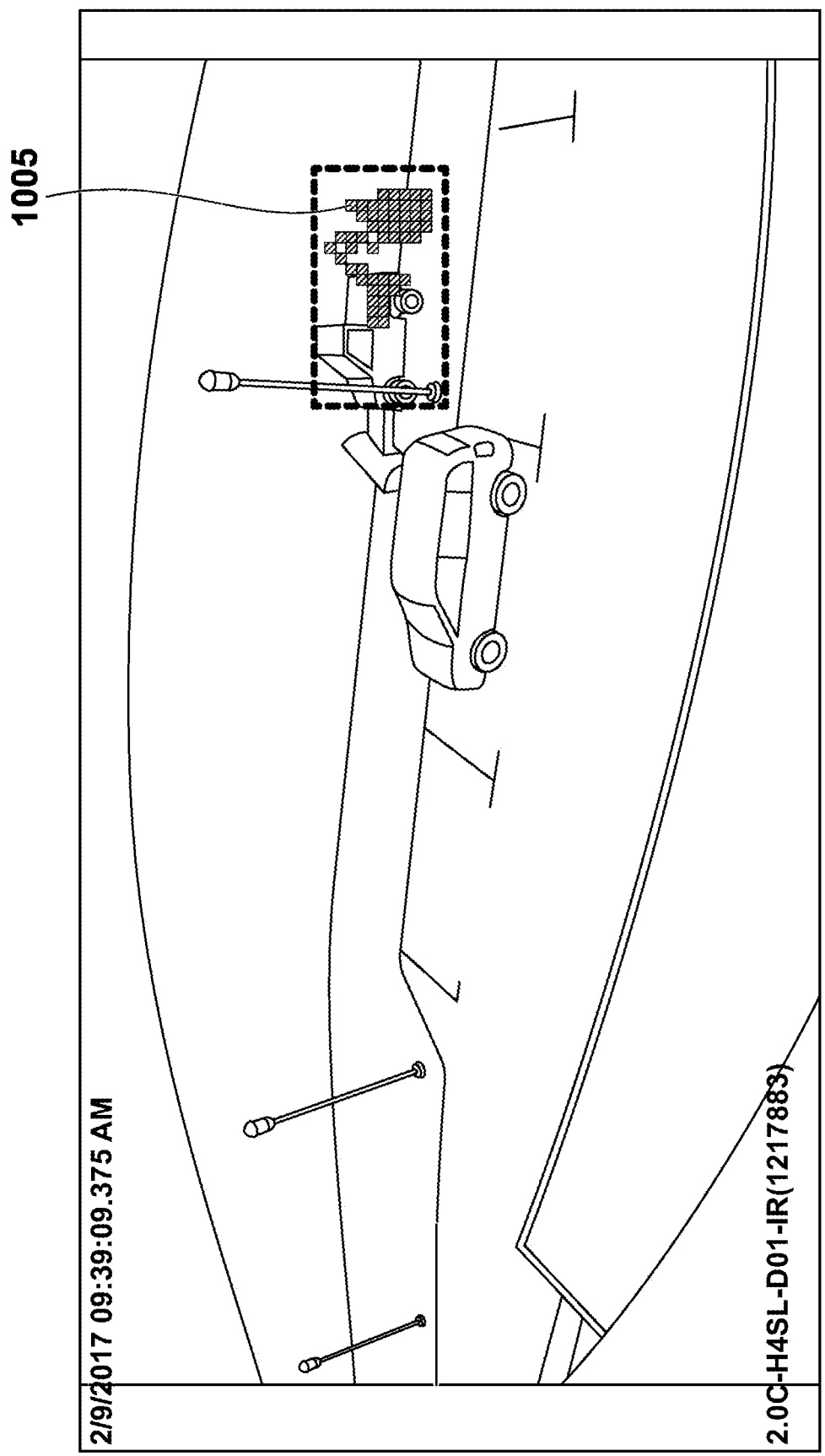
FIG. 10 illustrates another display generated by a video surveillance system according to an example embodiment.

Referring to FIG. 10, therein illustrated is a screenshot of a display generated by the video surveillance system 100 in accordance with an example embodiment. The scene has a snow plow 1005 moving relatively quickly down the sidewalk on which usually only people are walking. As shown, the snow plow 1005 has unusual motion blocks trailing indicating unusual speed. While not shown, "unusual speed" or other textual or graphic indicators may also be displayed with the group of UMBs related to the snow plow 1005.

Figure 11:
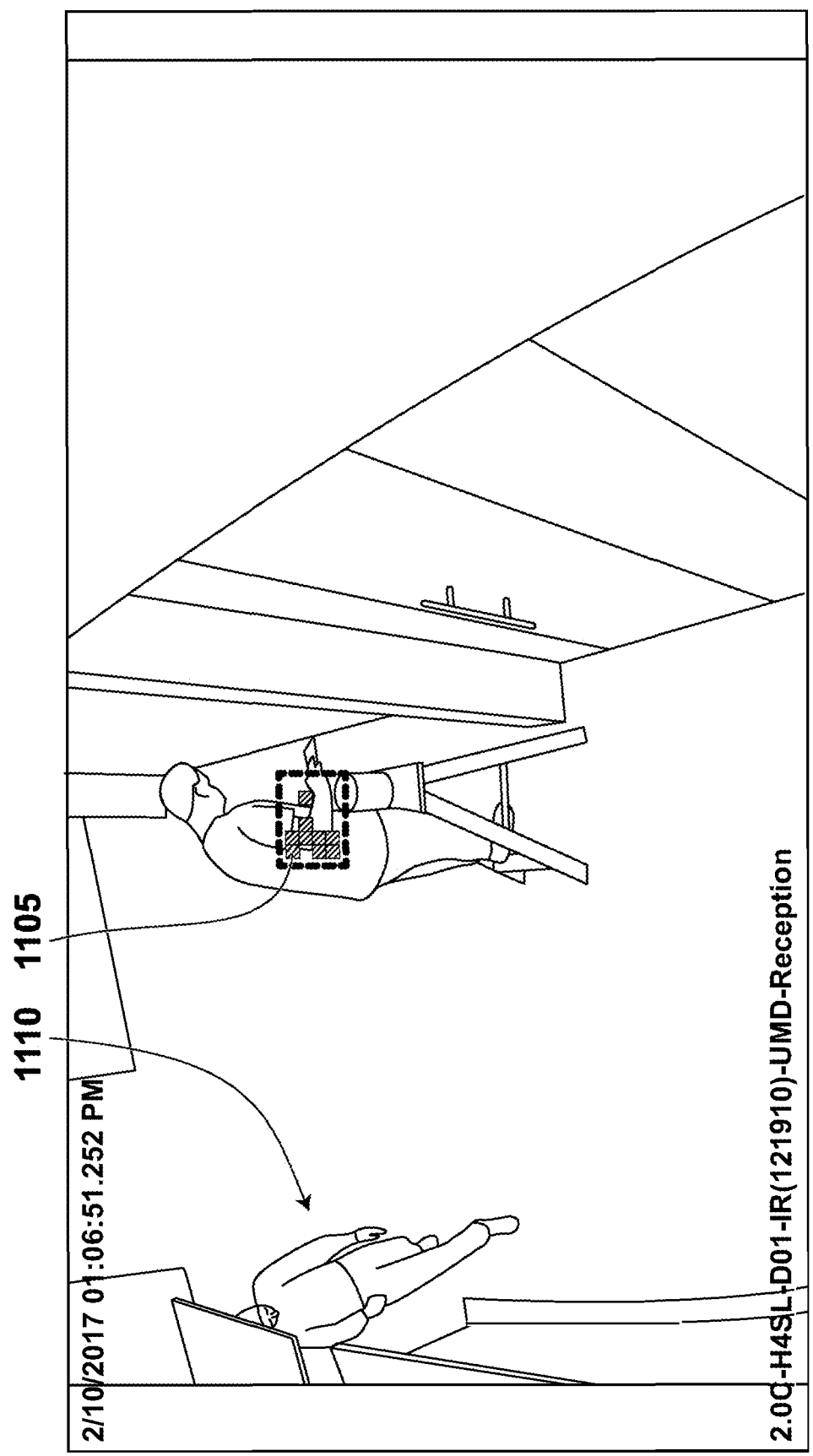
FIG. 11 illustrates another display generated by a video surveillance system according to the embodiment of FIG. 9.
Figure 12:
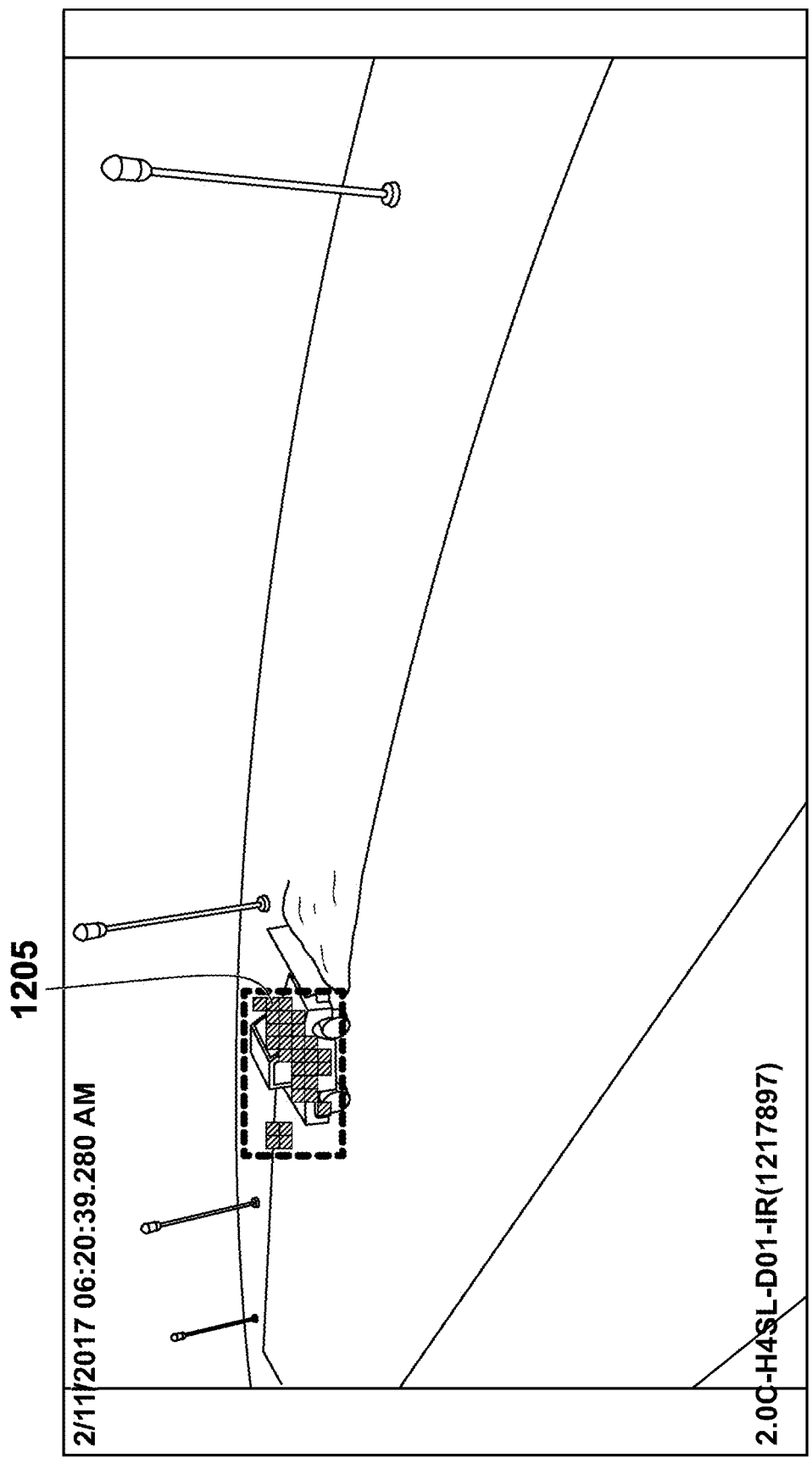
FIG. 12 illustrates another display generated by a video surveillance system according to the embodiment of FIG. 10.

Referring to FIG. 11, therein illustrated is another screenshot of a display generated by the video surveillance system 100 in accordance with the embodiment of FIG. 9. The scene shows a walking person 1110 without UMBs. This should be the case as people walking in this hallway is not unusual. The scene also shows a painter 1105 painting, but with UMBs. This should be the case as the motion of people (painter 1105) painting in this hallway is not usual. Referring to FIG. 12, therein illustrated is a screenshot of a display generated by the video surveillance system 100 in accordance with the embodiment of FIG. 10. The scene has a snow plow 1205 moving on the road, but going in the wrong direction. As shown, the snow plow 1205 has UMBs trailing indicating unusual motion. While not shown, "unusual direction" or other textual or graphic indicators may also be displayed with the group of UMBs of the snow plow 1205.

Automatic Pattern Intervals

An alternative algorithm to that described above can also be used to determine pattern intervals. In a surveillance video in most cases a scene has "well-defined" activity patterns. For example, for outdoor scenes activity patterns could be divided into daytime and nighttime, or a high activity time during some part of the day and a low activity time during the rest of the day. Activity patterns could be also different for weekdays and weekends. For indoor scenes, activity patterns may be business hours and non-business hours. For example, business hours may be 8 am-7 pm on Monday, Wednesday, and Thursday and the rest of week is non-business hours.

In general, motion patterns repeat themselves within day or week intervals allowing pattern intervals to be identified in a time interval, for example a week. To identify these patterns a week long interval can be divided into discrete time period intervals, whether these time period intervals are uniform or not, and motion statistics (features) can be calculated for each discrete time period. In the example disclosed below, an hour will be used as the discrete time period interval. The statistics associated with each discrete time period interval may be the statistics used for probability calculation and anomaly detection, such as the distributions and histograms of motion vector magnitude and direction; however different features can be added to or used instead of the features used for the probability calculations. Experiments demonstrated that the noisiness of motion vectors as a feature provided good clustering results. Use of target-related metadata for probability calculations (e.g., histogram generation) and anomaly detection also provides advantages in many implementations, as will be described in further detail below.

Pattern intervals are defined through the process of clustering statistics for different discrete time period intervals so that the discrete intervals with similar statistics are placed in the same cluster, which is used as a pattern interval. The number of clusters used can vary. Before the clustering algorithm is run, statistics are accumulated for all discrete time period intervals in a period such as a week. The clustering runs in two stages: day level and hour level. In the first stage, clusters of days are identified. By comparing the collections of statistics for discrete time periods (e.g. hours) for all days, one or two clusters of days may be identified. The two clusters of days usually correspond to weekdays and weekends. If statistics for all days are similar, all days may be placed in a single cluster. Then statistics of discrete time period intervals (e.g. hours) within each day level cluster are clustered so that each day level cluster may have one or two hour level clusters (intervals). These hour level clusters often correspond to daytime and nighttime, or business hours and non-business hours. However, as before it is possible that in the activity for all the hours in each day in a cluster of days is similar and cannot be distinguished into two different patterns. In this case, all the hours in that cluster of days is considered as one cluster of hour intervals.

The hour level clusters may not be contiguous. The above solution limits the intervals used to a maximum of four pattern intervals which fits most real world surveillance systems 100 in which the motion in the field of view of a video capture device 108 changes on a weekday vs. weekend basis and a day vs. night basis. In an alternative embodiment, more than two clusters can be identified.

Figure 20:
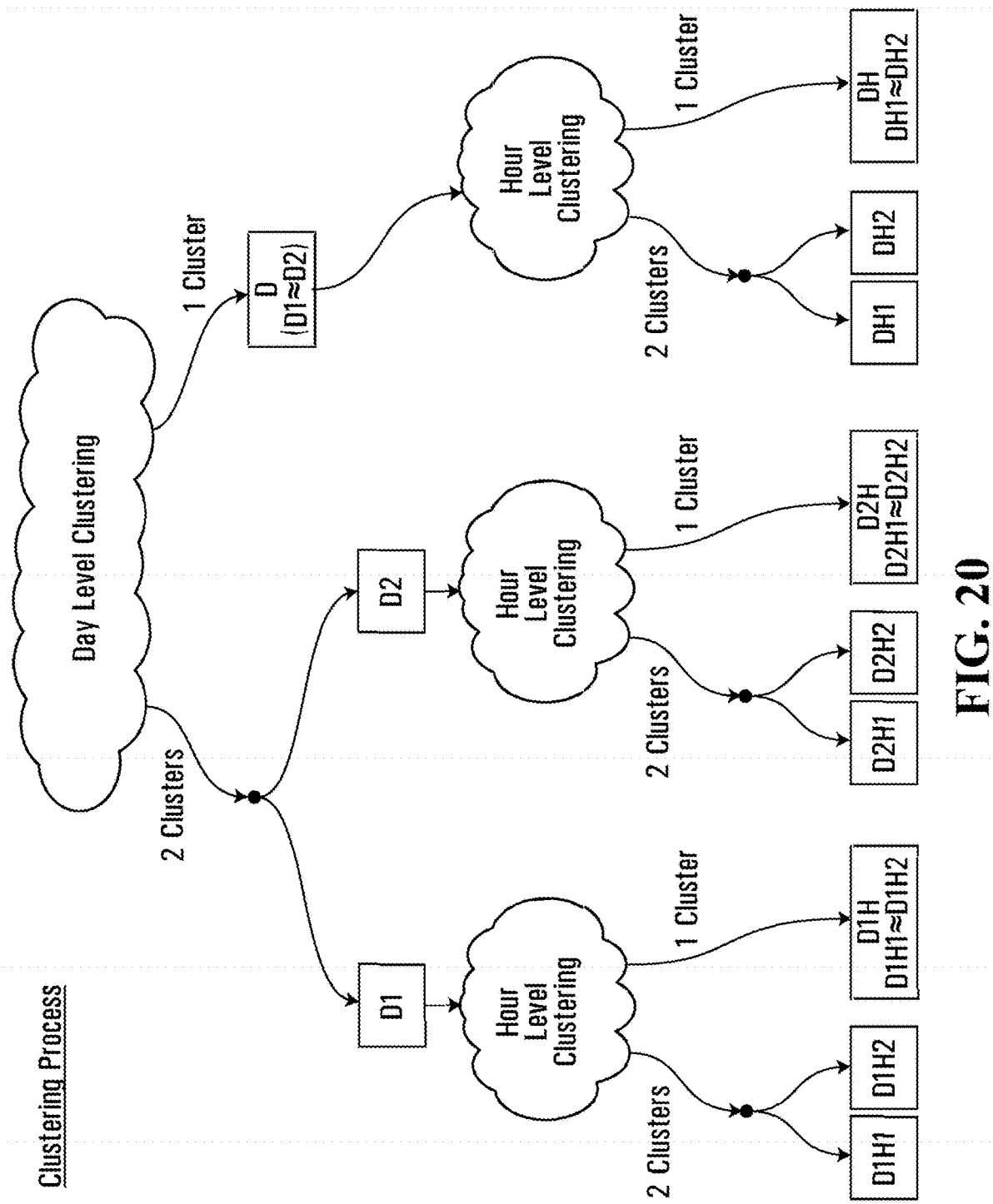
FIG. 20 illustrates a decision tree for the clustering process according to an example embodiment.

FIG. 20 illustrates a decision tree showing the above described clustering process, according to an embodiment. At the day level clustering decision, either two day level clusters are formed, D1 and D2, or one day level cluster D is formed, in the case in which D1 is approximately similar to D2. Each day level cluster, either both D1 and D2, or just D, go through the hour level clustering. Each hour level clustering process results in either two hour level clusters, H1 and H2, or one hour level cluster H, in the case in which H1 is approximately similar to H2. The end result is that there are five possible cluster combinations as illustrated in FIG. 22, according to an embodiment. These are: (1) D1H1, D1H2; D2H1; and D2H2; (2) D1H; D2H1; and D2H2; (3) D1H1; D1H2; and D2H; (4) D1H and D2H; and (5) DH.

FIG. 21 illustrates an example of a typical distribution of clusters after the clustering process according to an embodiment. As shown, D1 represents Sunday and Saturday and D2 represents Monday to Friday. Within D1, H1 represents times in the evening and early morning; and H2 represents the daytime. Within D2, H1 represents longer times in the evening and morning and H2 represents typical working hours and travel hours.

If only one pattern interval is identified, it would be the whole week; if there are two pattern intervals, they may, for example, be 7 am-7 pm for the whole week (daytime for outdoor scene), and 7 pm-7 am for the whole week (night time for outdoor scene); if there are three pattern intervals, they may be, for example, 9 am-9 pm for Monday to Friday (working hours during weekday), 9 pm-9 am for Monday to Friday (non-working hours during weekday) and 24 hours for Saturday and Sunday (the weekend); if there are four pattern intervals, they may be, for example, 7 am-11 pm for Monday to Friday (working hours during weekday), 11 pm-7 am for Monday to Friday (non-working hours during weekday), 11 am-6 pm for Saturday and Sunday (activity time during weekend), and 6 pm-11 am for Saturday and Sunday (non-activity time during weekend).

The above limitations simplify calculations (and save processing time) and cover most situations. In the example set out below, one hour is used as a discretization unit in an algorithm, i.e. activity statistics are compared for each hour to identify patterns. In implementation other discretization units could be substituted.

Figure 13:
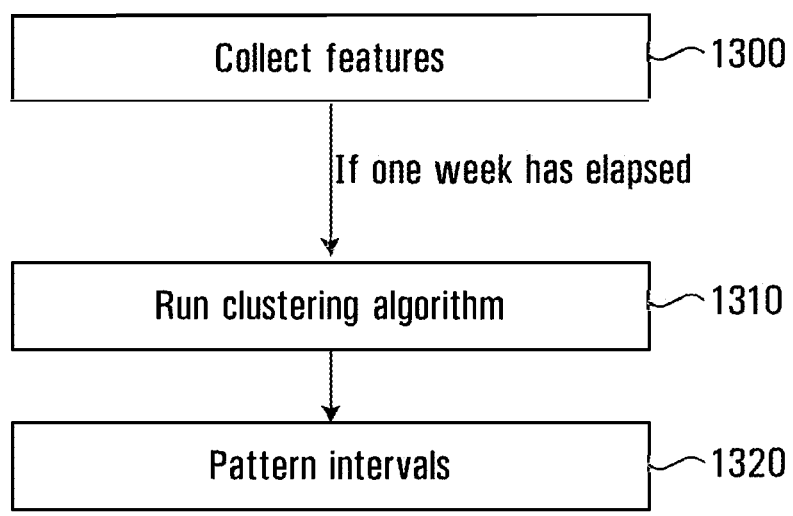
FIG. 13 illustrates a flow chart of an algorithm workflow according to an example embodiment.

Referring to FIG. 13, therein illustrated is an algorithm workflow in accordance with an example embodiment. At step 1300, statistical parameters based on features are calculated and collected; these features describe the activity for each hour interval during a week, so that there will be 24×7=168 intervals. At step 1310, a clustering algorithm is run to identify clusters among the hour interval features. The output, step 1320, of the algorithm is clusters that define pattern intervals within the week.

The updating of the statistics (features) for each discrete time interval (hour) may run constantly (i.e. after each frame), while the clustering algorithm runs periodically. In a typical implementation, a clustering algorithm will be run every week.

Hour statistics (x) update for each frame t using exponential averaging of a feature observation (s) for frame t:

$$x(t) = \frac{s(t)}{N} + x(t-1)\frac{N-1}{N} \quad (1)$$

wherein N is a parameter of the algorithm which is interpreted as the effective number of frames in averaging interval. For t<N the simple moving averaging or bias correction for exponential average is used. In a typical implementation the value N is equal to the total number of frames in 8 hours, which means that statistics are collected over the past 8 hours or 8 weeks of calendar time for each hour interval. The parameter N governs the trade-off between robustness (amount of statistics) and flexibility, i.e. adaptation to activity change (for example due to seasons, daytime savings, etc.).

The discrete time interval statistics might be the same statistics used for probability calculation and eventually for anomaly detection, e.g. distribution/histograms of motion vector magnitude and direction. However, it is useful to consider different features as an addition to or instead of the features used for probability calculations. Experiments demonstrated that using the noisiness of motion vectors (as described below) provide good clustering results.

Each compression macroblock in a video frame may or may not have a motion vector associated with it. Temporal filtering may be used to check consistency of the motion vectors in location and time and to filter out the motion vectors that are noise and do not correspond to real moving objects. Thus, for each frame the ratio of the number of noisy motion vectors to the total number of motion vectors is calculated. This ratio may be used as a one dimensional feature in the clustering algorithm. In general, more statistical parameters may be extracted and used as a multi-dimensional feature for clustering.

The one dimensional feature is averaged (using exponential smoothing as described above). In an example embodiment, 24×7 averaged statistics are collected, one for each hour in a week, to create 24×7 values. These values are clustered to identify pattern intervals as described below.

Basically, the one dimensional feature describes the noisiness of motion vectors in a given scene for different hour intervals. The reasons for selecting the one dimensional feature is that during night (low illumination condition) or non-activity time, the noisiness of motion vectors tends to be higher than during day or activity time. Therefore, the one dimensional feature can be used to distinguish these different patterns in a scene.

Figure 14:
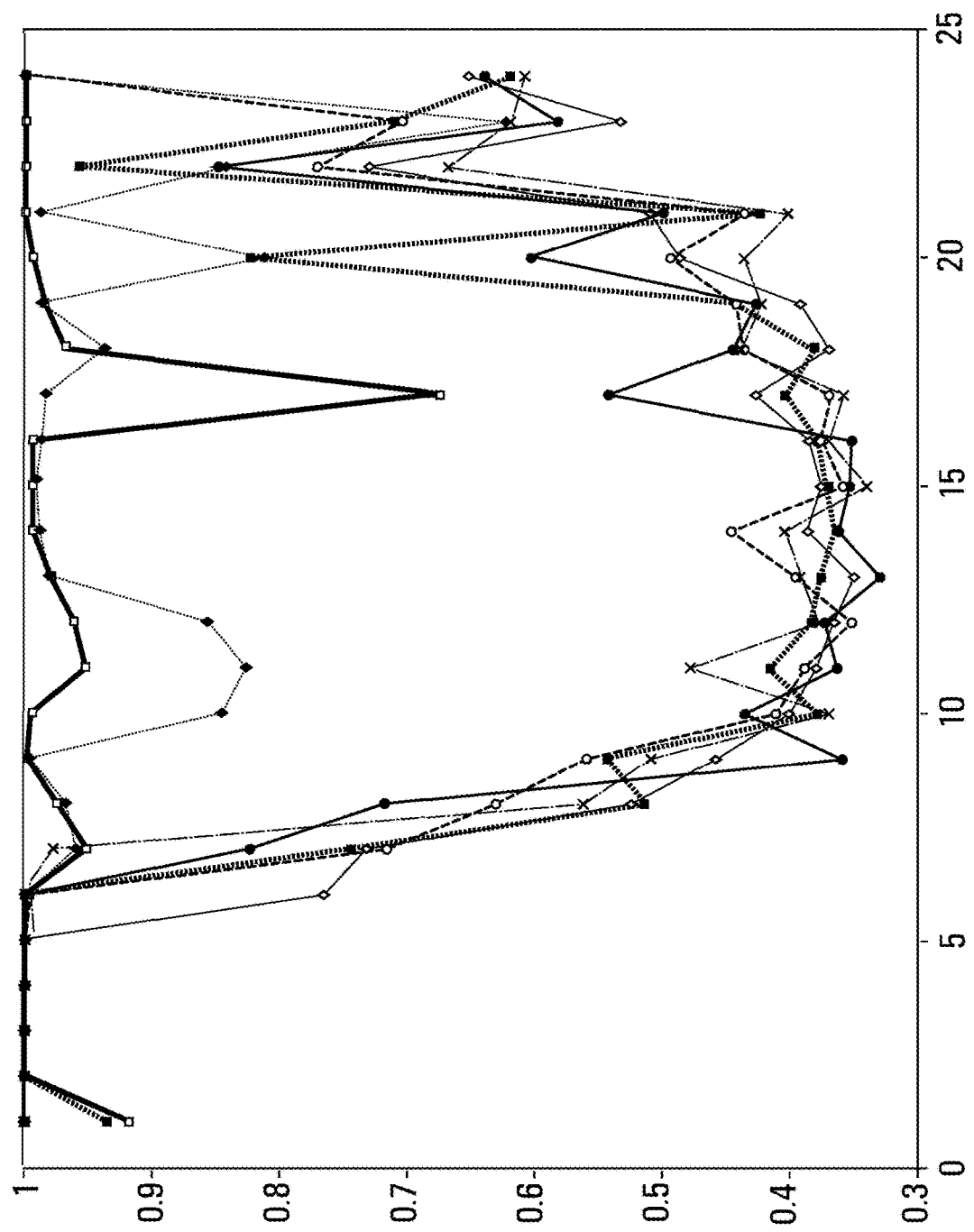
FIG. 14 illustrates a chart showing the noisiness of motion vectors according to an example embodiment.

An embodiment of an example of the one dimensional features collected from a week of data for an indoor office is shown in FIG. 14, in which the X axis represents the time for each hour [1 to 24]; and the Y axis represents the noisiness of motion vectors, [0 to 1]. The different lines represent different days in a week. Each of the seven lines in FIG. 14 correspond to a day in a week. From FIG. 14, it is shown in this example, that during non-working hours (including the weekend), the noisy motion level is much higher than during working hours because there are fewer activities during the non-working hours.

Figure 15:
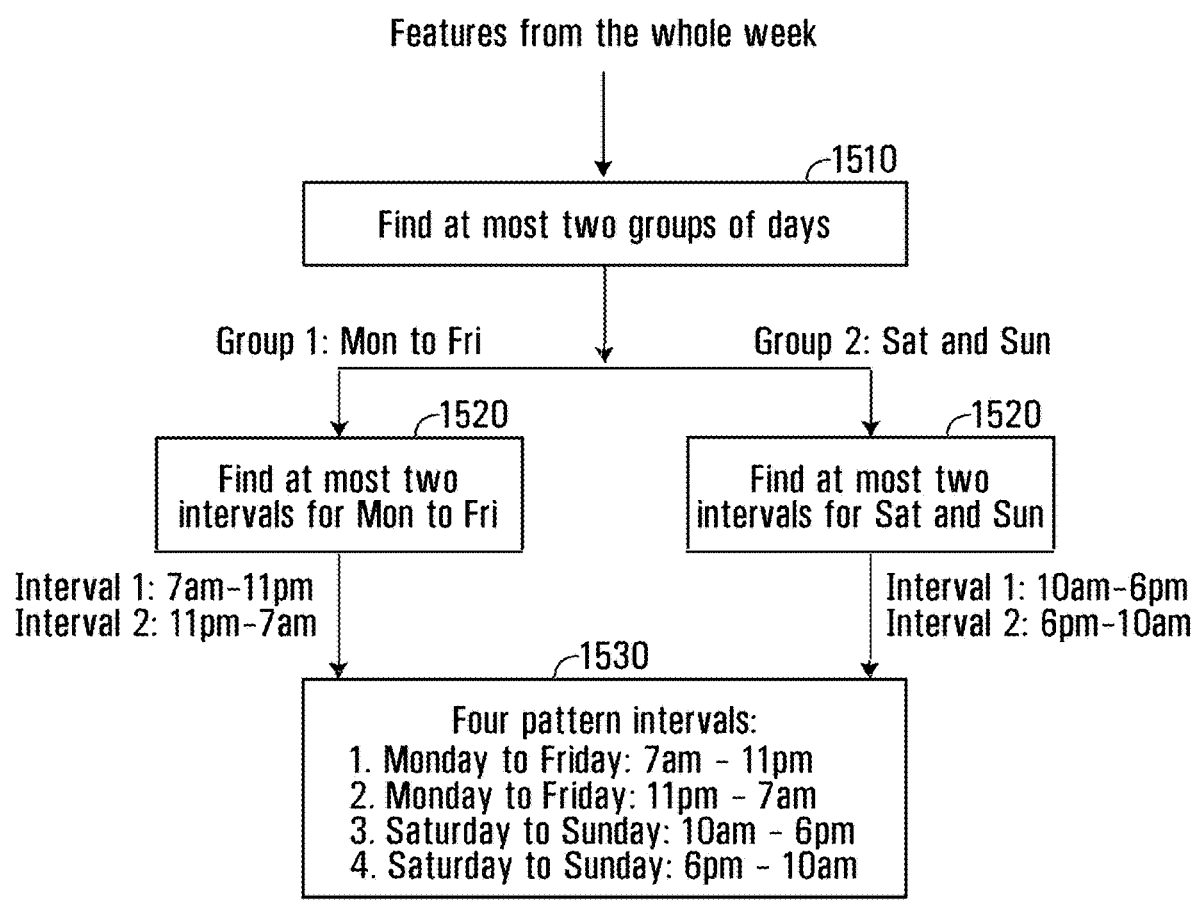
FIG. 15 illustrates a flow chart showing a clustering algorithm according to an example embodiment.

Based on the feature described above, the clustering algorithm can be performed to generate pattern intervals for a week. There may be two steps in the clustering algorithm, an example embodiment of which is shown in FIG. 15.

In the first step 1510, the clustering algorithm is run on the feature for the whole week to obtain at most two (not necessarily contiguous) groups of days (i.e. two clusters) in a week.

Typically, in this step, work days vs non-work days are determined and the seven days in a week are partitioned into two groups. Note that it is also possible that the whole week (i.e. all 7 days) belongs to a single cluster/group. As an example, in the embodiment show in FIG. 15, the two clusters/groups represent weekdays and weekends, respectively.

In the second step 1520, for each cluster (i.e. each group of days) obtained in step 1510, the similar clustering algorithm runs on the feature collected from the days in this group to obtain at most two time intervals for this group of days resulting in no more than four intervals (step 1530).

This step is typically used to determine day time vs. night time, or activity time vs. non-activity time. Note that it is possible that the whole day (24 hours) in a given group of days belongs to one cluster, which means two different patterns during these days cannot be distinguished.

Since the algorithm determines at most two clusters for days in a week, the number of possible combinations to check is $c_7^7+c_7^6+c_7^5+c_7^4$, where $C_m^n$ is the combination (without repletion) of m elements from collection of n elements: $c_7^7$ means there are 7 days as one group, $c_7^6$ means that there are any 6 days as one group and the rest as one day as another group. In order to find out the best combination of days for motion patterns, a segmentation algorithm, such as the Otsu segmentation algorithm can be used. To this end, for each combination of days the sum (V) of the (not normalized) intra class variance is calculated as:

$$V = \sum_C \sum_i (d_i^c)^2 \qquad (2)$$

where $d_i^c$ is the distance between nosiness of motion vectors for day i in the cluster c and the average noisiness for all days in the cluster c. The outer sum in this equation is taken over clusters c. The number of clusters can be 1 or 2. If the number of clusters is 1, it means no outer summation (see explanation for 1 cluster case below). The difference with the traditional Otsu method is that multidimensional variables are clustered: noisiness for each day is a 24 dimensional value, each dimension corresponds to noisiness for a one hour interval. A squared distance between multidimensional noisiness for two different days is defined as the sum of squares of difference for each hour intervals. In this line the squared distance between noisiness for a given day i and the average day nosiness from cluster c is calculated as:

$$(d_i^c)^2 = \sum_h (x_h^i - \mu_h^c)^2 \qquad (3)$$

where $x_h^i$ is noisiness for hour h for day i (for example, the noisiness for time interval 3 pm-4 pm on Wednesday) and $\mu_h^c$ is the averaged noisiness for all days in cluster c (for example, Monday, Tuesday, Wednesday, and Thursday). $\mu_h^c$ is 24 dimensional vector: h=1, 2, ..., 24. h-th element of this vector is defined as:

$$\mu_h^c = \frac{1}{N_c} \sum_{j \in C} x_h^j \qquad (4)$$

The sum in eq. (3) over h is taken for 24 hour intervals, i.e. 24 summations. The sum in eq. (4) is taken over all days (index j) that belong to a given cluster c. $N_c$ in eq. (4) is the number of days in the cluster c.

To make a connection of the formulation to other formulations of the Otsu algorithm and a discriminant method, such as the Fisher discriminant method, the normalized intra class variance $\sigma_c^2$ can be used, defined as:

$$\sigma_c^2 = \frac{1}{N_c} \sum_{i \in C} \sum_h (x_h^i - \mu_h^c)^2 \qquad (5)$$

In this formulation, instead of V (see eq. (2)) the expression for V/N can be used:

$$\sum_c w_c \sigma_c^2 \qquad (6)$$

where $w_c = N_c/N$ is the probability that a day belongs to the cluster c. N is equal to 7, the number of days in a week.

In the line of Otsu segmenting method, after calculating V or V/N for each possible combinations of days in two groups the combination which corresponds to the minimum of V can be determined. That combination provides a choice of pattern interval for days. The formulation (eq. (2)) allows the Otsu method to be extended to compare the value V not only for different combinations of days in two groups but also to compare V for two groups with V for one group (no summation over c in eq. (2)). Thus, the best pattern intervals for days among all $c_7^7+c_7^6+c_7^5+c_7^4$ combinations can be determined by selecting the case that corresponds to minimum of V. The results from this step could be only one group of the days, e.g. Sunday-Saturday; or two groups, e.g. Monday-Friday and Saturday-Sunday.

After clusters for groups of days have been determined, for each group of days a similar approach is applied for clustering hour intervals into at most two groups. The approach is the same as described above with the only difference that now we are dealing with a simpler case: one dimensional feature vs 24 dimensional feature. For each group of days, we calculate V as follows:

$$V = \sum_c \sum_h (\tilde{x}_h - \mu^c)^2 \qquad (7)$$

where $\tilde{x}_h$ is the average noisiness of hour interval h for this group of days, $\mu^c$ is the average nosiness for the all hour intervals in cluster c. Here the number of clusters could also be 1 or 2. A one cluster case means the all 24 hour intervals are combined in a single group of time intervals. More precisely, $\tilde{x}_h$ and $\mu^c$ are defined as $$\tilde{x}_h = \frac{1}{N_c} \sum_{i \in C} x_h^i \qquad (8)$$

$$\mu^c = \frac{1}{M_c} \sum_{h \in C} \tilde{x}_h \qquad (9)$$

where $N_c$ is the number of days in the group, and $M_c$ is the number of hour intervals in cluster c.

Since we limit the inquiry to find at most two time intervals in a day, theoretically the possible number of combinations is $\sum_{i=1}^{12} c_{24}^i$. However, some constraints can be introduced. For example, only contiguous intervals may be considered. Also, only intervals containing at least three hours may be considered. Also, the circular nature of the 24 hour interval means that the time point 24:00 is the same as the time point 00.00. After applying these constraints, the possible number of combinations to consider is reduced to 24*(12−3).

The same approach can be used to calculate the intra class variance (eq. (7)) for each combination of hour intervals. The combination which has the minimum value V would provide cluster options. Again, as before, the value of V for both two clusters and one cluster cases can be compared.

For example, as a result of clustering the following may be determined: for Sunday-Saturday there is only one time interval, 00:00-24:00; for Monday-Friday there are two time intervals, 7 am-7 pm and 7 pm-7 am.

Sometimes for both cases of clustering (for day and hour intervals) it may be preferable to choose the one cluster option over the two cluster option if the difference between these options is small. The reason for that is one cluster option provides larger statistics and might be more reliable for anomaly detections. To this end, besides the sums of intra class variances V (eq. (1) or (7)) for two cluster options, the Fisher discriminant can also be calculated. In cases when the Fisher discriminant is smaller than the predefined threshold the option of one cluster can be chosen even if this option corresponds to larger V.

User Interface

Figure 16:
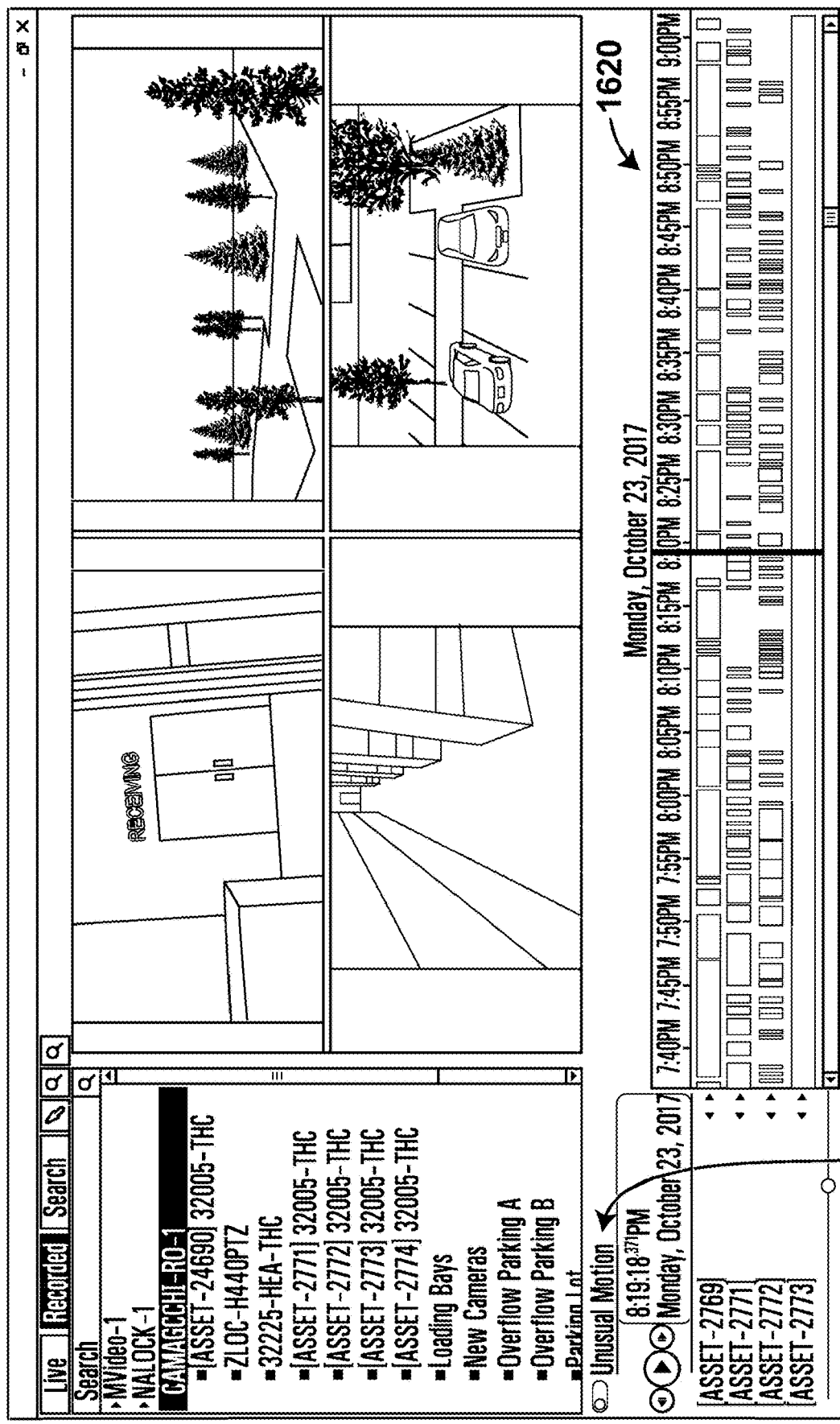
FIG. 16 illustrates a user interface according to an example embodiment.

FIGS. 16 to 19 illustrate an embodiment of a user interface according to an aspect of the invention. As shown in FIG. 16, the feature described herein may be activated by a toggle 1610. FIG. 16 illustrates a user interface wherein the toggle is "off" and unusual motion is not being flagged. In this position the user interface displays recorded video (which may be displayed in one color) and motion pixel detection results (which may be displayed in a different color).

Figure 17:
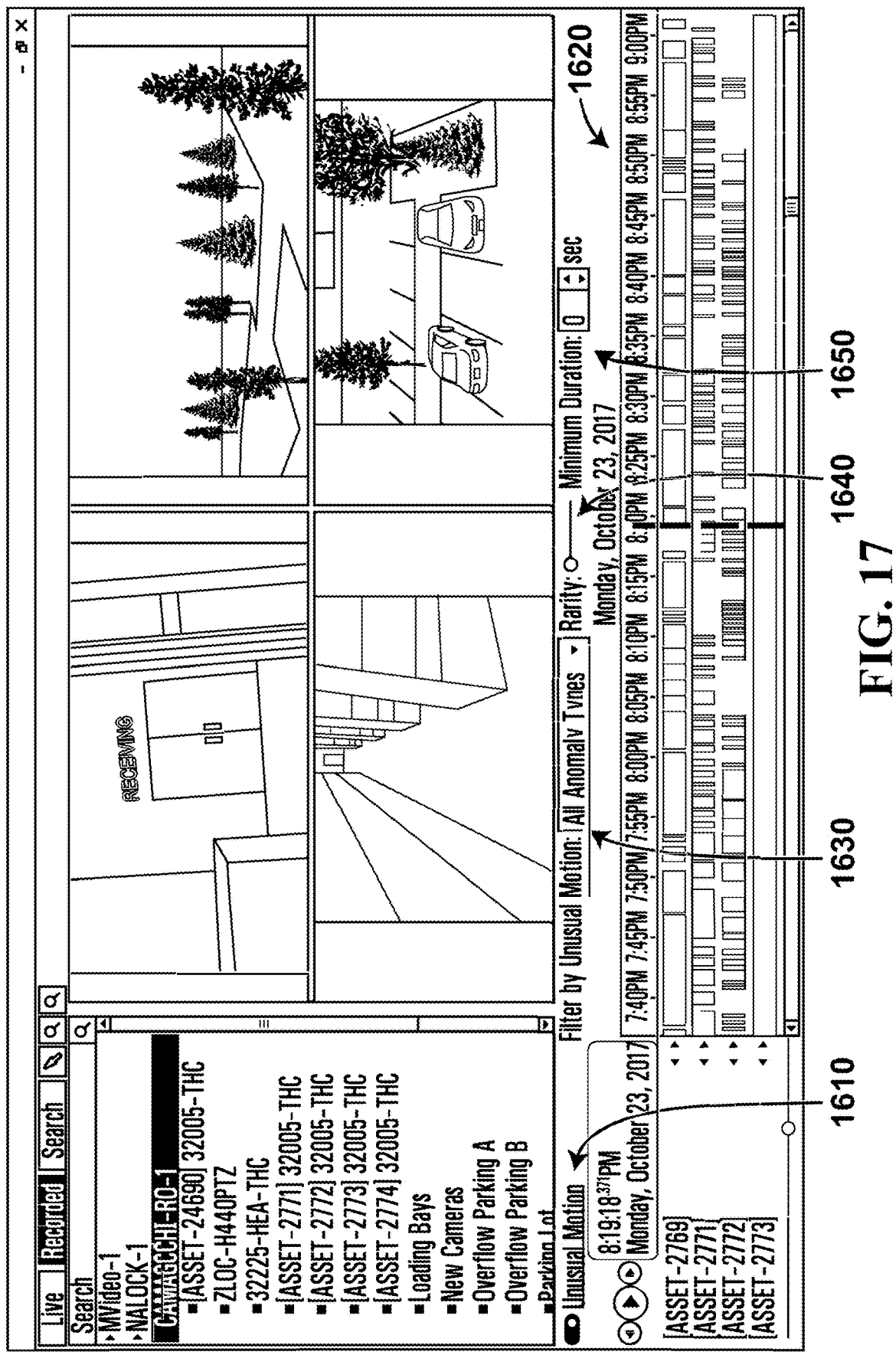
FIG. 17 illustrates a user interface showing filter options according to an example embodiment.
Figure 18:
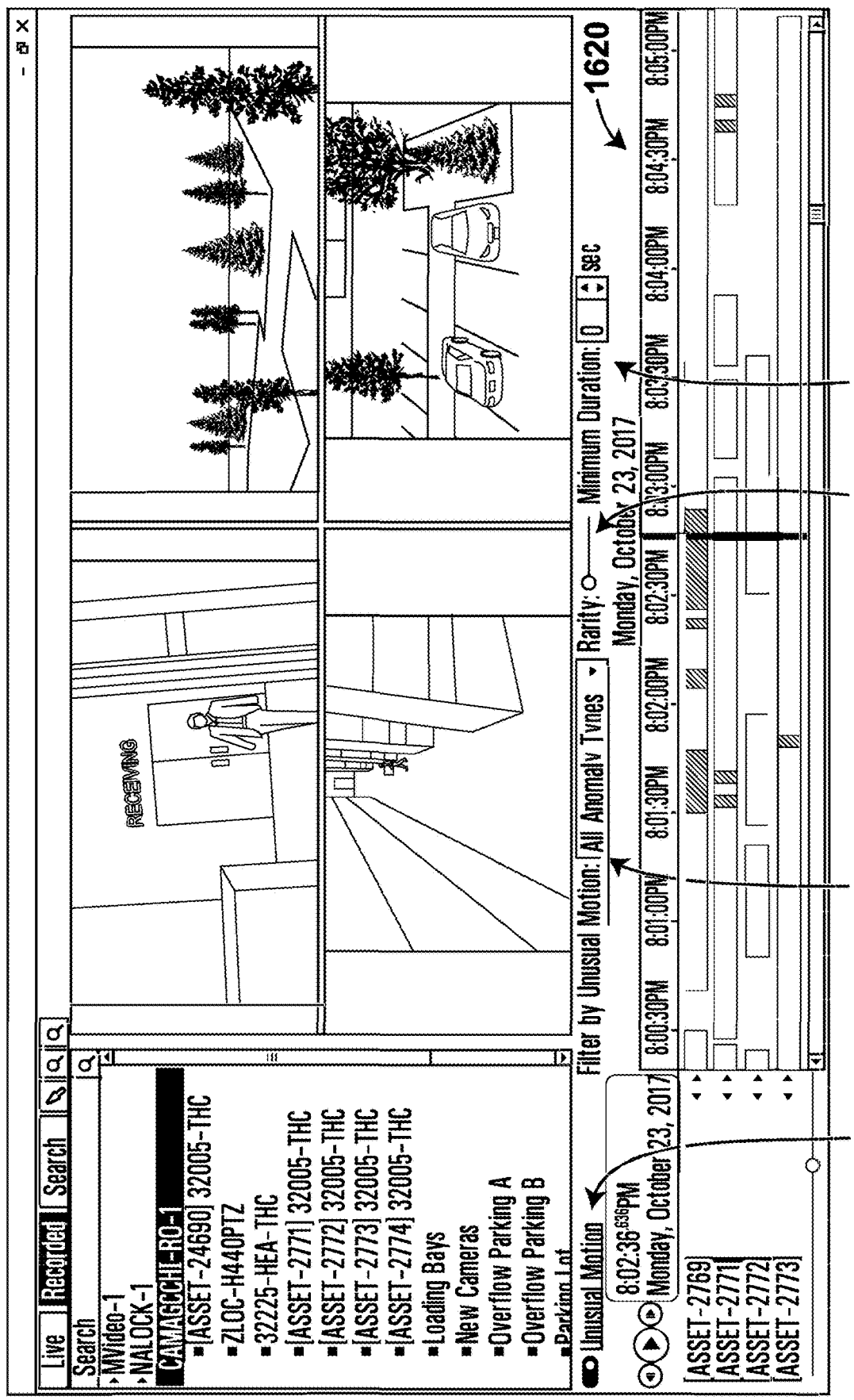
FIG. 18 illustrates a user interface after selection of filter options according to an example embodiment.
Figure 19:
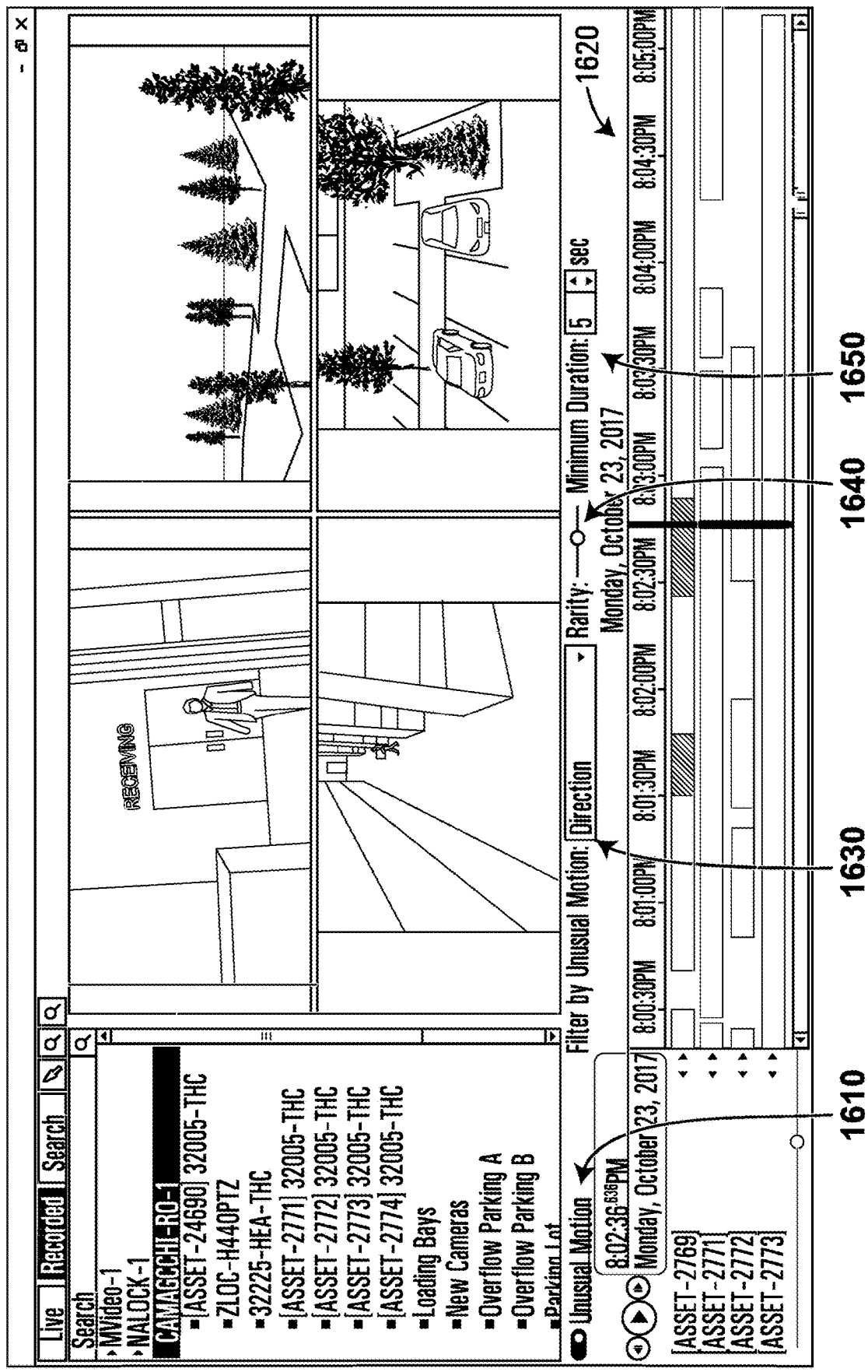
FIG. 19 illustrates a user interface after selection of alternative filter options according to an example embodiment.

As shown in FIG. 17, when toggle 1610 is switched to "on", filter options 1630 are also made available on the user interface presented to the user to allow the user to adjust the data shown in the timeline, as shown in FIGS. 18 and 19. The timeline 1620 is adjusted so that only occurrences of unusual motion are darkened (as shown in a darker color on timeline 1620).

In FIG. 19, the rarity bar 1640 has been increased to about the midpoint position so that more common "unusual motion" will not be darkened. Rarity bar 1640 enables users to adjust the threshold by which "unusual motion" is determined and can thereby filter out motion that is less "unusual". Likewise, a minimum duration 1650 has been selected, so that shorter incidents, in this example, less than 5 seconds as selected will not be darkened, although longer durations may be selected. Also, a type of unusual motion, in this case "Direction" has been selected, so that only incidents of unusual motion related to an unusual direction of movement will be darkened. Other filters that may be selected include: crowd gathering, i.e. display only an unusual total amount of motion; speed, i.e. display only unusually fast or slow motion; absence, i.e. display only the unusual lack of motion; classification, i.e. filter the displayed results by classification, for example as a person or vehicle; size, i.e. filter the displayer results by a minimum size of the object; and, location, i.e. filter the results based on a selected portion of the field of view.

FIGS. 23A to 23C, 24, 25A, 25B, 26A to 26D, 27A to 27C and 28 illustrate details of exemplary implementations of systems and processes using target-specific metadata to perform anomaly detection which may be performed via the surveillance systems/modules described herein. As noted, use of motion vectors provide good results for probability calculations and anomaly detection, as well as providing good clustering results to group histograms or other statistical models into identified time intervals. However, use of target-specific metadata provides additional benefits in many implementations.

Given that a camera is observing a fixed scene for a long time, the surveillance system can learn the typical behaviors based on metadata generated from analysis of the video and any anomalies can then be determined for the scene and be alerted to an observer (e.g., provide an alarm (which may be in real-time or in the form of an alert in a report)). Once there is enough observed history, the surveillance system can determine what constitutes a normal occurrence and can also provide details regarding why an occurrence is considered an anomaly with the alert provided to the observer. The user can then make more meaningful decisions on how to handle an anomaly, i.e., alert the authorities/raise a flag for others on the system or provide feedback to the system that the detection should not be considered an anomaly.

The system may automatically learn normal behaviors in space and time by processing only metadata and as a result be able to detect anomalies both at the level of individual objects and as overall behaviors, without the user having to define any rules. By obtaining feedback from a user of the identified anomalies, the system may automatically throttle false alarms, since those false alarms (anomalies identified as false alarms) may be used by the system to adjust the definition of normal and thus cease to be detected as anomalies going forward.

Scene based statistics of types of objects observed (also referenced herein as targets) and the behavior of the objects observed may be formulated. The system may then use these statistics to verify if a new object observed in the scene aligns within an error margin to what has been historically observed. If not, the system may determine why the object is considered anomalous (e.g., not behaving how it is expected it to behave) and bring both the anomalous object and this determination of why the object is considered anomalous to the user's notice.

Also, since the anomalies are based on attributes of the target (e.g., based on target-related metadata), the anomalies can be tracked across different cameras and make the security system more perceptive for the user to determine and track anomalous behavior across a camera system.

Figure 23A:
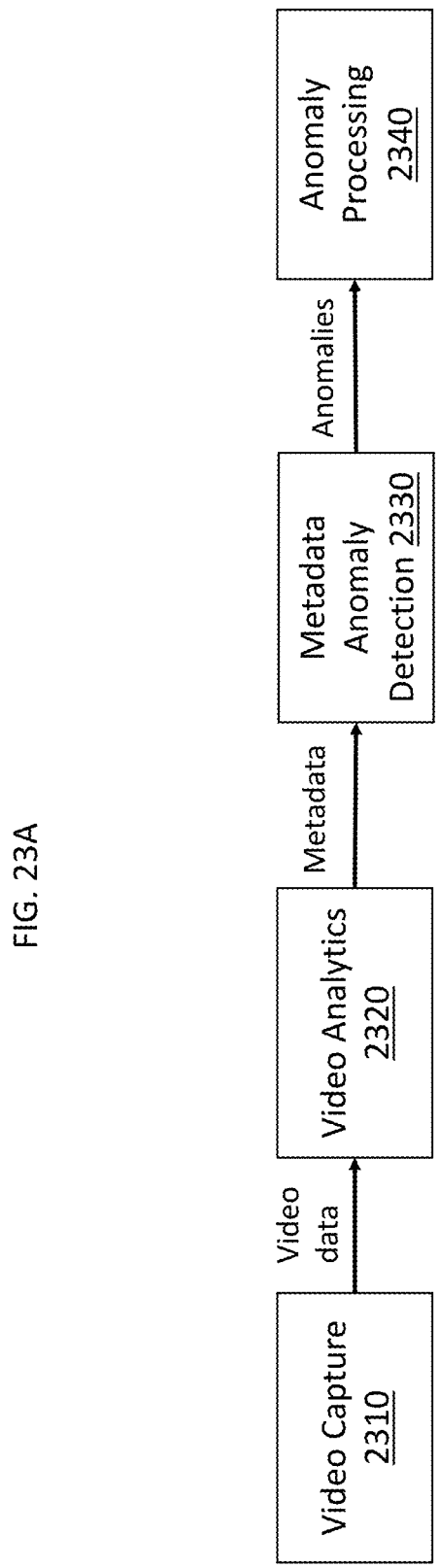
FIG. 23A illustrates functional modules of a video analytics system with metadata based anomaly detection according to an exemplary embodiment of the invention.

FIG. 23A illustrates functional modules of a video analytics system with metadata based anomaly detection according to an exemplary embodiment of the invention. In video capture module 2310, video data is obtained (e.g., by a video capture device 108, video capture module 208). The video data may be sent in real time to a video analytics module 2320 or may first be stored (e.g., in video storage 248) and provided at a later time to the video analytics module 2320.

The video analytics module 2320 (e.g., such as video analytics module 224) processes the video data to identify various information within the video and provide the extracted information in the form of metadata. The extracted features may comprise conventional video metadata extracted by conventional video analytics systems using conventional video analytic techniques and include target-related metadata identifying a target in the scene of the video and describing features of the target, such as:

target identification (e.g., identifying the existence of a non-permanent object in the video image), target classification (e.g., identifying the type of target that is identified, such as person, man, woman, child, adult, dog, cat, squirrel, plane, truck, car, motorcycle, bicycle, bag, purse, luggage, etc.), target location (e.g., the location of the center of a footprint of the target), target velocity (speed and direction of movement of the target), target trajectory (the direction of movement of the target), target speed, target size, target orientation (e.g., lying down, upright, sitting), and target appearance and target disappearance (respectively indicating the start and end times of the target's identified existence in the video).

It will be appreciated that target velocity may be provided as separate metadata and may contain duplicative information when metadata of target speed and target trajectory are also generated by the video analytics module. The location, speed, trajectory and velocity of a target may be provided as the location, speed, trajectory and velocity with respect to the image plane of the video. For example, location, speed, trajectory and velocity may be provided as pixel location, pixel speed, pixel trajectory and pixel velocity with respect to a pixel location and change of the pixel location of a target. The pixel location of a target may correspond the center of the footprint of a target—such as the horizontal center of the bottom of the identified target. Alternatively, the location, speed, trajectory and velocity of a target may be provided as (or be proportional to or otherwise correlate to) real world location, speed, direction and velocity, respectively. Of course, metadata of target speed, direction and/or velocity may be provided in both of these forms. Thus, it should be understood that, unless context indicates otherwise, reference to information (e.g., metadata) of target speed may be in the form of target speed alone or in the form of target velocity and may denote speed in the image plane, real world, pixel speed, etc. Similarly, it should be understood that, unless context indicates otherwise, reference to information of target trajectory may be in the form of target trajectory alone or may be in the form of target velocity and may denote direction in the image plane, the real world, pixel trajectory, etc.

Target-related metadata generated by the video analytics module 2320 may also include metadata describing the relationship of the target to other features identified in the video and/or events related to the target such as:

object ported by (e.g., carried, pushed, pulled by) target;

object left behind by target, target entering or target exiting (e.g., with respect to an identified entry/exit point, such as a building doorway, escalator, elevator, car, etc.), and events such as loitering, lying down, running, walking, waiting in queue, etc.

The generated metadata are provided to metadata anomaly detection module 2330 that processes the metadata to detect an anomaly (e.g., anomalous behavior or actions). For example, the metadata anomaly detection module 2330 may detect an anomaly by metadata analysis only without the need to further analyze the video data (i.e., based on the metadata alone without further analysis of the images of the video represented by the video data). The metadata anomaly detection module 2330 may detect an anomaly from the video by analysis of target-related metadata, such as analysis of one or more of the target-related metadata described herein.

Anomaly processing module 2340 may receive the anomalies identified by the metadata anomaly detection module 2330 and perform various actions in response to the same. For example, the anomaly processing module 2340 may generate corresponding anomaly metadata that may be associated with the video data and more specifically, the identified target corresponding to the target-related metadata from which the anomaly is detected. The anomaly processing module 2340 may modify the video to highlight areas of the video corresponding to the target and/or anomaly for a reviewer of the video, such as described herein, e.g., with respect to FIGS. 9-12. The anomaly processing module 2340 may be implemented by the video management module 232 and include a user interface and functionality described herein with respect to FIGS. 16-19 (although it will be appreciated that anomalies in addition to unusual motion may be detected, filtered and displayed).

Figure 23B:
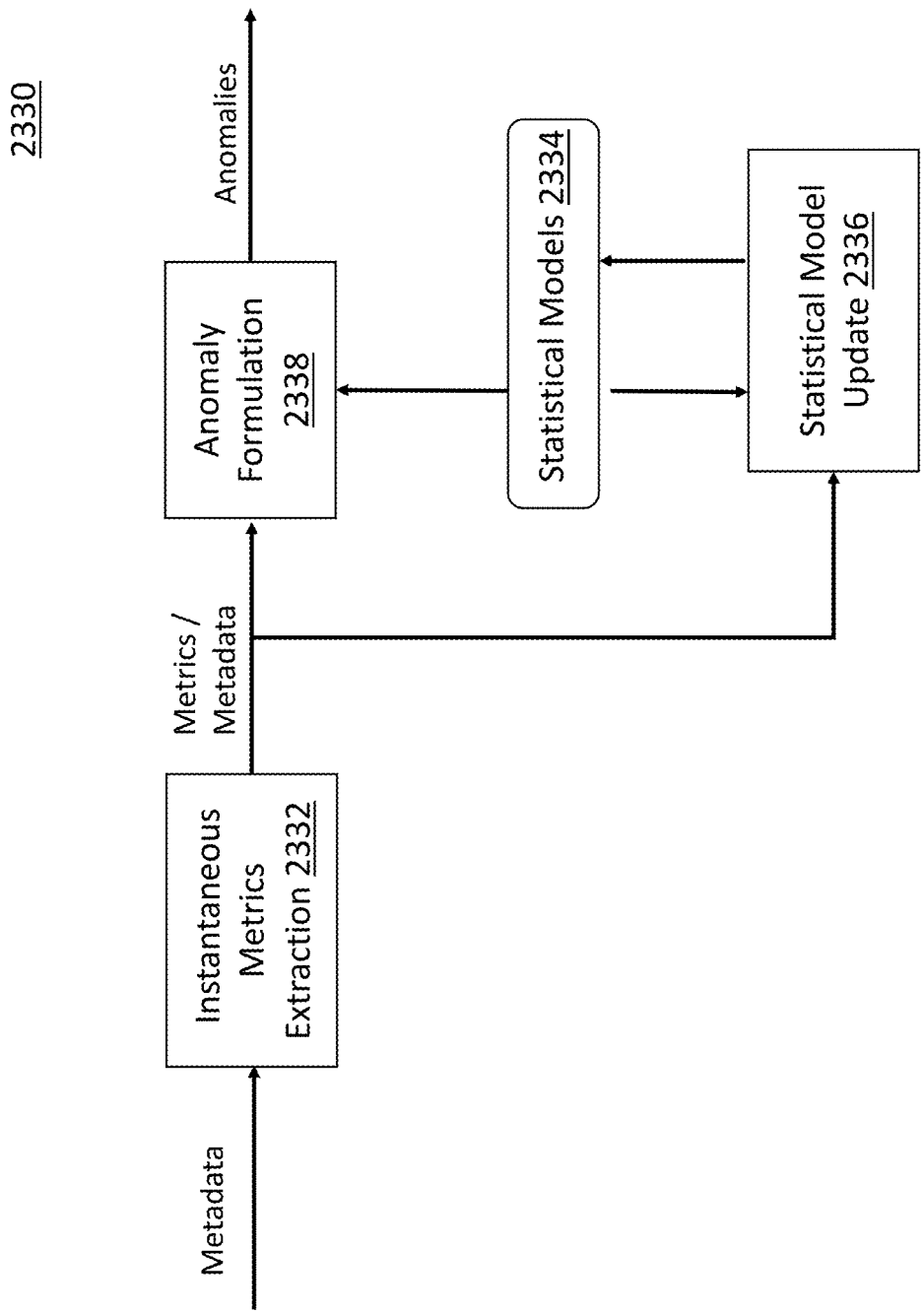
FIG. 23B is a block diagram of providing exemplary details of the metadata anomaly detection module and FIG. 23C illustrates example metric extraction that may be performed by instantaneous metrics extraction module.

FIG. 23B is a block diagram of providing exemplary details of the metadata anomaly detection module 2330 of FIG. 23A, including an instantaneous metrics extraction module 2332, statistical models 2334, a statistical model update module 2336 and an anomaly formulation module 2338.

Instantaneous metrics extraction module 2332 receives metadata (e.g., directly from video analytics module 2320 or from some other source) and analyzes the metadata to extract instantaneous metrics from the video. Instantaneous metrics refers to a metric reflecting the most recent value of the metric with respect to the timeline of the video. Thus, an instantaneous metric may reflect how many people were present in a cell in the last ten minute interval of the video (which may be the most recent ten minutes or the most recent interval of periodic ten minute intervals), or speeds of a particular target type. In some examples, the instantaneous metrics may always represent (e.g., be computed from) the most recent metadata received (e.g., with respect to the latest frame of the video). In this instance, the instantaneous metric is/can be dependent on the history of the target, and is computed whenever a new metadata is received. It will be appreciated that because the anomaly detection may be performed with respect to any video (e.g., live streaming video or stored, archived video), instantaneous metrics refers to most recent instances with respect to the video being analyzed.

Instantaneous metrics extraction module 2332 analyzes the received metadata and generates metrics from the metadata. In general, metadata is typically associated with a specific frame of the video. For instance, metadata associated with a video frame may identify the existence of several targets in the scene of the frame and identify the target type of each of these targets. Although some metadata may be generated by analysis of several frames of video (e.g., loitering), the metadata information is still associated with a particular frame (e.g., loitering of target #12345 within frame #444555 of the video). Metadata metrics may thus be generated by analyzing sets of metadata associated with several frames of video. For example, metadata metrics may identify a number of different targets present in a cell over a ten minute interval, speeds of the different targets within the cell over the ten minute interval, etc. Further details of metadata metrics and their use for anomaly detection according to some examples is found below.

Metadata and metrics are provided to statistical model update module 2336 which uses the same to form and update statistical models 2334. Anomaly formulation module 2338 may compare the instantaneous metadata/metrics provided from instantaneous metrics extraction module 2332 with the statistical models 2334 to identify an anomaly.

Figure 23C:
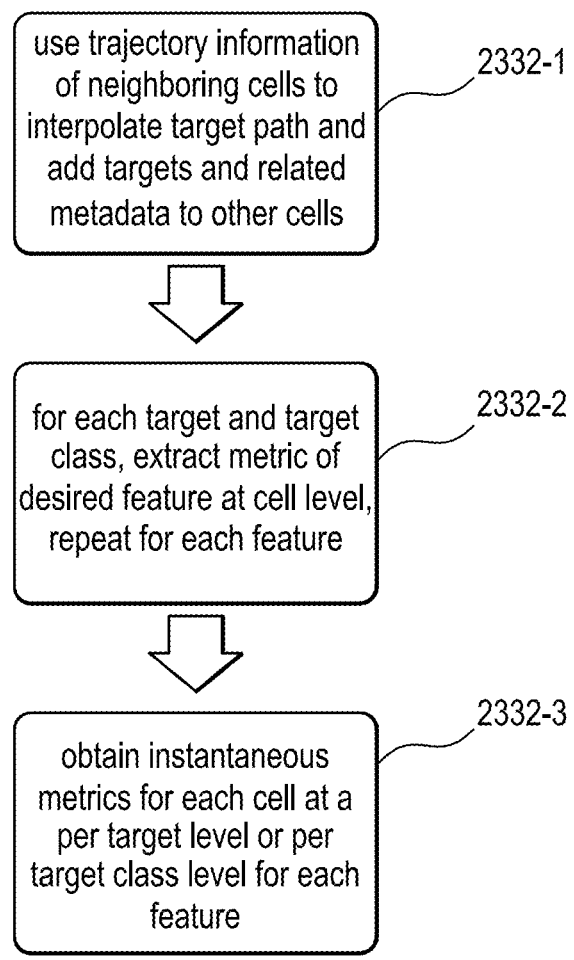

FIG. 23C illustrates example metric extraction that may be performed by instantaneous metrics extraction module 2332. For example, in step 2332-1, several consecutive frames (e.g., 2 or 3 frames) of metadata may be reviewed to determine the paths of all targets in the scene. The target path may be determined by interpolating the discrete target location (using associated target trajectory and target speed) metadata for each target over the several consecutive frames. If the determined target path extends through cells that do not have metadata identifying the presence of the target, target related metadata may be added to for the cell.

Figure 24:
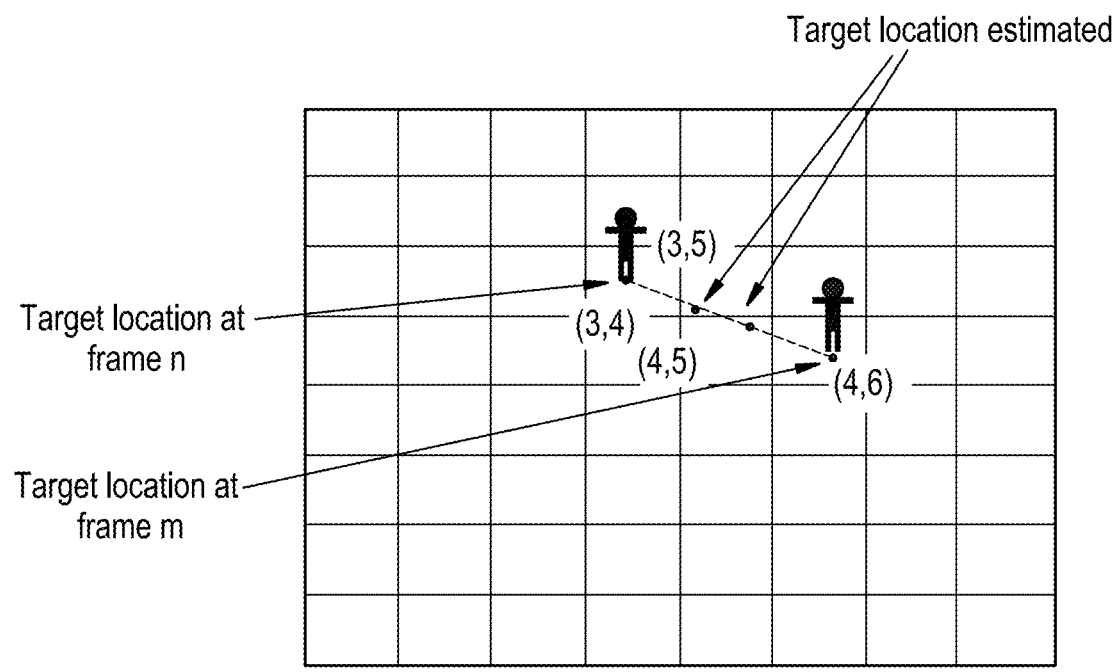
FIG. 24 provides an example of estimating a path of a target which may be used to associate instantaneous metadata metrics to cells of a scene of a video.

FIG. 24 illustrates an example where metadata may indicate the presence of a target at frame n in cell (3,4) and the presence of the same target at a later frame m at a different cell (4,6). The later frame m may be the frame immediately following frame n in the video or there may be intervening frames where the target went undetected (e.g., being obstructed by a foreground object or simply due to inconsistencies in the metadata generation). The path of the target is estimated (which may use just metadata identifying the location of the target, or use additional metadata such as trajectory and speed of target). In this instance, a linear path is shown as the estimated target path (e.g., resulting from linear interpolation), but curved paths may be estimated as well using other interpolation methods. It will also be appreciated that the target path of a target may be estimated by using extrapolation in addition to (or instead of) interpolation. Thus, cells at the edge of the scene in which a target has not been or was not detected may have target related metrics associated with the cell as well (e.g., when the target leaves the scene of the video without being detected as being present in such edge cells).

As is shown in FIG. 24, the target path is shown to intersect cells (3,5) and (4,5). Thus, target-related metadata for this target may be added to be associated with cells (3,5) and (4,5), such as variable target-related metadata (that may vary from frame to frame) such as target presence, target speed, target trajectory, target velocity, etc., as well as consistent target-related metadata (e.g., target type). Variable target-related metadata may be interpolated from the corresponding target-related metadata of frames n and m. For example, if the speed of the target differs from the cell (3,4) to cell (4,6), the speed of the target at cell (3,5) and at (4,5) may be estimated from interpolation of the speed (with respect to distance) between cell (3,4) and cell (4,6). For example, a linear interpolation of speed would assume speed increased at a constant rate between the location of the target in cell (3,4) and cell (4,6) to determine the speed of the target at its estimated location within cells (3,5) and (4,5).

Thus, in step 2332-1, target-related metadata may be added for targets to cells in which the target has not been identified by the received metadata. When forming instantaneous metrics corresponding to a frame by frame basis, the target-related metadata may be added for such cells at corresponding intermediate frames lacking such target-related metadata (when appropriate) if granularity (e.g., minimum time intervals) of the frame-by-frame instantaneous metric extraction permits. Alternatively, and/or in addition, the time associated with the presence detection of the target within cells may be estimated and associated with the target-related metadata added to a cell. Later processing may extract metrics based on ranges of time (e.g., per various time intervals) to create and analyze metrics associated with a cell (e.g., in generating instantaneous metrics by module 2332 and in generating statistical models by module 2336).

In step 2332-2, metrics relating to a particular feature are extracted at the cell level. Reference to "at the cell level" indicates obtaining such metrics for each cell. For example, a cell may have the following instantaneous metrics extracted for each target determined to be present in the cell (either as identified by received metadata identifying a target location in the cell or from target path estimation as described herein with respect to step 2332-1) for the following features:
   target location
   trajectory
   speed
   velocity For example, a cell may have the following instantaneous metrics extracted for each class of targets determined to be present in the cell for the following features:
   number of targets present of class
   average trajectory of targets of class
   average speed of targets of class
   average velocity of targets of class Other features of the target and classes of targets may be extracted from the metadata and include either the metadata associated with the target itself (target-related metadata) or a count or average of the metadata of the targets of a class identified as present within a cell. Thus, for each cell, each target and target class has instantaneous metrics extracted for each feature (step 2332-3).

As noted, the instantaneous metrics extracted by module 2332 are provided to statistical model update module 2336. The statistical models 2334 may be created for each feature at a cell level. Thus, each cell may be associated with a set of statistical models for each of the features extracted from the instantaneous metrics extraction module 2332. The statistical models 2334 may represent the likelihood of a feature occurring within a particular time interval and be represented as a histogram, a running mean and standard deviation, or as a multimodal Gaussian statistics or as a combination of some or all of these. The statistical models 2334 may be as described herein with respect to motion vectors but used to model features other than motion vectors.

Statistical models of a cell may be updated on a frame by frame basis using the instantaneous metrics from module 2332. However, such an approach may result in uneven statistics for some features. For example, given a fixed frame rate, a slow moving object may have 20 different detections traversing the scene, while the faster object traveling the same path maybe observed only 10 times. The simple updating scheme described above would result in the slow moving object contributing a higher weight in statistics due to the extra observations. To avoid and/or reduce the contribution of this bias, instead of updating the cells when and where a detection of a target is made, compute the trajectory of the object and its intersection of the underlying cells, and update each cell once (e.g., once per target in cell with target related metadata and/or metrics) independent from whether an actual detection is made in the cell (e.g., as described above). Multiple sequential observations of the same target in the same cell over sequential frames may be merged into a single observation of that target in that cell, thus eliminating "double counting" of the target. Thus, analysis of features like average target speed, average target trajectory, etc., may provide an equal contribution for each target.

Having generated the statistical models 2334, the instantaneous metrics are compared to the statistical models 2334. Specifically, for each cell, each of the features extracted (which may be features associated with a particular target or features associated with a particular target class, as discussed above) are compared to the corresponding statistical model for such feature for that cell. If the comparison of an instantaneous metric with the corresponding statistical model 2334 shows the instantaneous metric is not usual (e.g., corresponds to an infrequent occurrence), an anomaly may be detected. For example, such anomaly detection may be the same as described herein with respect to motion vectors, but use the instantaneous metrics and corresponding statistical models regarding the same. As one example, each of the instantaneous metrics of a target may be compared to the corresponding statistical model and if the corresponding statistical model indicates the instantaneous metric corresponds to an infrequent occurrence (a frequency of occurrence below a threshold), it may be determined that an anomaly has occurred. Further, a combination of several instantaneous metrics of a particular target may be used to detect an anomaly when an individual comparison of a single instantaneous metric to a statistical model 2334 may not reveal an anomaly.

It should be appreciated that in detecting an anomaly, an anomalous target may be easily identified. Specifically, when an instantaneous metric provided by the instantaneous metrics extraction module is a target-related metric (e.g., target-related metadata) and/or is derived from a set of metadata that includes a target-related metric (e.g., target-related metadata), and that instantaneous metric is identified as anomalous by anomaly detection module 2338, the target associated with the target-related metric can be identified as an anomalous target. For example, if a trajectory or speed of a target is identified as anomalous, the target associated with the trajectory or speed is identified as anomalous. For example, if the presence of a target classification is identified as anomalous (e.g., a person on a highway), the target (person) is also identified as anomalous.

Anomaly processing of anomaly processing module 2340 may include receiving user feedback that the detected anomaly is not considered an anomaly. Such user feedback may be used to throttle false alarms (i.e., a detection of an anomaly by the system that a user does not consider an anomaly). For example, user feedback that a detected anomaly is not considered an anomaly may modify the statistical model(s) responsible for the detected anomaly, such as by increasing a weighting applied to a frequency of occurrence and/or modifying the threshold for associated with determining that the frequency of occurrence is unusual. For example, a statistical model indicating an anomaly occurs due to a metric occurring within a cell only 3% of the time may have the anomaly threshold of 3% reduced to 1% of the time. Thus, statistics of occurrence of a metric of a target indicating occurrence of such metric may happen 2% of the time would no longer trigger an anomaly detection as would have happened prior to modifying the statistical model threshold. It will be apparent that further user feedback of a related false alarm may act to further reduce the threshold (e.g., lower than 1% or remove anomaly detection associated with the metric altogether). As another example, the user feedback may identify a target type or target class that should not be associated with the anomaly. For example, a user may identify that a bicycle is not unusual in a particular area, and the anomaly detection may be adjusted to modify the target classification (for example, to alter a classification definition, such as remove a bicycle as a vehicle) or eliminate indication that any presence of a bicycle within an area of the scene (e.g., scene segment) should be considered an anomaly.

Anomaly processing of anomaly processing module 2340 may also include matching detected anomalies detected from different videos. For example, a first video camera may generate a first video from which first target-related metadata is extracted, and where the first target-related metadata is processed (as described herein) to detect an anomaly of a target of the first video. Similarly, a second video camera may generate a second video from which second target-related metadata is extracted, and where the second target-related metadata is processed (as described herein) to detect an anomaly of a target of the second video. The separately detected target related anomalies detected from each of the videos may be used to (a) identify that the target in the first video is the same target in the second video and (b) to correlate real world locations in the first video and the second video that are the same. For example, an anomaly of having a target having an anomalous speed and/or anomalous trajectory is likely to cause an anomaly detection with respect to each of the first and second videos for the same target exhibiting the same anomaly (e.g., car speeding or car going wrong way will likely be speeding/going the wrong way in the view of both cameras if they are spatially close). When cameras have shared views of the real world, anomaly detection at the same time with respect to the same target-related metric can be assumed to be a result of the same target (although additional characteristics of the target may also be analyzed to make this determination). Identifying the location of the target having the anomalous detection (e.g., the footprint location of the target) at the same time in each video also can be used to identify different views of the same real world locations provided by the cameras.

In other examples, anomaly detection in using video from different cameras may also be used to correlate location information and target information extracted from the different videos even when the different cameras do not have a view of the same real world location. For example, the speed and trajectory of an anomalous target (a target identified as having an anomaly due to anomaly detection of related target-related metrics) of first video may be assumed to correlate to the speed and trajectory of an anomalous target of the second video. Comparing times of the existence of the anomalous target in the first and second video with respect to the speed of the anomalous target can be used to determine a distance between the scenes of the first and second videos. Trajectories of the anomalous target, although possibly differently represented by metadata of the first and second videos, may be estimated as the same, and thus the relative real world orientation of the first video scene and second video scene may be estimated. Correlating several such same anomaly detections in the different videos may be performed over time so that several anomalous targets (correlating to pairs of anomaly detections in the different videos) may be identified to evaluate real world relative locations and real world relative orientations of the different videos. Although such use of anomaly detection is described with respect to two separate videos taken by two different video cameras, such correlation of anomaly detection between different videos may be performed with any number of cameras.

FIG. 25A exemplifies a feature of automatically altering cell size of the grid of cells dividing the scene of the video. As shown in the left side of FIG. 25A, a grid may initially be set (e.g., a predetermined grid or a grid selected by a user) to divide the scene of the video. Statistical models (e.g., 2334) for each cell of the grid may be obtained as described herein. The differences of the statistical models of the same metric between different cells may then be analyzed and used to alter the grid size. For example, statistical models of presence of a target class (e.g., a number of people or a number of vehicles) of different cells may be compared. Taking human presence as an example metric, the human presence statistical model of cells corresponding to locations further away from the video camera may indicate a relatively high presence of humans (e.g., high number of people over time) as compared to human presence of cells corresponding to locations closer to the video camera. Cells of the grid may thus automatically be resized to reduce the difference between the human presence frequency (e.g., presence detection over time) between the cells (and more specifically, between the statistical models of human presence of the cells). Thus, as shown on the right side of FIG. 25A, the cells with the relatively high human presence detection (at top of image, corresponding to real world locations further from the camera) have been reduced in size while the cells with the relatively low human presence detection (at bottom of image, corresponding to real world locations nearer to the camera) have been increased in size.

Figure 25B:
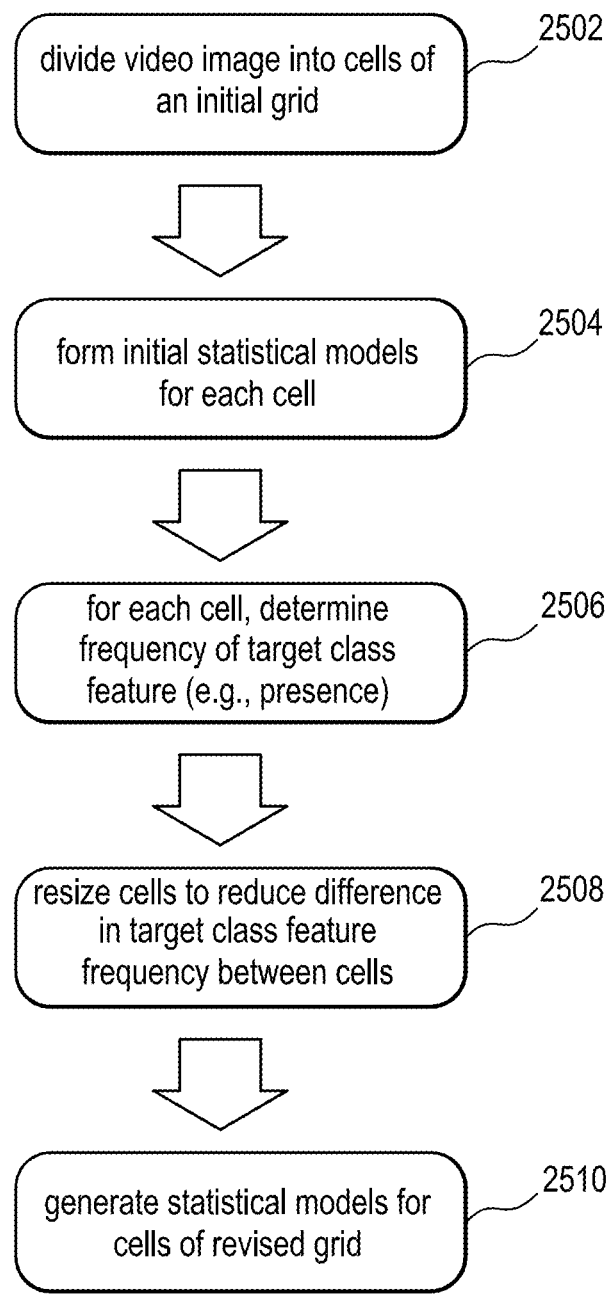

FIG. 25B illustrates an exemplary method that may be performed by statistical model update module 2336 to perform such automatic reconfiguration of cell sizes of the grid. In step 2502, a video image is divided into cells by a grid, such as a predetermined grid or a grid selected or formed by a user. In step 2504, statistical models are obtained for each cell (e.g., as described herein).

In step 2506, for a particular target class (e.g., such as humans or vehicles), the frequency of a feature of that target class (e.g., frequency of a target-related metadata for targets of that target class) is identified for each cell and compared with those of other cells of the grid. In some examples, the frequency of a feature of that target class may be evaluated after every specified interval of monitoring (e.g., every ten minutes). In other examples, the frequency of human presence (e.g., total human target identification within a longer time interval is identified for each cell and compared with each other cell. For example, such a longer time interval may correspond to those intervals resulting from the clustering of time intervals as described herein and may correspond to a week, to a weekend, to week days, to night time, to day time, during several hours each morning or several hours each evening (e.g., rush hours), etc.)

In step 2508, the cells are resized to reduce the difference in the frequency of the feature of the target class between cells. Thus, cells having a relatively high frequency of the target class feature (e.g., presence) may be reduced in size (or have portions replaced by cells having reduced size) while cells having a relatively low frequency of such target class feature may be increased in size (or be replaced with one or more cells of larger size).

In step 2510, statistical models for the resized cells of the revised grid are then generated and used for anomaly detection (e.g., as elsewhere discussed herein). It will be appreciated that previously obtained metrics and/or metadata from the video may be used to form statistical models for the resized cells of the revised grid.

The target class or target classes to which the frequency analysis is performed in steps 2506 and 2508 for cell resizing may be predetermined. Alternatively, target classes to which such cell frequency analysis is performed may be selected automatically, such as by selecting one or more target-related metadata that occur in spatial clusters in the scene (e.g., identifying high frequency of target trajectories of in a first direction that exist in certain groups of clustered cells but to not appear with such frequency in other cells) and/or occur consistently (e.g., with minimal deviation) in each cell of the spatial clusters (e.g., target trajectories are consistently in substantially the same direction, target velocities are consistently within a range of velocities, etc.).

Further, the frequency analysis in steps 2506 and 2508 for cell resizing may be performed with respect to several target classes. For example, it may be determined that cell resizing should be performed based on human presence, based on vehicle presence or based on both human presence and vehicle presence. For example, cells may be first sorted into cells associated with human presence (e.g., cells with human presence where vehicle presence is rare or non-existent) and cells associated with vehicle presence (e.g., cells with regular vehicle presence and relatively low human presence). Thus, cell resizing may be performed separately for the subsets of cells of the grid based on the classification of the cells—in this example, a resizing of cells based associated with human presence and a resizing of cells based on vehicle presence.

In addition, in some examples, different grids may be applied to the video to form statistical models of different features of the scene. For example, a first grid may be applied to the video to form statistical models for humans and a second grid may be applied to the video to form statistical models for vehicles. In such an example, a human related feature (e.g., human target-related metadata) may be used to resize cells of the first grid (e.g., according to the process of FIG. 25B) and a vehicle related feature (e.g., a vehicle target-related metadata) may be used to resize cells of the second grid.

Although the specific examples highlighted using the frequency of presence of a target class for automatic resizing of cells, automatic resizing of cells may be performed based on other features such as size, trajectory, speed, velocity, or the frequency of other target-related metadata described herein. Further, although step 2506 is described with respect to analyzing frequency of a feature of a particular target class, the feature analysis in step 2506 may be performed without regard to target class (e.g., to detect the presence of all targets detected in cell).

Resized cells of a grid may be analyzed globally and used for scene segmentation to identify aspects of the scene of the video. For example, sidewalks and roads in a scene (regularly used by humans and vehicles, respectively) would result in relatively dense cell formation (clustering of relatively small cells) at locations of the sidewalk and road (e.g., as compared to locations adjacent a sidewalk and road, such as locations corresponding to a building, river, sky, etc.). Thus, a clustering of relatively small sized cells may identify either a sidewalk or a road. Sidewalks may be distinguished from roads based on analysis of statistical models of the cells of the cluster, with sidewalks having a high frequency of human presence and roads having a high frequency of vehicle presence, relatively high speed of targets, relatively consistent trajectories of targets, etc.

Figure 26A:
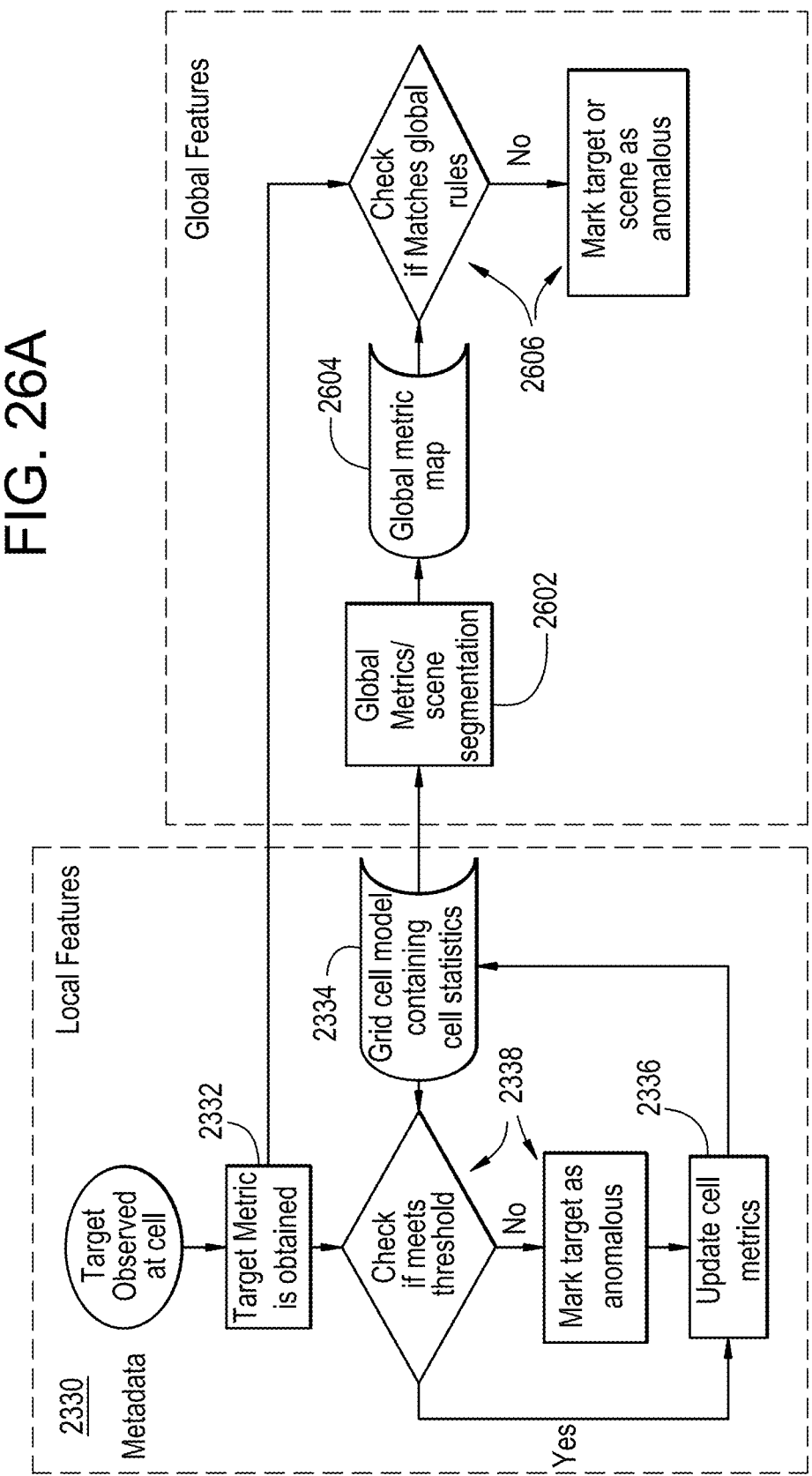
FIGS. 26A to 26D provide additional examples of identifying global features within a scene using the statistical models of cells.

FIGS. 26A to 26D provide additional examples of identifying global features within a scene using the statistical models 2334 of the cells. FIG. 26A is a block diagram illustrating the functions (and steps) of a system to detect both local and global features of a scene. In FIG. 26A, functions of the metadata anomaly detection module 2330 are represented in the left side of the figure and correspond to the functions within the dashed line box. Specifically, received metadata may indicate that a target has been observed at a cell (e.g., having a footprint located within the boundary of the cell). Instantaneous metrics extraction module 2332 may extract metrics of the target (e.g., such as target-related metadata) (2332). The target metrics may be compared to the corresponding statistical models of the cell to determine if the target metrics represent an anomaly and if so, to identify the related target as an anomalous target (2338). In addition, in 2336 the extracted metrics are provided to the statistical model update module 2336 to update the statistical models 2334. Repetitive description of these modules and their operations need not be repeated here.

FIG. 26A also illustrates performing anomaly detection using global metrics. Specifically, a global metrics/scene segmentation module 2602 performs an analysis of the statistical models 2334 to generate a global metric map. For example, global metrics/scene segmentation module 2602 may determine clusters of adjacent cells represent a similar location within the scene of the video, such as determining that clusters of adjacent cells represent portions of the same sidewalk. Global metrics/scene segmentation module 2602 may perform similarity analysis of the statistical models 2334 and group those cells that have sufficiently similar statistical models (e.g., that deviate from each other less than a predetermined threshold). Similarity analysis of the statistical models may be performed as described elsewhere herein (e.g., with respect to clustering of statistical models (e.g., histograms) of different time intervals into a single statistical model). The global metrics/scene segmentation module 2602 may also group cells with sufficient similarity with the requirement that the grouping forms a single continuous portion of the scene (e.g., the grouping of cells does not result in discontinuous segmentation of the scene). Each group of cells identified by the global metrics/scene segmentation module 2602 may be referred to herein as a scene segment. Each scene segment may be classified and identify a particular scene feature (e.g., sidewalk, road, lanes of roads). In some instances, it may be difficult to classify the scene segment (e.g., a scene segment may be formed from a group of cells but it may not be identified as belonging to a particular scene segment class).

The global metrics/scene segmentation module 2602 may then generate statistical models for each scene segment to form global metric map 2604. The global metric map 2604 may contain the same metrics as those modeled for each of the cells of the grid forming the scene segment, but may model each of these metrics for the entire corresponding scene segment (i.e., using metrics associated with all of the cells of the scene segment, such as all target-related metrics of targets located within the scene segment). Alternatively, or in addition, the global metric map 2604 may maintain statistical models corresponding to each of the cells of the grid forming the scene segment. In this alternative, a scene segment may be associated with multiple statistical models for each cell forming the scene segment and the appropriate target metric may be compared to the corresponding statistical model of the cell in which the target is located. The identification of the scene segment type (e.g., road or sidewalk) may be used to filter which target metrics should identify anomalies or used to weight deviations from the statistical models that may trigger detection of an anomaly.

The statistical models for each scene segment may be analyzed to classify (e.g., identify the type) of the scene segment. For example, if a scene segment has a first statistical model that shows a relatively high presence of people and has a second statistical model that shows no or little presence of cars or trucks (and/or a third statistical model that shows a very low velocity of vehicles in the scene segment), the scene segment may be identified as a pedestrian area. If a scene segment shows a relatively high presence of vehicles and/or relatively consistent trajectories of vehicles and/or relatively high speed of vehicles, the scene segment may be identified as a road. If the scene segment is identified as a pedestrian area that is adjacent a scene segment that is identified as a road and/or has a statistical model showing trajectories of a majority of people are aligned (e.g., substantially along a line one direction or the other), the pedestrian area may be identified as a sidewalk.

Cells being clustered based on their properties (as represented by their similar statistical models) can be identified by those statistical models of the cells that are similar within the cluster. For example, based on a typical class type, a sidewalk (having high presence of people) can be separated and identified separately from a road (having a high presence of vehicles). Further, based on trajectory direction, cell clusters of a road may be divided into different sides of a road (having substantially opposite trajectories for vehicles for adjacent portions of the road) and/or an intersection of a road (having consistent trajectories of vehicles identifying two roads intersect each other (e.g., the same location includes vehicle trajectories consistent with trajectories identifying both roads).

Shapes of the scene segments may also be used to classify the scene segment. For example, scene segments having high human presence that are elongated and have boundaries substantially parallel to the direction of their elongation may be identified as sidewalks.

Figure 26B:
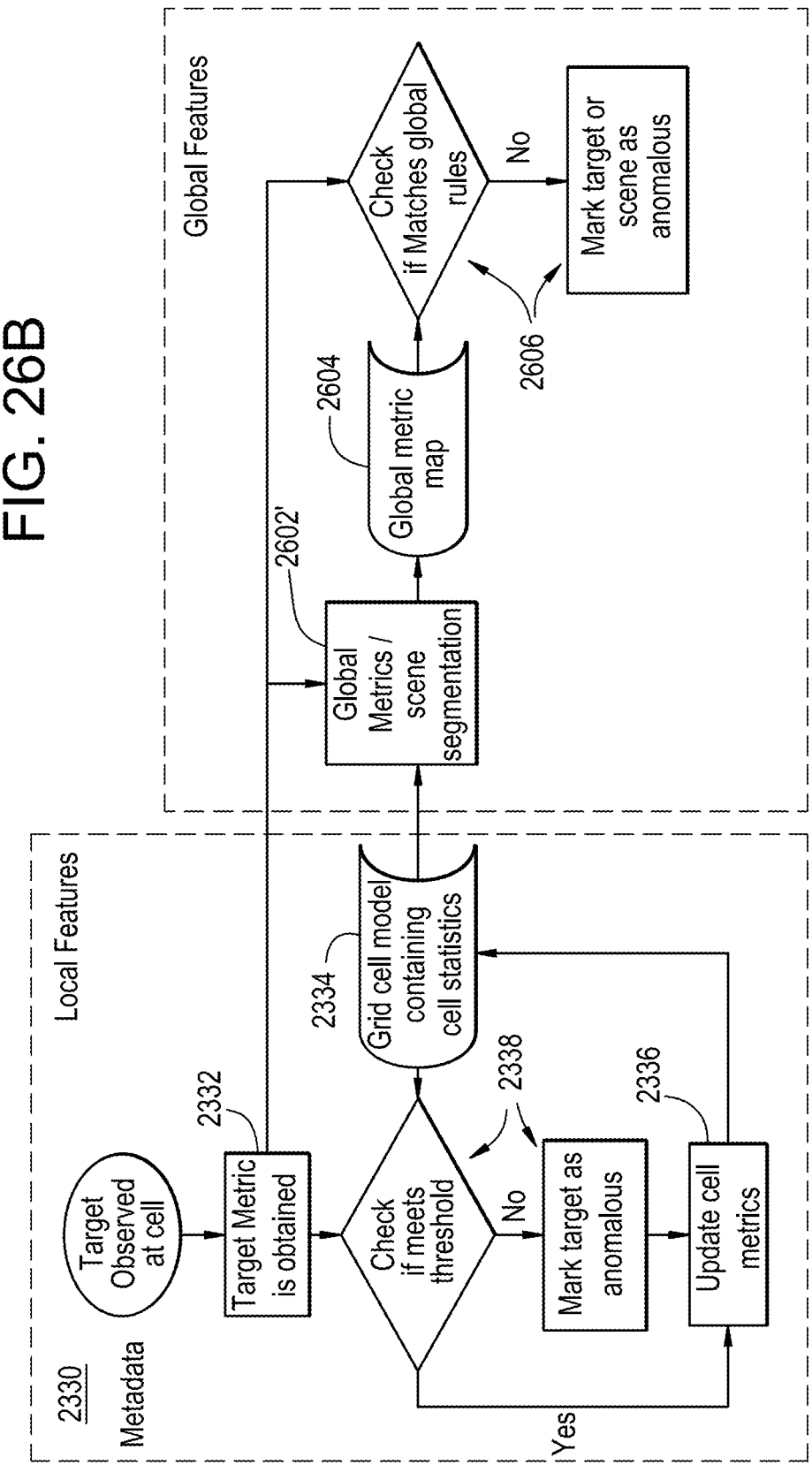

Paths of targets may also be used to extract scene segments from the video. FIG. 26B illustrates an example implementation that may be used instead of or together with the example of FIG. 26A. As shown in FIG. 26B, global metrics/scene segmentation module 2602' may receive target-related metadata. The paths of the targets of different classes may be tracked through the lifetime of the target in the scene. Thus, the path of a first human target in a scene may identify the possibility of a pedestrian area, or a path, such as a sidewalk. A high density (e.g., high frequency) of human target trajectories corresponding to locations and direction of the path may confirm the path of the first human target corresponds to the location of a path or sidewalk. This may be performed for multiple human targets to help identify the locations. Similarly, the path of a vehicles (e.g., cars, trucks, etc.) may be tracked through the lifetime of the vehicle's existence in the scene to identify a possible road. The existence of the road (or lanes of the road) may be verified by identifying a high density (high frequency) of vehicle trajectories along the path of the vehicle and aligned with the path of the vehicle. Such target trajectory information may be obtained directly from the metadata provided to the global metrics/scene segmentation module 2602' or may be obtained from the statistical models 2334 of corresponding cells.

Having identified and classified scene segments, the global metrics/scene segmentation module 2602' may then create global level statistical models for each of the scene segments using the received target-related metadata. The formation and resulting statistical models 2604 for the scene segments may be the same as described herein with respect to FIG. 26A and a repetitive description is omitted.

Referring to both FIGS. 26A and 26B, global anomaly detection module 2606 may perform anomaly detection by comparing the instantaneous target metrics extracted by module 2332 to the statistical models of the global metric map and identify the target as anomalous if a corresponding anomaly is detected. The global anomaly detection module 2606 may perform the same comparisons as the anomaly formation module does at the cell level except that the comparison of the target metrics is with respect to statistical models for the global cell group (scene segment) in which the target has been identified. Repeat description is therefore omitted.

Figure 27A:
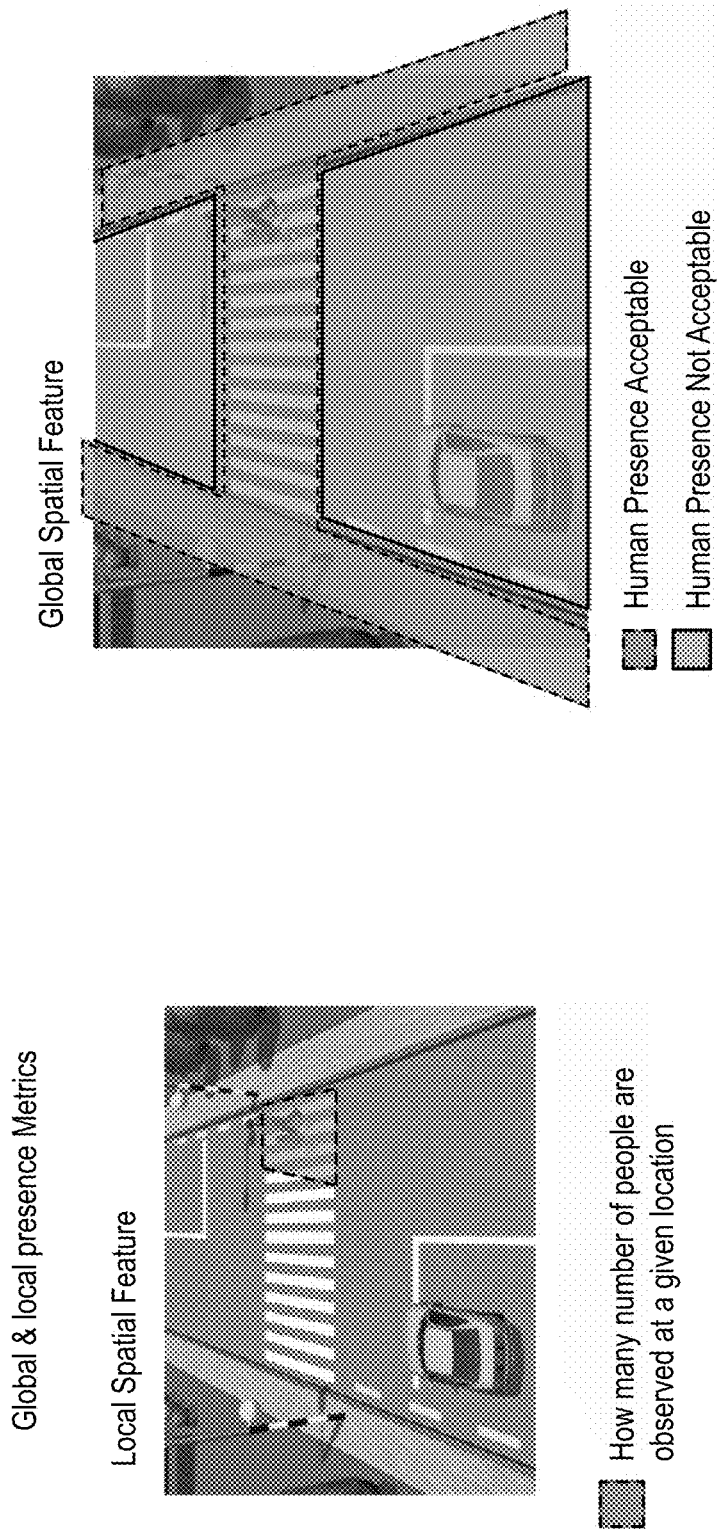
FIGS. 27A, 27B and 27C provide examples of performing local and global anomaly detection.

FIG. 27A illustrates an example of performing both local and global anomaly detection which may be implemented by the system of FIGS. 26A and 26B. The blue highlighted area of a crosswalk of a scene on the left side of FIG. 27A may represent a cell of the grid (full grid not shown). The statistical models of the cell may include determining the typical trajectory of people in the cell and the typical trajectory of vehicles in the cell (e.g., as represented by corresponding histograms). Comparison of the trajectory of detected people and the trajectory of detected vehicles may be made to the corresponding statistical models of the cell to determine if the person or vehicle should be identified as an anomaly. For example, a person having a vertical trajectory may be identified as an anomaly when the corresponding statistical model of human trajectories for that cell shows frequency of horizontal trajectories of people (left to right in FIG. 27A) is high, but frequency of vertical trajectories of people is low. Similarly, a car having a horizontal trajectory may be identified as an anomalous target when the statistical model for vehicles indicates horizontal trajectories of vehicles within the cell is low.

The right side of FIG. 27A illustrates an example of global anomaly detection. Based on the operations described herein, the scene may be segmented. For example, two sidewalks, a cross walk and a road may be identified. Statistical models for each of these segments (formed from groups of cells) may be generated. Target metrics may then be compared to the global statistical models. In this example, a human target having a presence in a road segment of the scene that is not a crosswalk segment of the scene may be identified as an anomaly.

Figure 26C:
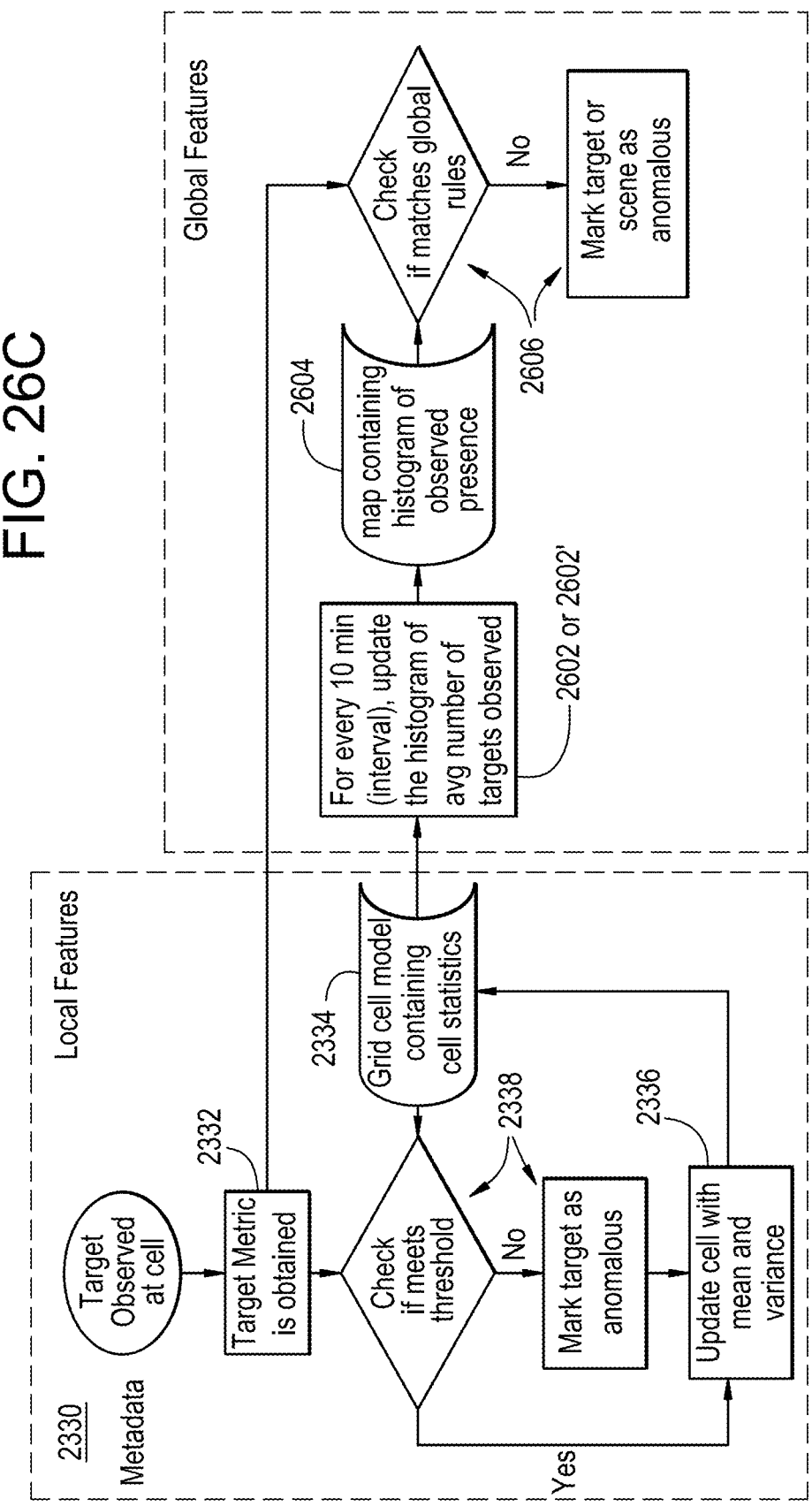
Figure 26D:
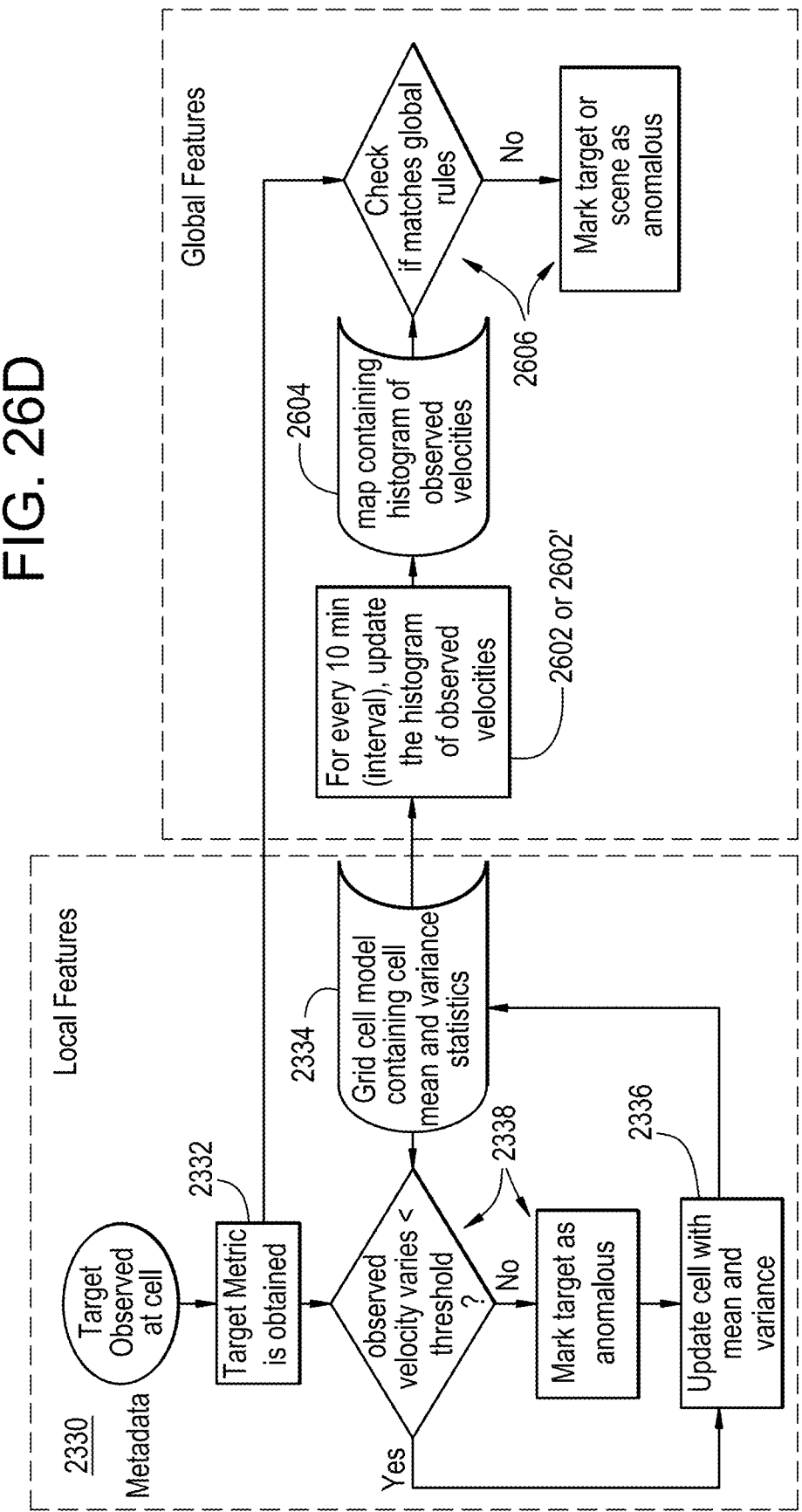

FIGS. 26C and 26D provide examples of particular implementations of the systems of FIG. 26A and/or 26B to detect local and global anomalies. Specifically, FIG. 26C illustrates the system using target presence to obtain local and global temporal presence metrics (from which corresponding local and global temporal anomalies may be detected), while FIG. 26D illustrates the system using target velocity metadata to obtain local and global temporal velocity metrics (from which corresponding local and global temporal anomalies may be detected).

Figure 27B:
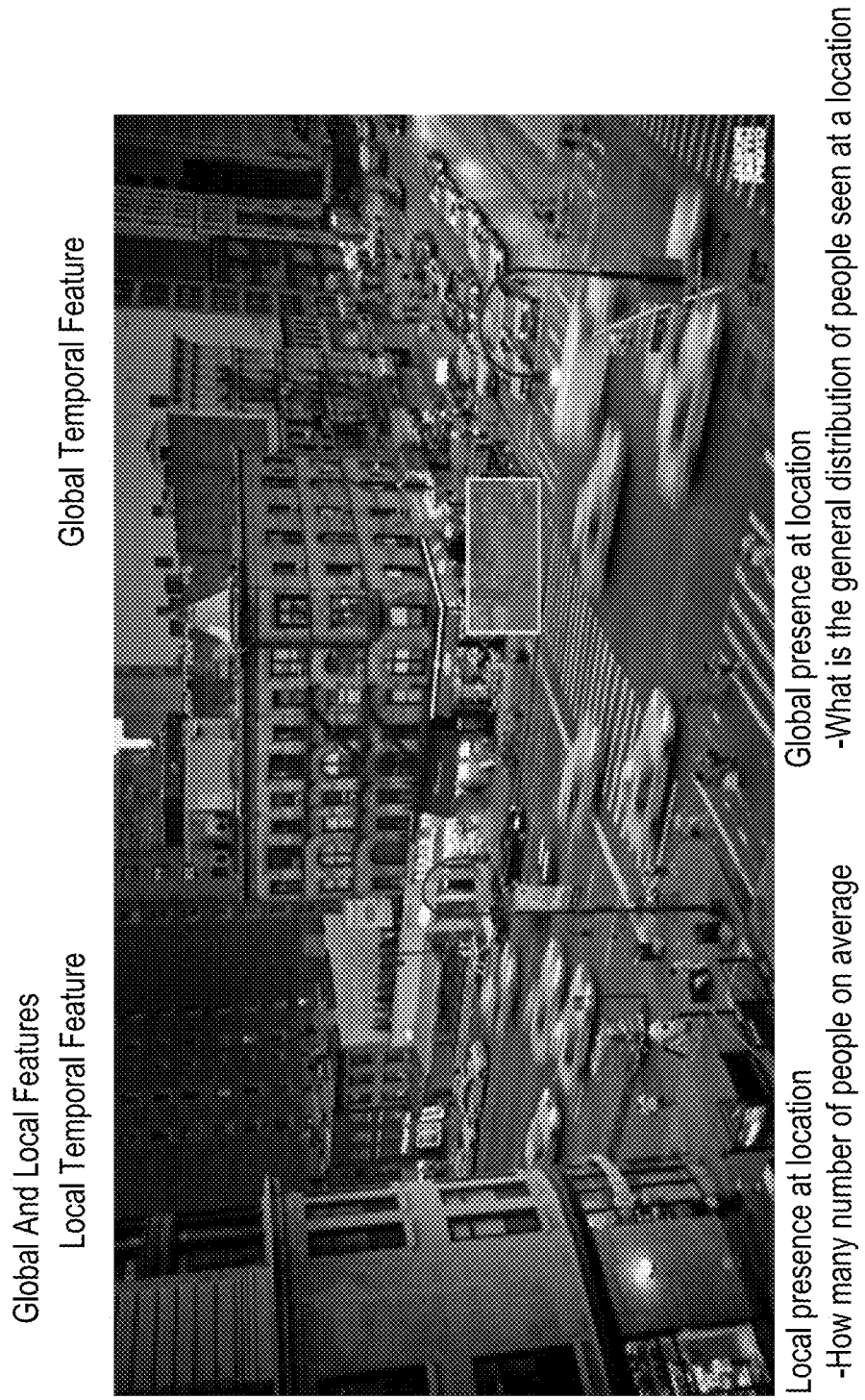

In FIG. 26C, local and global anomalies relating to the presence of targets may be detected. Local anomalies may be detected by cell based statistical models 2334 which may be updated by module 2336 to maintain a moving average of the number of people detected in each cell. FIG. 27B highlights one example of a cell in red to monitor an average number of people in that cell. Module 2338 may compare the instantaneous number of people within a cell to the corresponding moving average and obtain a ratio of the same. Based on the comparison, module 2338 may detect a significant deviation (e.g., the ratio being above or below corresponding threshold(s)) of the instantaneous number of people in a cell to the moving average of the same within a cell may indicate an anomaly (e.g., indicating a crowd gathering or people suddenly dispersing).

Global anomalies due to presence may also be detected in the system of FIG. 26C. Module 2602 or 2602' may monitor the average number of people in a scene segment (e.g., on an identified sidewalk or portion thereof) over every 10 minute interval. Such average number of people in a scene segment over every 10 minute interval may be compared to historical data of the same as represented by statistical models in global metric map 2604. For example, the statistical models may be in the form of a histogram of observed presence of people for similar periods of time in the scene segment (e.g., during weekday mornings or evenings, weekends, nighttime, etc., as described herein with respect to use of motion vectors). An average number of people in a scene segment in a 10 minute interval that corresponds to an anomalous frequency of presence (as represented by the histogram of that scene segment) may trigger an anomaly detection.

Figure 27C:
Figure 27C:
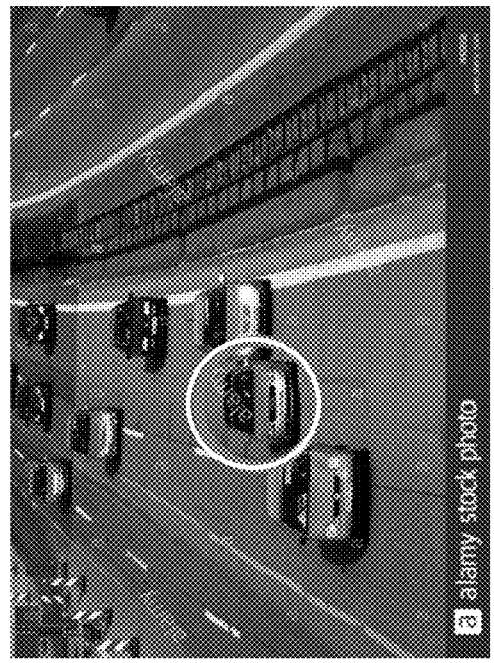

FIG. 26D illustrates an example of local and global anomaly detection based on statistical models of the velocity of vehicles. A local anomaly of speeding may be detected by cell based statistical models 2334 (which may be updated by module 2336) to maintain a gaussian mean and variance of the speeds of vehicles within the cell. A vehicle detected within the cell having a speed that varies more than a threshold (as compared to the speed statistical model of that cell) may be detected as an anomaly by module 2338. The left side of FIG. 27C illustrates a vehicle (circled in red) that may be detected as a speeding car.

Global velocity metrics of vehicles may also be used to detect anomalies (e.g., a traffic jam shown in the right side of FIG. 27B). Having identified a scene segment as a road by global metrics/scene segmentation module (2602 and/or 2602'), global metrics for the road scene segment may be extracted from the metadata by module 2602/2602'. For example, a histogram of observed velocities of the road scene segment may be obtained every ten minutes by module 2602/2602' and used to update the corresponding statistical model in the global metric map 2604 (e.g., a histogram of observed velocities of vehicles within the road scene segment). For example, the statistical model of the road scene segment may be in the form of a histogram of observed vehicle speeds of vehicles on the road over various periods of time in the road scene segment (e.g., during weekday mornings or evenings, weekends, nighttime, etc., such as described herein with respect to use of motion vectors). The instantaneous vehicle velocity histogram (e.g., within the last monitored 10 minute interval) may be compared to the corresponding histogram stored in the global metric map 2604 for the corresponding time period to detect an anomaly. In the example on the right side of FIG. 27C, a traffic jam may cause an anomaly detection in the event the histogram of the road scene segment in the most recent 10 minute interval is significantly different from the histogram (stored in global metric map 2604) of vehicle speeds for the road scene segment for the corresponding time period (e.g., a comparison of the two histograms indicates a deviation of the two histograms above a predetermined threshold).

FIG. 28 illustrates examples of the spatial and temporal features extracted from metadata and used by various components of the system to detect anomalies, for spatial and temporal related anomalies (here with respect to occupancy (or presence) and velocity (or speed) of targets). Target metadata may correspond to that received by the metadata anomaly detection module 2330. Target metric computation may correspond to module 2332 (or alternatively module 2336). The cell statistical model may correspond to module 2334. Global metric computation may correspond to module 2602. The global statistical model may correspond to module 2604. The global level anomaly detection may correspond to module 2606. Thus, FIG. 28 illustrates examples of anomaly detection with respect to spatial related occupancy, spatial related velocity, temporal related occupancy and temporal related velocity.

The system and method described herein according to various example embodiments allows for improved playing back of a plurality of video feeds at the same time. For example, the number of video feeds that has video of interest available at any given temporal position is tracked and a playback layout that is appropriate for that number of available video feeds is determined. By playing back the video feeds within the playback layout, only those video feeds that have available video of interest are displayed. This may lead to more efficient use of the area of the display region. For example, sub-regions of the display region are not left empty due to a video feed not having video of interest at a given temporal position. Furthermore, when played back within the playback layout, the area of the display region is used more efficiently to display those video feeds that have video of interest available.

While the above description provides examples of the embodiments, it will be appreciated that some features and/or functions of the described embodiments are susceptible to modification without departing from the spirit and principles of operation of the described embodiments. Accordingly, what has been described above has been intended to be illustrated non-limiting and it will be understood by persons skilled in the art that other variants and modifications may be made without departing from the scope of the invention as defined in the claims appended hereto.

The invention claimed is:

1. A video analytics system having metadata based anomaly detection to detect an anomaly within a scene of a video based on metadata associated with corresponding frames of the video, the video analytics system comprising:
 a processor-implemented, metadata anomaly detection module configured to receive, for each of, a plurality of frames of a first video, corresponding target-related metadata, the target related metadata including, for each target identified by the target-related metadata in a particular frame of a plurality of frames of the first video:
  target classification identifying a type of the target,
  target location identifying a location of the target, and
  a first target feature of the target,
 the processor-implemented, metadata anomaly detection module comprising:
  a processor-implemented, instantaneous metrics extraction module configured
   to sequentially receive the target-related metadata associated with corresponding sequential frames of the first video,
   to analyze sets of the target-related metadata, each set of target-related metadata being associated with a correspondingly different set of frames of the first video and being analyzed to generate and associate with the correspondingly different frame set corresponding instantaneous metadata metrics for each of a plurality of cells dividing the scene of the first video, and
   to sequentially provide the instantaneous metadata metrics associated with the different frame sets of the first video;
 a processor-implemented, statistical model update module configured
  to sequentially receive the instantaneous metadata metrics associated with the different frame sets of the first video from the processor-implemented, instantaneous metrics extraction module, and
  to provide statistical models initially built without user input, and the statistical models derived from the instantaneous metadata metrics associated with the different frame sets of the first video for each of the plurality of cells dividing the scene of the first video; and
 a processor-implemented, anomaly formulation module configured
  to sequentially receive the instantaneous metadata metrics associated with the different frame sets of the first video from the processor-implemented, instantaneous metrics extraction module,
  to compare, at a cell level, the instantaneous metadata metrics associated with each of the different frame sets of the first video with the statistical models provided by the processor-implemented, statistical model update module, and
  to detect an anomaly in a scene of the first video based upon the comparison.

2. The video analytics system of claim 1, wherein the processor-implemented, instantaneous metrics extraction module is configured to generate at the cell level, with respect to each of the different frame sets, a corresponding first instantaneous metadata metric reflecting its most recent value within the timeline of the first video.

3. The video analytics system of claim 2, wherein the first metric of each of the different frame sets represents how many people were present in each cell in a most recent predetermined interval within the timeline of the first video.

4. The video analytics system of claim 2, wherein the first target feature comprises speed and the first instantaneous metadata metric of each of the different frame sets represents speeds of a first target type in each cell in a most recent predetermined interval within the timeline of the first video.

5. The video analytics system of claim 1, wherein the instantaneous metadata metrics associated with a first frame set of the different frame sets comprises, for each cell of the scene of the first video and for each of several different target types, a number of each of the different target types present in each cell within a first predetermined duration corresponding to the first frame set.

6. The video analytics system of claim 1, wherein the instantaneous metadata metrics associated with a first frame set of the different frame sets comprises, at the cell level, the first target feature for each instance of several different target types present in each cell within a first predetermined duration preceding the frame corresponding to the first frame set.

7. The video analytics system of claim 6 wherein the first target feature is one of target location, target velocity, target trajectory, target speed, target size, target orientation, target appearance and target disappearance.

8. The video analytics system of claim 1,
 wherein the instantaneous metadata metrics associated with a first frame set of the different frame sets comprises, at the cell level, the first target feature for each instance of a first target type present in each cell within a first predetermined duration corresponding to the first frame set, and
 wherein the first target feature describes a relationship of each of instance of a first target to other features and/or events identified in the video.

9. The video analytics system of claim 8, wherein the first target feature is one of object ported by target, object left behind by target, target entering, target exiting, target loitering, target lying down, target running, target walking and target waiting in queue.

10. The video analytics system of claim 1, wherein the processor-implemented, metadata anomaly detection module is configured to detect all anomalies in the scene of the first video based only on analysis of the received target-related metadata.

11. The video analytics system of claim 1, wherein the processor-implemented, metadata anomaly detection module is configured to detect all anomalies in the scene of the first video without analysis of images of the first video.

12. The video analytics system of claim 1,
wherein the processor-implemented, instantaneous metrics extraction module provides at least some of the received target-related metadata as instantaneous metadata metrics to the processor-implemented, anomaly formulation module, and
wherein the processor-implemented, anomaly formulation module is configured to compare, at the cell level, target-related metadata with the with the statistical models provided by the processor-implemented, statistical model update module to detect an anomaly in the scene of the first video.

13. The video analytics system of claim 12, wherein the processor-implemented, anomaly formulation module is configured to identify an anomalous target as a target associated with target-related metadata responsible for the detection of an anomaly by the processor-implemented, anomaly formulation module.

14. The video analytics system of claim 1, wherein, for at least a first target identified by the target-related metadata, the instantaneous metrics extraction model is configured to estimate a path of the first target from target-related metadata of the first target, and to associate target-related metadata of the first target for cells through which the path of the first target extends.

15. The video analytics system of claim 1, wherein, for at least a first target identified by the target-related metadata, the instantaneous metrics extraction model is configured:
to estimate a path of the first target based upon a first target location of the first target within a first cell and a second target location of the first target within a second cell, the first and second target locations being identified in the target-related metadata received by the processor-implemented, instantaneous metrics extraction module respectively associated with first and second frames of the plurality of frames, and
to estimate a third target location of the first target within a third cell based on the estimated path of the first target.

16. The video analytics system of claim 15, wherein the estimation of the third target location within the third cell is used by the processor-implemented, instantaneous metrics extraction module to generate instantaneous metadata metrics associated with the third cell.

17. The video analytics system of claim 16, wherein the first target feature of the first target associated with the first frame and the first target feature of the first target associated with the second frame are used to estimate the first target feature of the first target within the third cell.

18. The video analytics system of claim 17, wherein the first target feature of the first target within the third cell is estimated from an interpolation of at least the first target feature associated with the first frame and the first target feature associated with the second frame.

19. The video analytics system of claim 18, wherein the first target feature comprises speed.

20. The video analytics system of claim 16, wherein the processor-implemented,instantaneous metrics extraction module associates the target classification of the first target with the third cell upon estimating the first target being located within the third cell.

* * * * *